US010614332B2

(12) United States Patent
Gousev et al.

(10) Patent No.: US 10,614,332 B2
(45) Date of Patent: Apr. 7, 2020

(54) LIGHT SOURCE MODULATION FOR IRIS SIZE ADJUSTMENT

(71) Applicant: QUALCOMM Incorporated, San Diego, CA (US)

(72) Inventors: Evgeni Gousev, Saratoga, CA (US); Liang Shen, Toronto (CA); Victor Chan, Del Mar, CA (US); Edwin Chongwoo Park, San Diego, CA (US); Xiaopeng Zhang, Richmond Hill (CA)

(73) Assignee: Qualcomm Incorportaed, San Diego, CA (US)

( * ) Notice: Subject to any disclaimer, the term of this patent is extended or adjusted under 35 U.S.C. 154(b) by 25 days.

(21) Appl. No.: 15/713,562

(22) Filed: Sep. 22, 2017

(65) Prior Publication Data

US 2018/0173986 A1 Jun. 21, 2018

Related U.S. Application Data

(60) Provisional application No. 62/435,661, filed on Dec. 16, 2016.

(51) Int. Cl.
*G06K 9/00* (2006.01)
*G06K 9/20* (2006.01)
(Continued)

(52) U.S. Cl.
CPC ............ *G06K 9/2027* (2013.01); *G06F 21/32* (2013.01); *G06K 9/0061* (2013.01);
(Continued)

(58) Field of Classification Search
CPC ............ G06K 9/00604; G06K 9/2027; G06K 9/00597; G06K 9/0061; G06K 9/00617;
(Continued)

(56) References Cited

U.S. PATENT DOCUMENTS 4,641,349 A * 2/1987 Flom .................... A61B 3/1216
351/205
5,289,023 A 2/1994 Mead
(Continued)

FOREIGN PATENT DOCUMENTS

CN 101226588 A 7/2008
CN 101310387 A 11/2008
(Continued)

OTHER PUBLICATIONS

Anonymous: "OpenCV—Haar Cascades vs. LBP Cascades in Face Detection—Stack Overflow", Stack Overflow, Jan. 9, 2012 (Jan. 9, 2012), XP055230385, Retrieved from the Internet Nov. 23, 2015: URL: http://stackoverflow.com/questions/8791178/haar-cascades-vs-lbp-cascades-in-face-detection.
(Continued)

*Primary Examiner* — Geoffrey E Summers
(74) *Attorney, Agent, or Firm* — Kilpatrick Townsend & Stockton

(57) ABSTRACT

Use of pupillary response to visible light for iris authentication is disclosed. One example involves (a) capturing an initial image of an eye including an inner circular boundary between a pupil region and an iris region and an outer circular boundary between the iris region and a sclera region, (b) determining a first size measurement indicative of the inner circular boundary, (c) responsive to at least the first size measurement, modulating one or more visible light sources to output visible light toward the eye of the user, (d) capturing a subsequent image of the eye of the user during a period of pupillary response, (e) obtaining an iris data record of the user, and (f) comparing the iris data record of the user to one or more registered iris data records to authenticate the user.

24 Claims, 43 Drawing Sheets

(51) Int. Cl.
  *G06T 7/62* (2017.01)
  *G06F 21/32* (2013.01)
  *H04N 5/235* (2006.01)

(52) U.S. Cl.
  CPC ..... *G06K 9/00604* (2013.01); *G06K 9/00617* (2013.01); *G06T 7/62* (2017.01); *G06T 2207/10152* (2013.01); *H04N 5/2351* (2013.01); *H04N 5/2354* (2013.01)

(58) Field of Classification Search
  CPC ............ H04N 5/2351; H04N 5/2354; G06T 2207/10152; G06T 7/62; G06F 21/32
  USPC ............................................. 382/117
  See application file for complete search history.

(56) References Cited

U.S. PATENT DOCUMENTS

| | | | |
|---|---|---|---|
| 5,291,560 A * | 3/1994 | Daugman | A61B 5/1171 382/117 |
| 5,543,590 A | 8/1996 | Gillespie et al. | |
| 6,011,257 A | 1/2000 | Endoh | |
| 6,459,509 B1 | 10/2002 | Maciey et al. | |
| 6,714,665 B1 | 3/2004 | Hanna et al. | |
| 7,038,185 B1 | 5/2006 | Tumblin et al. | |
| 7,151,844 B2 | 12/2006 | Stevenson et al. | |
| 7,377,643 B1 * | 5/2008 | Chock | A61B 3/14 351/205 |
| 7,744,216 B1 * | 6/2010 | Uhlhorn | G09G 5/00 351/204 |
| 8,203,440 B2 | 6/2012 | Schofield et al. | |
| 8,462,996 B2 | 6/2013 | Moon et al. | |
| 8,902,971 B2 | 12/2014 | Pace et al. | |
| 8,928,793 B2 | 1/2015 | McMahon | |
| 9,332,239 B2 | 5/2016 | Cote et al. | |
| 9,471,840 B2 | 10/2016 | Govil et al. | |
| 9,554,100 B2 | 1/2017 | Gousev et al. | |
| 9,582,725 B2 | 2/2017 | Govil et al. | |
| 2001/0028405 A1 | 10/2001 | Kondo et al. | |
| 2002/0012459 A1 | 1/2002 | Oh | |
| 2002/0100862 A1 | 8/2002 | Liu | |
| 2003/0095447 A1 | 5/2003 | Dean | |
| 2004/0155175 A1 | 8/2004 | McNulty | |
| 2007/0077987 A1 | 4/2007 | Gururajan et al. | |
| 2007/0160267 A1 | 7/2007 | Jones et al. | |
| 2008/0309810 A1 | 12/2008 | Smith et al. | |
| 2009/0020612 A1 | 1/2009 | Drzymala et al. | |
| 2009/0060383 A1 | 3/2009 | Li et al. | |
| 2009/0141987 A1 | 6/2009 | McGarry et al. | |
| 2009/0157707 A1 | 6/2009 | Ito et al. | |
| 2010/0034529 A1 | 2/2010 | Jelinek et al. | |
| 2010/0182468 A1 | 7/2010 | Posch et al. | |
| 2010/0295782 A1 | 11/2010 | Binder | |
| 2010/0316254 A1 | 12/2010 | Kirsch et al. | |
| 2011/0080421 A1 * | 4/2011 | Capener | G09G 5/10 345/589 |
| 2011/0128428 A1 | 6/2011 | Takatoku et al. | |
| 2011/0298755 A1 | 12/2011 | Ni | |
| 2012/0138774 A1 | 6/2012 | Kelly et al. | |
| 2012/0242820 A1 | 9/2012 | Hanna et al. | |
| 2012/0313960 A1 | 12/2012 | Segawa et al. | |
| 2013/0054505 A1 | 2/2013 | Ross et al. | |
| 2013/0055001 A1 | 2/2013 | Jeong et al. | |
| 2013/0058569 A1 | 3/2013 | Kawano | |
| 2013/0088685 A1 * | 4/2013 | Holland | G06K 9/00604 351/206 |
| 2013/0121590 A1 | 5/2013 | Yamanaka et al. | |
| 2013/0176552 A1 | 7/2013 | Brown et al. | |
| 2013/0229508 A1 | 9/2013 | Li et al. | |
| 2014/0002465 A1 | 1/2014 | Kwa et al. | |
| 2014/0002620 A1 | 1/2014 | Murakami et al. | |
| 2014/0003663 A1 | 1/2014 | Li et al. | |
| 2014/0118592 A1 | 5/2014 | Yoon et al. | |
| 2014/0125799 A1 | 5/2014 | Bos et al. | |
| 2014/0149754 A1 | 5/2014 | Silva et al. | |
| 2014/0169663 A1 | 6/2014 | Han et al. | |
| 2014/0192066 A1 | 7/2014 | Savransky et al. | |
| 2014/0204238 A1 | 7/2014 | Cao et al. | |
| 2014/0319325 A1 | 10/2014 | Kawahito et al. | |
| 2014/0320666 A1 | 10/2014 | Badawy et al. | |
| 2014/0363049 A1 | 12/2014 | Benosman et al. | |
| 2014/0368423 A1 | 12/2014 | Brenckle et al. | |
| 2014/0368626 A1 | 12/2014 | John et al. | |
| 2014/0368712 A1 | 12/2014 | Park et al. | |
| 2015/0036942 A1 | 2/2015 | Smirnov et al. | |
| 2015/0311977 A1 | 10/2015 | Jovicic et al. | |
| 2015/0331480 A1 | 11/2015 | Zhou et al. | |
| 2015/0358525 A1 | 12/2015 | Lord | |
| 2016/0091946 A1 | 3/2016 | Govil et al. | |
| 2016/0092735 A1 | 3/2016 | Govil et al. | |
| 2016/0094800 A1 | 3/2016 | Gousev et al. | |
| 2016/0117544 A1 | 4/2016 | Hoyos et al. | |
| 2016/0180169 A1 | 6/2016 | Bae et al. | |
| 2016/0241338 A1 | 8/2016 | Ganick et al. | |
| 2016/0266643 A1 * | 9/2016 | Martensson | G09G 3/20 |
| 2016/0275348 A1 | 9/2016 | Slaby et al. | |
| 2016/0283789 A1 | 9/2016 | Slaby et al. | |
| 2016/0335495 A1 | 11/2016 | Kim et al. | |
| 2017/0032216 A1 | 2/2017 | Govil et al. | |
| 2017/0064211 A1 | 3/2017 | Omid-Zohoor | |
| 2017/0091550 A1 | 3/2017 | Feng et al. | |
| 2017/0116478 A1 | 4/2017 | Gousev et al. | |
| 2017/0132466 A1 | 5/2017 | Gousev et al. | |
| 2017/0161579 A1 | 6/2017 | Gousev et al. | |
| 2017/0255814 A1 * | 9/2017 | Kaehler | G06F 21/32 |
| 2017/0255823 A1 * | 9/2017 | Abe | A61B 5/117 |
| 2017/0277950 A1 | 9/2017 | Sung et al. | |
| 2017/0337866 A1 | 11/2017 | Ikeda et al. | |
| 2017/0374322 A1 | 12/2017 | Gousev et al. | |
| 2018/0012007 A1 * | 1/2018 | Kim | G06F 21/32 |
| 2018/0052513 A1 * | 2/2018 | Le Gros | G02B 27/0093 |
| 2018/0173933 A1 | 6/2018 | Gousev et al. | |
| 2018/0173948 A1 | 6/2018 | Gousev et al. | |
| 2018/0212678 A1 | 7/2018 | Gummadi et al. | |

FOREIGN PATENT DOCUMENTS

| | | |
|---|---|---|
| CN | 102065248 A | 5/2011 |
| CN | 102663409 A | 9/2012 |
| CN | 102665049 A | 9/2012 |
| CN | 103135889 A | 6/2013 |
| CN | 103226707 A | 7/2013 |
| CN | 103533234 A | 1/2014 |
| CN | 103856730 A | 6/2014 |
| DE | 102006023611 A1 | 11/2007 |
| DE | 102008052930 A1 | 4/2010 |
| EP | 1164544 A1 | 12/2001 |
| EP | 2528015 A1 | 11/2012 |
| EP | 2665257 A1 | 11/2013 |
| EP | 2709066 A1 | 3/2014 |
| EP | 2757769 A1 | 7/2014 |
| JP | 2008109477 A | 5/2008 |
| JP | 2008131407 A | 6/2008 |
| JP | 2010063173 A | 3/2010 |
| JP | 2010509651 A | 3/2010 |
| JP | 2011523106 A | 8/2011 |
| JP | 2012146299 A | 8/2012 |
| JP | 2013003787 A | 1/2013 |
| JP | 2013012190 A | 1/2013 |
| TW | 200931964 A | 7/2009 |
| TW | 201427419 A | 7/2014 |
| WO | 8605018 A1 | 8/1986 |
| WO | 2008053433 A2 | 5/2008 |
| WO | 2009099511 A1 | 8/2009 |
| WO | 2012093381 A1 | 7/2012 |
| WO | 2014015194 A2 | 1/2014 |
| WO | 2015100335 A1 | 7/2015 |
| WO | 2015148209 A1 | 10/2015 |
| WO | 2016010721 A1 | 1/2016 |

(56) References Cited

OTHER PUBLICATIONS

Butler M., et al., "ROI processing offers opportunities," Vision Systems Design, May 1, 2006 (May 1, 2006), XP055232974, Retrieved from the Internet: URL: http://www.vision-systems.com/articles/print/volume-11/issue-5/features/component-integration/roi-processing-offers-opportunities.html [retrieved on Dec. 2, 2015] the whole document.

Cho J., et al., "FPGA-Based Face Detection System Using Haar Classifiers", Field Programmable Gate Arrays, Feb. 22, 2009-Feb. 24, 2009, pp. 103-112, XP058022870, DOI: 10.1145/1508128.1508144, ISBN: 978-1-60558-410-2.

Choi J., et al., "A 3.4[mu]W CMOS Image Sensor with Embedded Feature-extraction Algorithm for Motion-Triggered Object-of-interest Imaging," Solid-State Circuits Conference Digest of Technical Papers (ISSCC), 2013 IEEE International, IEEE, Feb. 17, 2013 (Feb. 17, 2013), pp. 478-479, XP032350659, DOI: 10.1109/ISSCC.2013.6487822 ISBN: 978-1-4673-4515-6.

De Marsico M., et al., "FIRME: Face and Iris Recognition for Mobile Engagement", Image and Vision Computing, vol. 32, No. 12, Dec. 2014, pp. 1-13.

Delbruck T., et al., "Activity-Driven, Event-Based Vision Sensors," Proceedings of 2010 IEEE International Symposium on Circuits and Systems (ISCAS), 2010, 4 pages.

Etienne-Cummings R., et al., "A Programmable Focal-Plane MIMD Image Processor Chip", IEEE Journal of Solid-State Circuits, Jan. 2001, vol. 36, No. 1, pp. 64-73.

Fernandez-Berni J., et al., "Bottom-up Performance Analysis of Focal-Plane Mixed-Signal Hardware for Viola-Jones Early Vision Tasks", International Journal of Circuit Theory and Applications, vol. 43, No. 8, Apr. 16, 2014 (Apr. 16, 2014), pp. 1063-1079, XP055230917, ISSN: 0098-9886, DOI: 10.1002/cta.1996.

Fernandez-Berni J., et al., "Focal-Plane Sensing-Processing: A Power-Efficient Approach for the Implementation of Privacy-Aware Networked Visual Sensors," Sensors, vol. 14, No. 8, Aug. 19, 2014 (Aug. 19, 2014), pp. 15203-15226, XP055230039, DOI: 10.3390/s140815203.

Hartenstein R W., et al., "An Embedded Accelerator for Real World Computing", Proceedings of IFIP International Conference on Very Large Scale Integration, VLSI'97, Aug. 26, 1997 (Aug. 26, 1997), pp. 1-12, XP055234128, Gramado, Brazil the whole document.

Hsiao P.Y., et al., "A Novel CMOS Imager with 2-Dimensional Binarization and Edge Detection for Highly Integrated Imaging Systems," Digest of Technical Papers. International Conference on Consumer Electronics, 2006, pp. 71-72.

Huang D., et al., "Local Binary Patterns and Its Application to Facial Image Analysis: A Surve," IEEE Transactions on Systems, Man, and Cybernetics: Part C:Applications and Reviews, IEEE Service Center, Piscataway, NJ, US, vol. 41, No. 6, Nov. 1 2011 (Nov. 1 2011), pp. 765-781, XP011363204, ISSN: 1094-6977, DOI: 10.1109/TSMCC.2011.2118750 abstract sections I, III, V, VI.

Kazemi V., et al., "One Millisecond Face Alignment with an Ensemble of Regression Trees", IEEE Conference on Computer Vision and Pattern Recognition (CVPR), 2014, pp. 1-8.

Kriss M: "Handbook of Digital Imaging", 2015, Wiley & Sons Ltd. Chichester, West Sussex, XP002751874, ISBN: 978-0-470-51059-9 vol. 1, p. 124-129,133-137, the whole document.

Lahdenoja O., et al., "A Massively Parallel Algorithm for Local Binary Pattern based Face Recognition", IEEE, ISCAS 2006, pp. 3730-3733.

Lahdenoja O., et al., "Extracting Local Binary Patterns with MIPA4k Vision Processor," 12th International Workshop on Cellular Nanoscale Networks and their Applications (CNNA), IEEE, Piscataway, NJ, USA, Feb. 3, 2010 (Feb. 3, 2010), pp. 1-5, XP031648245, ISBN: 978-1-4244-6679-5.

Laiho M., et al., "Dedicated Hardware for Parallel Extraction of Local Binary Pattern Feature Vectors", 2005 9th International Workshop on Cellular Neural Networks and Their Applications, IEEE, May 2005, pp. 27-30.

Moloney D., et al., "Myriad 2: Eye of the Computational Vision Storm", Hot Chips, Aug. 12, 2014, XP055230946, Retrieved from the Internet on Nov. 24, 2015: URL: http://www.hotchips.org/wp-content/uploads/hc_archives/hc26/HC26-12-day2-epub/HC26.12-6-HP-ASICs-epub/HC26.12.620-Myriad2-Eye-Moloney-Movidius-provided.pdf.

Muehlfellner P., et al., "Selection, Analysis and Implementation of Image-based Feature Extraction Approaches for a Heterogenous, Modular and FPGA-based Architecture for Camera-based Driver Assistance Systems Master Thesis Embedded and Intelligent Systems", Technical Report, Sep. 1, 2011 (Sep. 1, 2011), XP055232797, Retrieved from the Internet: URL: https://www.diva-portal.org/smash/get/diva2:444576/FULLTEXT01.pdf [retrieved on Dec. 2, 2015] chapter 4.

"Myriad 2 Vision Processor Bringing Computational Imaging and Visual Awareness to Mobile, Wearable, and Embedded Markets Product Brief", Aug. 1, 2014, XP055230944, Retrieved from the Internet on Nov. 24, 2015: URL: http://uploads.movidius.com/1441734401-Myriad-2-product-brief.pdf.

Pierzchala E., et al., "High Speed Field Programmable Analog Array Architecture Design", Analogix Corporation, Feb. 1994, 61 pages.

Poikonen J., et al., "MIPA4k: A 64×64 Cell Mixed-mode Image Processor Array", ISCAS 2009, IEEE, May 24, 2009, pp. 1927-1930.

Posch C., et al., "An Asynchronous Time-Based Image Sensor," IEEE International Symposium on Circuits and Systems (ISCAS), 2008, 4 pages.

QUALCOMM, "FAST Corners", Sep. 15, 2015, 6 Slides (153289 IDF).

Shi Y., et al., "Smart Cameras: Fundamentals and Classification," Chapter 2, A.N. Belbachir (Ed.), Springer Science+Business Media, LLC 2010, pp. 19-34.

Stack Overflow, "Fast Detector in every levels on Gaussian Pyramids", matlab, Retrieved from internet, URL: http://stackoverflow.com/questions/24222611/fast-detector-in-every-levels-on-gaussian-pyramids , on Sep. 11, 2015, 2 Pages.

Suarez M., et al., "CMOS-3D Smart Imager Architectures for Feature Detection", IEEE Journal on Emerging and Selected Topics in Circuits and Systems, IEEE, Piscataway, NJ, USA, vol. 2, No. 4, Dec. 1, 2012 (Dec. 1, 2012), pp. 723-736, XP011479510, ISSN: 2156-3357, DOI: 10.1109/JETCAS.2012.2223552.

Trein J., et al., "Development of a FPGA Based Real-Time Blob Analysis Circuit," ISSC 2007, Derry, Sep. 13-14, 2007, 6 pages.

Wikipedia, "Features from accelerated segment test", Retrieved from Internet, URL: https://en.wikipedia.org/wiki/Features_from_accelerated_segment_test#High-speed_test , on Sep. 11, 2015, 6 Pages.

Wyatt J.L., et al., "The MIT Vision Chip Project: Analog VLSI Systems for Fast Image Acquisition and Early Vision Processing," IEEE International Conference on Robotics and Automation, 1991, vol. 2, pp. 1330-1335.

Yang M., et al., "Comparison of Spike Encoding Schemes in Asynchronous Vision Sensors: Modeling and Design", IEEE, International Symposium on Circuits and Systems (ISCAS), Jun. 1, 2014 (Jun. 1, 2014), pp. 2632-2635, XP032624686, DOI: 10.1109/ISCAS.2014.6865713 [retrieved on Jul. 24, 2014].

Yu H, "FAST Corner detection—Machine Learning for high speed corner detection", Nov. 16, 2010, 60 Slides.

Huang D., et al., "Local Binary Patterns and Its Application to Facial Image Analysis", A Survey; Date: Nov. 2011 Publisher: IEEE; Edition: IEEE Transactions on Systems, Man and Cybernetics—Part C: Applications and Reviews, vol. 41, No. 6; pp. 765-781.

International Preliminary Report on Patentability—PCT/US20151052684, The International Bureau of WIPO—Geneva, Switzerland, Apr. 4, 2017.

Aarzen K-E., "Lund University a Simple Event-Based PID Controller a Simple Event-Based PID Controller", Jan. 1, 1999, XP055461383, Retrieved from the Internet: URL:https://lup.lub.lu.se/search/ws/files/6083100/8521976.pdf [retrieved on Mar. 21, 2018].

(56) References Cited

OTHER PUBLICATIONS

Belcher C., et al., "Region-Based SIFT Approach to Iris Recognition", Optics and Lasers in Engineering, Elsevier, Amsterdam, NL, vol. 47, No. 1, Jan. 1, 2009, XP025693652, ISSN: 0143-8166, DOI:10.1016/J. OPTLASENG.2008.07.004 [retrieved on Aug. 28, 2008], pp. 139-147.
Chen Y., et al., "Efficient Iris Recognition Based on Optimal Subfeature Selection and Weighted Subregion Fusion", The Scientific World Journal, Jan. 1, 2014, vol. 2014, XP055446394, ISSN: 2356-6140, DOI: 10.1155/2014/157173, pp. 1-19.
Cremer S., et al., "How a Local Quality Measure Can Help Improving Iris Recognition", Proceedings of the International Conference of the Biometrics Special Interest Group (BIOSIG), 2012 BIOSIG, IEEE, Sep. 6, 2012, XP032243115, ISBN: 978MI-4673-1010-9, pp. 1-6.
Farra N., et al., "Energy-Efficient Mobile Gesture Recognition with Computation Offloading", 2011, International Conference on Energy Aware Computing (ICEAC), Nov. 30, 2011, pp. 1-6, XP032296827, DOI: 10.1109/ICEAC.2011.6403626, ISBN: 978-1-4673-0466-5.
Pillai J.K., et al., "Secure and Robust Iris Recognition Using Random Projections and Sparse Representations", IEEE Transactions on Pattern Analysis and Machine Intelligence, IEEE Computer Society, USA, Sep. 1, 2011, vol. 33, No. 9, XP011409146, ISSN: 0162-8828, DOI: 10.1109/TPAMI.2011.34, pp. 1877-1893.
Qi M., et al., "User-Specific Iris Authentication Based on Feature Selection", 2008 International Conference on Computer Science and Software Engineering, Jan. 1, 2008, pp. 1040-1043, XP055446378, Piscataway, NJ, USA, DOI: 10.1109/CSSE.2008.1060, ISBN: 978-0-7695-3336-0.
Soyel H., et al., "Localized Discriminative Scale Invariant Feature Transform Based Facial Expression Recognition", Computers & Electrical Engineering, Sep. 1, 2012, vol. 38, No. 5, XP055446418, GB, ISSN: 0045-7906, DOI:10.1016/j.compeleceng.2011.10.016, pp. 1299-1309.
International Search Report and Written Opinion—PCT/US2017/063317—ISA/EPO—dated Feb. 8, 2018.
Thavalengal S., et al., "Iris Liveness Detection for Next Generation Smartphones", IEEE Transactions on Consumer Electronics, IEEE Service Center, New York, NY, US, vol. 62, No. 2, May 1, 2016, pp. 95-102, XP011617322, ISSN: 0098-3063, DOI: 10.1109/TCE.2016.7514667 [retrieved on Jul. 15, 2016].
Sun Z., et al., "Graph Matching Iris Image Blocks with Local Binary Pattern", Center for Biometrics and Security Research, 2005, pp. 366-372.

\* cited by examiner

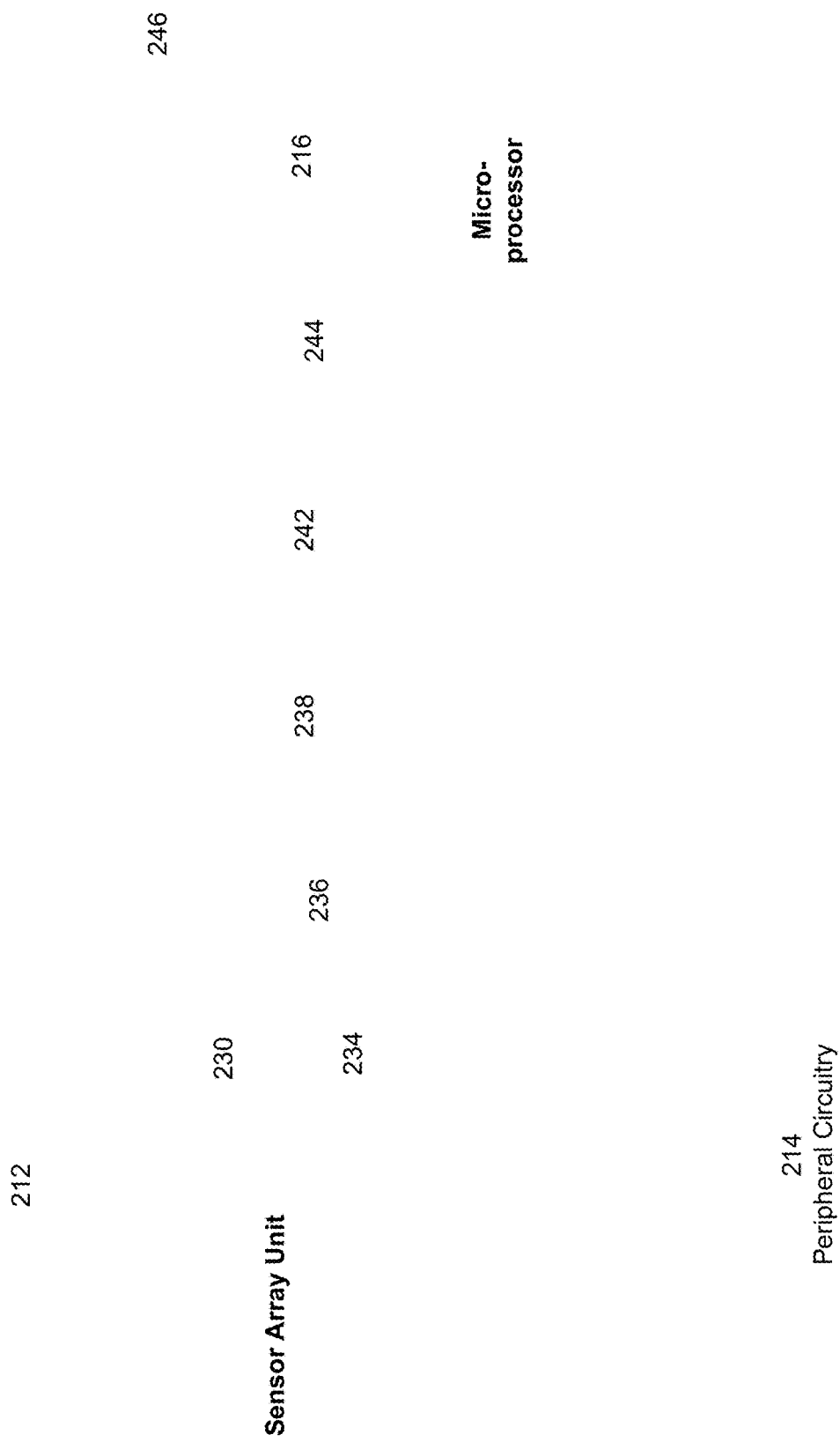

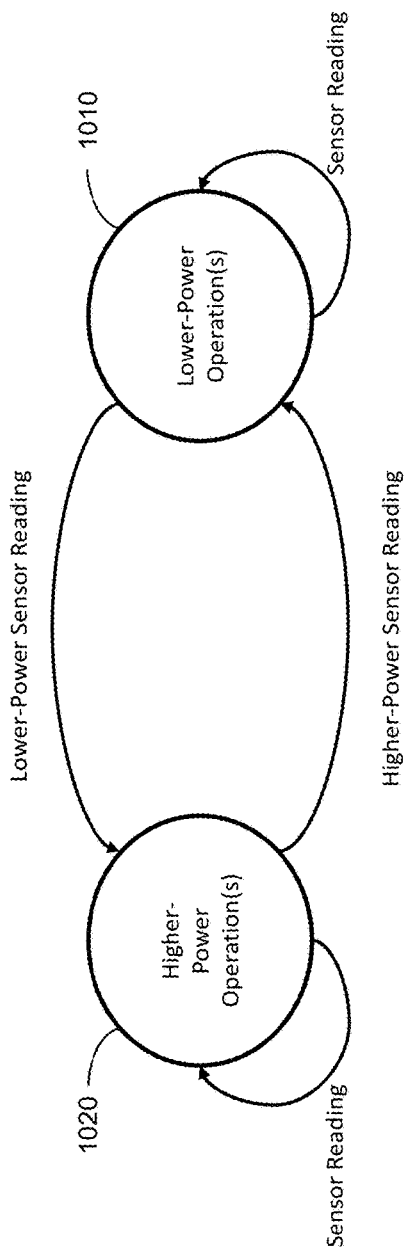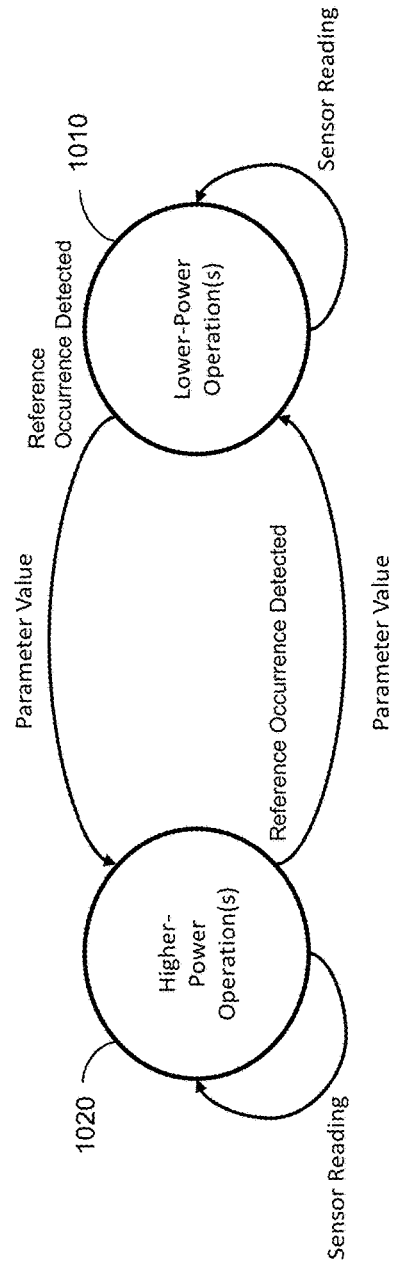
FIG. 10A
FIG. 10B send, by the vision sensor system, an indication for an infrared (IR) light source to be lit, in response to the processing of the one or more computed CV features indicating the presence of the one or more irises in the scene captured by the at least one sensor array ⌒1810

FIG. 18B generate, by the vision sensor system, an event in response to the processing of the one or more computed CV features indicating the presence of the one or more irises in the scene captured by the at least one sensor array ⌒1812 send, by the vision sensor system, the event to the second processing unit, wherein the second processing unit is configured to, in response to receiving the event, transition from a first power state to a second power state, the second power state being associated with a higher power level than the first power state ⌒1814

FIG. 18C

FIG. 23 (Optional)

Shortened Iris Data Record

| Sector Number | CV Feature |
|---|---|
| 1 | CV-1 |
| 2 | CV-2 |
| 16 | CV-16 |
| 7 | CV-7 |
| 8 | CV-8 |
| 12 | CV-12 |

FIG. 33A

Shortened Iris Data Record
(Sector Numbers Only)

| Sector Number | CV Feature |
|---|---|
| 1 | |
| 2 | |
| 16 | |
| 7 | |
| 8 | |
| 12 | |

FIG. 33B

Full Iris Data Record

| Sector Number | CV Feature |
|---|---|
| 1 | CV-1 |
| 2 | CV-2 |
| 3 | CV-3 |
| 4 | CV-4 |
| 5 | CV-5 |
| 6 | CV-6 |
| 7 | CV-7 |
| 8 | CV-8 |
| 9 | CV-9 |
| 10 | CV-10 |
| 11 | CV-11 |
| 12 | CV-12 |
| 13 | CV-13 |
| 14 | CV-14 |
| 15 | CV-15 |
| 16 | CV-16 |

FIG. 33C

LIGHT SOURCE MODULATION FOR IRIS SIZE ADJUSTMENT

CROSS-REFERENCE TO RELATED APPLICATIONS

This patent application claims the benefit of U.S. Provisional Patent Application No. 62/435,661 filed on Dec. 16, 2016 and entitled "GLANCE ACCELERATED IRIS DETECTION/ROI ISOLATION," which is incorporated by reference herein in its entirety for all purposes. Additionally, the following applications, including present application, are related to one another in subject matter and are assigned to the same assignee and filed on the same day:

U.S. patent application Ser. No. 15/713,561, entitled "LOW POWER DATA GENERATION FOR IRIS-RELATED DETECTION AND AUTHENTICATION"

U.S. patent application Ser. No. 15/713,562, entitled "LIGHT SOURCE MODULATION FOR IRIS SIZE ADJUSTMENT"

U.S. patent application Ser. No. 15/713,563, entitled "USER AUTHENTICATION USING IRIS SECTOR"

BACKGROUND

Iris scan technology offers great promise to dramatically improve user authentication and security. Generally speaking, user authentication techniques can be organized under three categories: what the user knows (e.g., password), what the user has (e.g., smart card or fob), and what the user is—i.e., biometric authentication. Of these, biometric authentication is considered to be superior, because it can provide more protection against spoofing and loss. A password can be copied, as well as lost if a user forgets his/her password. A smart card or fob can be physically misplaced. A biometric characteristic is more difficult to spoof and unlikely to be misplaced by the user. A biometric authentication technique, used either alone or in combination with one or more other authentication techniques, provides a markedly greater level of security. Among biometric authentication techniques, iris scan technology is particularly interesting in terms of the level of protection it can potentially provide. Currently, fingerprint matching is the most widely adopted form of biometric authentication. However, the uniqueness of a human fingerprint is estimated to be on order of one (1) in ten thousand (10,000) or one hundred thousand (100,000). By contrast, the uniqueness of a single human iris scan is estimated to be on order of one (1) in one million (1,000,000). Furthermore, iris scans can usually be taken for both the left eye and the right eye of a user simultaneously, which effectively results in the uniqueness of the scan (of both eyes) being estimated to be on order of one (1) in one trillion (1,000,000,000,000). Iris scan technology can thus provide a dramatic improvement over traditional biometric authentication based on fingerprint matching.

However, iris scan technology has not been widely used for user authentication. One significant reason relates to power consumption. An iris scan involves capturing an image of the user's iris with sufficient level of detail to include iris features. Furthermore, the process of matching a captured iris image to a registered iris image generally involves a considerable level of processing capability. The amount of power required to perform such tasks can be significant, especially for battery-powered devices such as mobile devices, wearable devices, etc. Exacerbating the problem is the need to keep power-hungry systems, such as camera and processor systems, in a powered-on state in anticipation of the occurrence of an iris scan. Consequently, even though it has tremendous potential, iris scan technology continues to be limited in its adoption.

SUMMARY

Methods, apparatuses, systems, and non-transitory computer readable medium are described for performing iris authentication for a user. In one example, a method comprises (a) capturing an initial image of an eye of the user, the eye including an inner circular boundary between a pupil region and an iris region, and an outer circular boundary between the iris region and a sclera region, (b) determining, from the initial image, a first size measurement indicative of a size of the inner circular boundary, (c) responsive to at least the first size measurement, modulating one or more visible light sources to output visible light toward the eye of the user, (d) capturing a subsequent image of the eye of the user during a period of pupillary response resulting from modulating the one or more visible light sources, (e) based on the subsequent image of the eye, obtaining an iris data record of the user, and (f) comparing the iris data record of the user to one or more registered iris data records to authenticate the user.

In another example, an apparatus comprises (a) one or more image sensors configured to capture an initial image of an eye of the user, the eye including an inner circular boundary between a pupil region and an iris region and an outer circular boundary between the iris region and a sclera region and (b) one or more processing units. The one or more processing units are configured to (i) determine, from the initial image, a first size measurement indicative of a size of the inner circular boundary, (ii) modulate, responsive to at least the first size measurement, one or more visible light sources to output visible light toward the eye of the user, (iii) receive a subsequent image of the eye of the user captured during a period of pupillary response resulting from modulating the one or more visible light sources, (iv) obtain, based on the subsequent image of the eye, an iris data record of the user, and (v) compare the iris data record of the user to one or more registered iris data records to authenticate the user.

In another example, a system comprises (a) means for capturing an initial image of an eye of the user, the eye including an inner circular boundary between a pupil region and an iris region, and an outer circular boundary between the iris region and a sclera region, (b) means for determining, from the initial image, a first size measurement indicative of a size of the inner circular boundary, (c) means for, responsive to at least the first size measurement, modulating one or more visible light sources to output visible light toward the eye of the user, (d) means for capturing a subsequent image of the eye of the user during a period of pupillary response resulting from modulating the one or more visible light sources, (d) means for, based on the subsequent image of the eye, obtaining an iris data record of the user, and (f) means for comparing the iris data record of the user to one or more registered iris data records, to authenticate the user.

In yet another example, a non-transitory computer-readable medium storing instructions therein for execution by one or more processing units, comprising instructions to (a) capture an initial image of an eye of the user, the eye including an inner circular boundary between a pupil region and an iris region, and an outer circular boundary between the iris region and a sclera region, (b) determine, from the initial image, a first size measurement indicative of a size of the inner circular boundary, (c) responsive to at least the first size measurement, modulate one or more visible light sources to output visible light toward the eye of the user, (d) capture a subsequent image of the eye of the user during a period of pupillary response resulting from modulation of the one or more visible light sources, (e) based on the subsequent image of the eye, obtain an iris data record of the user, and (f) compare the iris data record of the user to one or more registered iris data records, to authenticate the user.

BRIEF DESCRIPTION OF THE DRAWINGS

An understanding of the nature and advantages of various embodiments may be realized by reference to the following figures.

FIG. 2B is a block diagram of a sensor system with a sensor array unit, microprocessor, and example peripheral circuitry 214, according to one embodiment.

FIGS. 10A-10B are state diagrams illustrating example states of a sensor system for computer vision computations and lower-power optical sensor readings.

FIG. 18B is a flowchart illustrating an optional step that may be added to process 1800 shown in FIG. 18A for sensing scene-based occurrences, in accordance with an embodiment of the disclosure.

FIG. 18C is a flowchart illustrating optional steps that may be added to process 1800 shown in FIG. 18A for sensing scene-based occurrences, in accordance with an embodiment of the disclosure.

FIG. 33A shows an example of a shortened iris data record, according to an embodiment of the disclosure.

FIG. 33B shows an example of a shortened iris data record containing only the sector identifiers of the selected sectors.

FIG. 33C shows an example of a full iris data record, according to an embodiment of the disclosure.

DETAILED DESCRIPTION

The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the scope of this disclosure.

Figure 1:
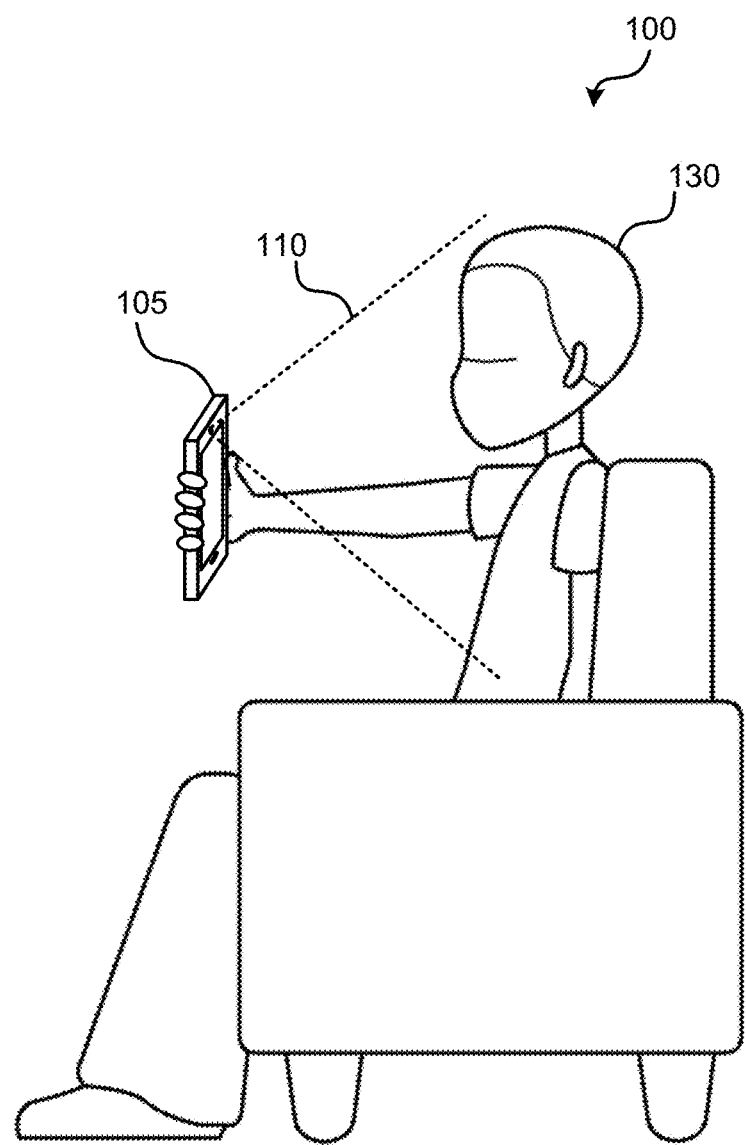
FIG. 1 illustrates an example setup in which a user may be interacting with a mobile device that incorporates the features and techniques described herein

FIG. 1 illustrates an example setup 100 in which a user 130 may be interacting with a mobile device 105 that incorporates the features and techniques described herein. Here, the user 130 may interact with the mobile device 105, at least in part, via a sensor system having a special-purpose camera, dedicated computer vision (CV) computation hardware, and a dedicated low-power microprocessor as described herein below. It is understood that "low-power" here is intended to refer to electrical power, not computational power. These features enable the mobile device 105 to detect, track, recognize, and/or analyze a subject (such as the user 130) and other objects and scenes within the field of view 105 of the camera. The sensor system processes the information retrieved from the camera using the included embedded processor and sends "events" (or indications that one or more reference occurrences have occurred) for the main processor only when needed or as defined and configured by the application. This allows the general-purpose microprocessor (which is typically relatively high-speed and high-power to support a variety of applications) to stay in a low-power (e.g., sleep mode) most of the time as conventional, while becoming active only when events are received from the sensor system. While illustrated and described with reference to mobile device 105, it is understood that a smart sensor capable of performing object detection, recognition, etc., can be useful in a variety of applications including internet of things (IoT) applications.

As described herein, the dedicated CV computation hardware computes or is capable of computing CV features, or localized CV features for each sensor element or pixel in a sensor array unit, based on, at least in part, on signals associated with neighboring sensor elements. (Herein, the term "local" or "localized" refers to features computed based on one or more neighboring sensor elements rather than statistical or other mathematical evaluation of the entire image.) As described herein, the sensor elements including a subject sensor element and other sensor elements relatively close to the subject sensor element may be referred to as neighboring sensor elements. In certain aspects of the disclosure, the neighboring sensor elements may include the subject sensor element and sensor elements immediately adjacent to the subject sensor element. In certain other aspects of the disclosure, neighboring sensor elements may also include sensor elements that are relatively close to the subject sensor element and not immediately adjacent. For example, in certain instances, sensor elements within three sensor elements from the subject sensor element may still be considered neighboring sensor elements when the width or height of the number of sensors is sixty-four sensor elements.

As described herein, CV features or localized CV features may refer to detecting low level computer vision markers or indicators, such as labels associated with each sensor element or pixel of the sensor. As indicated in further detail below, such CV features can include outputs such as a Histogram of Signed Gradients (HSG) and/or a Local Binary Pattern (LBP). An LBP calculation can be based on neighboring sensor elements, for example a reference or subject sensor pixel and its eight immediately adjacent neighboring sensor pixels. The LBP calculation may score each of the reference pixel's immediately adjacent neighboring pixels based on their respective difference in intensity. (Color would be dealt with using different LBPs for different color channels (e.g., red, blue, and green).) A HSG computation also employs neighboring sensor elements, for example a reference pixel and one or more immediately adjacent neighboring pixels to detect various features within a scene.

For example, in the setup 100 of FIG. 1, the user 130 may have picked up the mobile device 105 while the mobile device's general-purpose microprocessor is in a sleep mode. The sensor system of the mobile device 105, however, may remain active and may be capable, for example, of recognizing the face of the user 130, a hand gesture, other objects in the scene, and/or the like. Upon recognizing a certain reference occurrence has taken place—in this case, the specific facial features of the user 130 are within the sensor system's field of view 110—the sensor system can send an event to the mobile device's general-purpose microprocessor indicating that the facial features of the user 130 have been recognized and/or causing the mobile device's general-purpose microprocessor to exit the low-power mode and become fully active.

Reference occurrences that cause the sensor system to send an event to the mobile device's general-purpose microprocessor can include any of a variety of CV-detectable occurrences, depending on desired functionality. These occurrences may include, for example, facial and/or object detection, facial and/or object recognition, gesture recognition, and/or the like. In some embodiments, one or more reference occurrences may be configurable by a user 130. Additional examples of reference occurrences are provided herein below.

Because the special-purpose camera is dedicated to the sensor system, it may not be primarily intended for clicking photographs or shooting videos. Therefore, the special-purpose camera may not yield intensity-based images out. Instead, the special-purpose camera may include pixel-level computer vision feature computations like LBPs, Gradients, Edges, HSGs, and/or other operations in which readings from neighboring sensor pixels of the special-purpose camera are used to compute CV features, for a low-power hardware-based computation of the said features.

That said, although a sensor system comprising a special-purpose camera may be used, embodiments are not so limited. More broadly, a sensor system can include a sensor array unit that includes sensor cells for sensing chemical, visual, aural, biological, mechanical, and/or other types of input.

Additionally, although FIG. 1 and other embodiments describe a sensor system being incorporated into a mobile device, embodiments are not so limited. Electrical power savings brought by the techniques and features described herein can have particular benefit to mobile devices—such as mobile phones, tablets, laptops, portable media players, and/or the like—but other devices, such as televisions, desktop computers, and/or other devices that may not be generally considered mobile may utilize the features and techniques described herein.

Figure 2A:
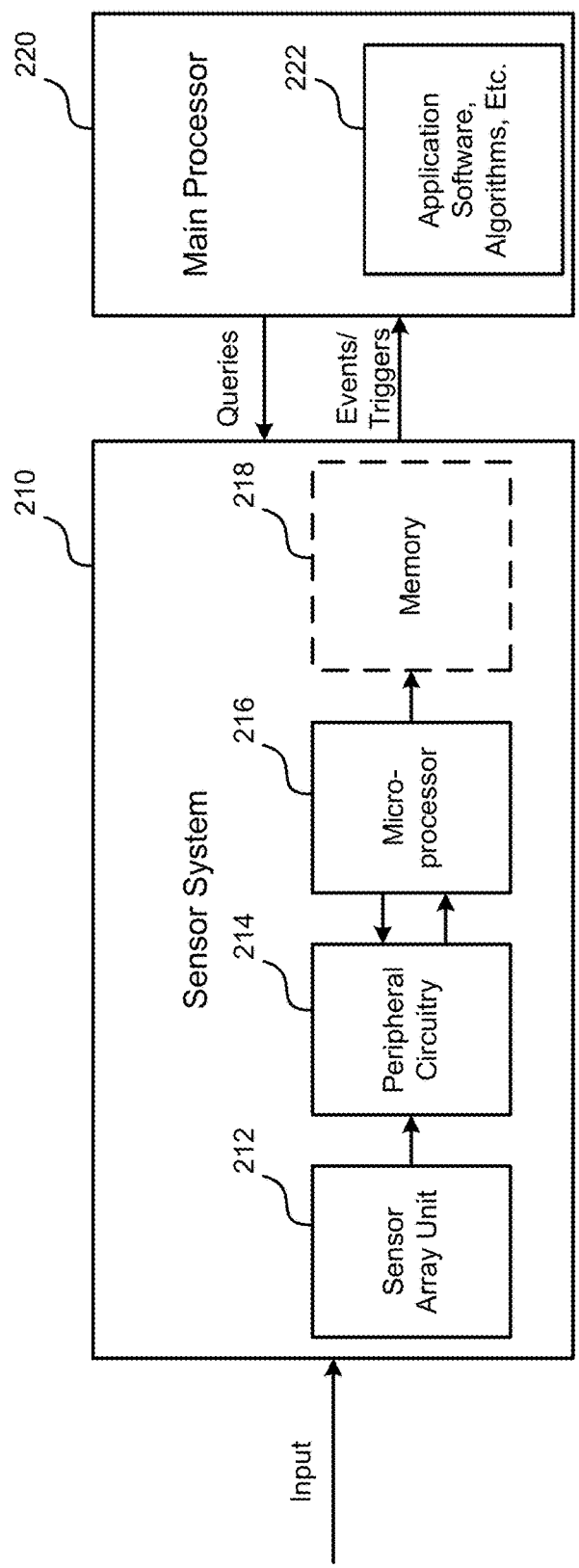
FIG. 2A is a block diagram of a configuration including a sensor system and main processor, according to one embodiment.

FIG. 2A is a block diagram that illustrates how a sensor system 210 (also referred to herein as a "smart sensor") can be configured to enable high-level sensing operations while a main processor 220 can be operating in a low-power (e.g., "sleep" or "stand-by") mode, according to one embodiment. Components of FIG. 2A can be incorporated into a larger electronic device. An example of a mobile device in which a sensor system 210 may be incorporated is described below, with regard to FIG. 5.

Also, it will be understood that alternative embodiments may vary from the components shown in FIG. 2A. For example, as described below, embodiments of a sensor system 210 may or may not include peripheral circuitry 214, a microprocessor 216, and/or memory 218. Additionally or alternatively, embodiments may combine, separate, add, omit, and/or rearrange the components of FIG. 2A, depending on desired functionality. For example, where the sensor system 210 comprises a sensor array (e.g., a pixel array or camera), some optics may be utilized to manipulate the input (e.g., light) before it reaches the sensor array. It is noted that, although embodiments herein describe the use of an "image array," embodiments are not so limited and may more broadly utilize a sensor array that does not necessarily produce or capture an image. (FIG. 2B, described in more detail below, illustrates a sensor system 210 with a sensor array unit 212, microprocessor 216, and example peripheral circuitry 214, according to one embodiment.)

As illustrated in FIG. 2A, a sensor system 210 receiving an input can comprise a sensor array unit 212, peripheral circuitry 214, microprocessor 216, and/or memory 218. The electronic sensor can be communicatively coupled through either a wired or wireless connection with a main processor 220 of an electronic device (such as an application processor of a mobile phone), which can provide queries to the sensor system 210 and receive events and/or other triggers from the sensor system 210. In some embodiments the "main processor" 220 may simply correspond to a larger, for example greater in processing power and/or greater in electric power use, processing unit than the microprocessor 216. In some implementations, microprocessor 216 can correspond to a dedicated microprocessor or a first processing unit and can be configured to consume less electrical power than the main processor 220, which can correspond to a second processing unit. In various embodiments, functionality may be distributed in various ways across the microprocessor 216 and the main processor 220.

The type of sensor array unit 212 utilized can vary, depending on the desired functionality of the electronic sensor. As previously indicated, a sensor array unit 212 can include an array (e.g., a one- or two-dimensional array) of sensor cells for sensing chemical, visual, aural, biological, mechanical, and/or other types of input. For example, the sensor array unit 212 can comprise a camera sensor or other vision and/or sensor array where the plurality of sensor cells forms a grid of pixels.

In some embodiments, the sensor array unit 212 may include a "smart" array, that includes some additional memory and/or logic circuitry with which operations on one or more outputs of the sensor cells may be performed. In some embodiments, each sensor pixel in the sensor array may be coupled with the memory and/or logic circuitry, which may or may not be part of the peripheral circuitry 214 (discussed in more detail below). The output of the sensor array unit 212 and/or peripheral circuitry may include outputs in addition to or as an alternative to the raw sensor readings of the sensor cells. For example, in some embodiments, the sensor array unit 212 and/or peripheral circuitry can include dedicated CV computation hardware configured to receive image data from a sensor array of the sensor array unit 212 comprising more than one sensor pixel. CV features can then be computed or extracted by the dedicated CV computation hardware using readings from neighboring sensor pixels of the sensor array, providing outputs such as a computed HSG and/or an LBP feature, label, or descriptor. In some embodiments, no image signal processing circuitry may be disposed between the sensor array unit 212 and the dedicated CV computation hardware. Put differently, dedicated CV computation hardware may receive raw sensor data from the sensor array unit 212 before any image signal processing is performed on the raw sensor data. Other CV computations are also possible based on other CV computation algorithms including edge detection, corner detection, scale-invariant feature transform (or SIFT), speeded up robust features (SURF), histogram of oriented gradients (HOG), local ternary patterns (LTP), etc., as well as extensions of any of the above.

The synchronicity (or asynchronicity) of the sensor array unit 212 may also depend on desired functionality. In some embodiments, for example, the sensor array unit 212 may comprise a traditional (i.e., "frame-based") camera with readout circuitry timed to provide periodic sampling of each pixel based on certain timing requirements. In some embodiments, the sensor array unit 212 may comprise an event-driven array by which sensor output may be determined by when a sensor reading or other output reaches a certain threshold and/or changes by a certain threshold, rather than (or in addition to) adhering to a particular sampling rate. For a "smart" array, as discussed above, the sensor reading or other output could include the output of the additional memory and/or logic (e.g., an HSG or LBP output from a smart sensor array). In one embodiment, a smart sensor array can comprise a dynamic vision sensor (DVS) in which, for each pixel in the smart sensor array, a pixel value is asynchronously output when the value changes from a previous value by a threshold amount. In some implementations, the sensor array unit 212 can be a hybrid frame-event-driven array that reads values out at a given frame rate, but saves electrical power by only reading out values for elements in the array that have changed since the previous read-out.

The peripheral circuitry 214 can also vary, depending on the desired functionality of the electronic sensor. The peripheral circuitry 214 can be configured to receive information from the sensor array unit 212. In some embodiments, the peripheral circuitry 214 may receive information from some or all pixels within the sensor array unit 212, some or all of the in-pixel circuitry of the sensor array unit 212 (in implementations with significant in-pixel circuitry), or both. In embodiments where the sensor array unit 212 provides a synchronized output, for example, peripheral circuitry can provide timing and/or control operations on the sensor array unit output (e.g., execute frame-based and/or similar timing). Other functionality provided by the peripheral circuitry 214 can include an event-queuing and/or processing operation, analog processing, analog-to-digital conversion, an integration operation (e.g. a one- or two-dimensional integration of pixel values), CV feature computation, object classification (for example, cascade-classifier-based classification or histogram-based classification), or histogram operation, memory buffering, or any combination thereof, "pixel block value summation," "neighboring pixel value comparison and thresholding," "vector dot product computation," and the like. Means for performing such functionality can include, for example, peripheral circuitry 214, in various implementations. In some embodiments, the peripheral circuitry 214 is coupled to the sensor cell outputs of the sensor array unit 212 and does not include a microprocessor or other processing unit. Some examples of peripheral circuitry 214 are included herein below, with regard to FIG. 2B.

That said, some embodiments can further include a microprocessor 216 coupled to the output of the peripheral circuitry 214. The microprocessor 216 generally can comprise a processing unit that operates on relatively low power, relative to the main processor 220. In some implementations, the microprocessor 216 can further execute computer vision and/or machine-learning algorithms (which can be frame- and/or event-based) using its own program (for example, software-based) and data memory. Thus, the microprocessor 216 is able to perform computer vision and/or machine learning functions based on input received by the sensor array unit 212 while the main processor 220 operates in a low-power mode. When the microprocessor 216 determines that an event requiring output to the main processor 220 has taken place, the microprocessor 216 can communicate an event to the main processor 220, which can bring the main processor 220 out of its low-power mode and into a normal operating mode.

Optionally, in some embodiments, the output of the microprocessor 216 may further be provided to memory 218 before being relayed to the main processor 220. In some implementations, memory 218 may be shared between microprocessor 216 and main processor 220. The memory 218 may include working memory and/or data structures maintained by the microprocessor 216 on the basis of which events or triggers are sent to the main processor 220. Memory may be utilized, for example, in storing images, tracking detected objects, and/or performing other operations as discussed in more detail below with regard to FIG. 2B. Additionally or alternatively, memory 218 can include information that the main processor 220 may query from the sensor system 210. The main processor 220 can execute application software, algorithms, etc. 222, some of which may further utilize information received from the sensor system 210.

As previously noted, the ability of the sensor system 210 to perform certain functions, such as image processing and/or computer vision functions, independent of the main processor 220 can provide for vast power, speed, and memory savings in an electronic device that would otherwise have to utilize the main processor 220 to perform some or all of the functions of the sensor system 210. In particular, the combination, of the sensor array unit 212, peripheral circuitry 214, and microprocessor 216 allow scene understanding that is capable of detecting, in a dynamically changing scene captured by the image array, an occurrence.

In one example, a mobile phone having the configuration shown in FIG. 2A, can use facial detection to exit out of a standby mode. In this example, the mobile phone enters into a standby mode in which a display of the mobile phone is powered down, and the main processor 220 operates on a low-power sleep mode. However, the sensor system 210 with an image array as the sensor array unit 212 continues to operate, processing data from the sensor array unit 212 as objects enter and exit the image array's field of view. When a face enters the field of view of the image array (such as in FIG. 1, when the face of the user 130 enters into the field of view 110 of the mobile device 105), it may be detected by the sensor array unit 212, the peripheral circuitry 214, the microprocessor 216, or any combination thereof. If the detected face remains in the field of view of the image array for a threshold period of time (e.g., 0.5 seconds, 1 second, 2 second, etc.), the microprocessor 216 can send an a facial-detection event to the main processor 220, indicating that a face detection has occurred. The main processor 220 and the display of the mobile phone can then switch back to normal operating mode.

As noted elsewhere herein, an event can be an indication that one or more reference occurrences have occurred. Put more generally, events can include data related to a reference occurrence. Depending on desired functionality, the data included in an event can be indicative of a detected reference object, location information related to the reference object, number of reference objects, movement associated with detected reference object, and the like. This data may be conveyed in any of a variety of ways. For example, in the case of object detection, an event can be a simply binary output where "0" means the reference object has not been detected, and "1" means the reference object has been detected.

An event may include information other than an indication that a reference occurrence has occurred. For instance, an event may also include some data associated with the reference occurrence. In some embodiments, an event may include an n-bit/byte message, or multi-field message, where each bit or field is mapped to a specific piece of data. For example, an event may include an output where the first bit/field indicates whether an object has been detected, the second bit/field indicates whether the object is moving or stationary, the third bit/field relates the location of the object (or location-related information, such as four corners of a minimal box bounding the object, or location of a corner of the object, etc.), the fourth bit/field relates how many objects are detected, etc. In general, the event could include any data, including the hardware-computed CV features, or the image, in any way associated with the reference occurrence, including measurements or computations related to the reference occurrence, above the mere reference occurrence.

Depending on desired functionality, the reference occurrence may include any of a variety of triggers, such as a face or other object detection event, gesture event, face and/or reference object detection and/or recognition, and the like. Face detection, which can be implemented using any of a variety of face-detection algorithms, can include the coming into view of a human face or a non-human animal face (e.g., dog, cat, or other pet), or the coming into view of a human body or non-human animal body. Such "coming into view" of an object can be a result of movement of the object and/or movement of the camera. A reference occurrence may go beyond facial detection to determine an emotion or other expression of a human face from an analysis of various facial features and/or position of those features indicative of the expression. Additionally or alternatively, a reference occurrence may include detection and/or recognition of additional objects and/or object movements, such as a coming into view of a human hand, a hand gesture, a coming into view of a reference object (such as a certain object, a logo, or other reference object), and the like. In some embodiments, a sensor system 210 may be preconfigured to detect certain reference objects. Additionally or alternatively, an object for detection and/or recognition by the sensor system 210 may be selectable by a user and/or application executed by the main processor 220. A reference occurrence may include detected environmental changes, such as a change from an indoor environment to an outdoor environment, a reference movement, rapid movement in a scene (e.g., indicating a fall), motion toward an object (e.g., indicating a risk of collision), movement or objects in a scene indicating danger (e.g., a fire for fire detection), or any combination thereof. In some implementations, a reference occurrence may be related to, or based on, the detection of a reference object, as described in further detail below in FIG. 2B and elsewhere herein. In some implementations, once a reference object is detected in an image frame, the microprocessor 216 can check to see if the same object is subsequently detected in a subsequent image frame. The microprocessor 216 can use location information and other data associated with the detected object received from the peripheral circuitry 214, or generated by the microprocessor 216 itself, to determine the occurrence of the reference occurrence, which can be based on the detection of the reference object. Referring again to the example of facial detection in the previous paragraph, facial detection (reference occurrence) may take place if the detection of a face (reference object) remains in the field of view of the image array for a threshold period of time, resulting in a corresponding facial-detection event being sent to the main processor 220.

FIG. 2B illustrates an example implementation sensor system, such as the sensor system 210 of FIG. 2A, including a sensor array unit, CV computation hardware, and microprocessor that includes an interface for communication with a second microprocessor. The sensor array unit 212 may include a correlated double sampling circuit. The sensor array unit 212 may also include circuitry to combine, sum or average sensor element or pixel signals or values before outputting the signals to line buffer(s) 230, for example in implementations where CV computation is improved using combined pixel values or a lower resolution. Line buffer(s) 230 may include one or more line buffers to transfer signals representing the image or portions of the image out of the sensor array unit 212 to other portions of the vision sensor. In some implementations, the sensor element array 212, unlike more conventional sensor array units, may not include circuitry for image signal processing (ISP), and hence, FIG. 2B illustrates an implementation where the sensor array unit 212 and CV computation hardware 242 are connected without intervening ISP circuitry, hence, in some implementations, no ISP circuitry is disposed between the sensor array unit 212 and the hardware scanning window array 238 or dedicated CV computation hardware 242. For example, in some implementations, the signals received by the CV computation hardware 242 from the sensor array unit 212 have not undergone ISP. For instance, the signals have not undergone one or more of defect correction, white balancing, color balancing, auto focus, lens roll off, demosaicing, debayering, or image sharpening, or any combination thereof. However, in some such no-ISP implementations, some processing may occur, such as focusing or auto-exposure correction. Such signals that have not undergone ISP may be referred to as raw signals, raw sensor readings, or raw sensor data. Raw signals, raw sensor readings, or raw sensor data can be converted to digital, integrated to form an integral image, stored in a scanning window and dedicated CV computation hardware can be configured to receive the raw signals, raw sensor readings, or raw sensor data, even though it is understood that the raw signals, raw sensor readings, or raw sensor data has undergone some data manipulation (including summation or integration), but have not undergone ISP. In one implementation, the sensor array unit 212 is a Quarter Video Graphics Array (QVGA) camera sensor without ISP circuitry with the array comprising 216 by 240 sensor elements. In alternative embodiments, the sensor array unit 212 may include or be coupled to ISP circuitry.

In various implementations, the CV computation hardware 242 can perform CV computations in either the digital or analog domain. Therefore, optionally, in digital implementations, an analog-to-digital converter (ADC) 234 may be disposed between the line buffer(s) 230 and the CV computation hardware 242. In some implementations, the CV computation hardware 242 is dedicated CV computation hardware in the sense that it is hardware designed to have little or no functionality other than to compute CV features, labels, or descriptors.

In some implementations, the CV computation hardware 242 may use combinations, sums, or averages of signals associated with blocks of sensor elements or pixels. In such implementations, an integral image can be useful in computing such combinations, sums, or averages prior to input into the CV computation hardware 242. For example, for summing more than four pixels (e.g., for blocks greater than 2×2, such as 3×3 or 11×11), summation can be much faster using an integral image since only four values need to be added or subtracted to determine the sum of pixel values in an integral image, rather than sum 9 or 121 values for respective 3×3 or 11×11 image blocks. Therefore, optionally, the vision sensor may also include two dimensional integration hardware 236 for computing an integral image of at least a part of the image based on at least a subset of the signals representative of the image sampled by at least a subset of sensor elements (e.g., pixels) in the sensor array unit. As illustrated, the two-dimensional integration computation hardware 236 can be in communication with the dedicated CV computation hardware 242. As previously noted integral image representative of the image sampled by the sensor array unit and/or the integral image of a portion of the image sampled by the sensor array unit can be used to more quickly combine, sum, or average signal values for blocks of sensor elements compared to adding the signal values directly. Two dimensional integration hardware 236 can include circuitry capable of generating signals representative of the integral image of all or a portion of the image sampled by sensor array unit in either the digital or analog domains based on raw signals from the sensor array unit 212. In some implementations, the integral image (which may be an integral image of only a portion or sample window of the image sampled by the sensor array unit) generated by the two dimensional integration hardware 236 can be stored in a hardware scanning window array 238, as illustrated in FIG. 2B. For example, the hardware scanning window array may include a random-access memory (RAM) array or other form of analog or digital memory for storing the integral image. In implementations where computing combinations, sums, or averages of signals corresponding to blocks of sensor elements is not useful, such as pixel-level LBP, it is understood that the two dimensional integration hardware 236 may not be included, and hence a sample window including analog raw signals from the sensor array unit 230 or converted-to-digital raw signals from the ADC 234 may be stored directly in the hardware scanning window array 238. Furthermore, it is understood that in some implementations, two dimensional integration hardware 236 may also or instead perform one dimensional integration. Similarly, the hardware scanning window array 238 may store a one dimensional integral image corresponding to a sample window of the image captured by the sensor array 230. Use of one dimensional integral images can allow for the computation of multi-block LBP, for example, using rotated blocks in order to detect rotated reference objects, for example, faces. Optionally, a frame buffer (not illustrated) may be used before or after the two dimensional integration hardware 236. In implementations with a frame buffer disposed before the two dimensional integration hardware 236, the entire frame or image can be transferred from the sensor array unit 212 into the frame buffer. The two dimensional integration hardware 236 can then generate integral images of portions or windows of the image stored in the frame buffer and store such windows in the hardware scanning window array 238. Alternatively, the two dimensional integration hardware 236 can integrate the entire image and store the entire integral image in a frame buffer disposed between the two dimensional integration hardware 236 and the hardware scanning window array 238, in which case windows of the integral image stored in the frame buffer can be stored in the scanning window array 238. It is understood, however, that the frame buffer is optional and two dimensional integration hardware 236 can receive data corresponding to windows or portions of the image from the sensor array unit 212 and integrate the windows or portions one the fly and store such integral image windows in the hardware scanning window array 238.

The vision sensor may also include CV computation hardware 242. In some implementations, the CV computation hardware can compute a localized CV feature for a block of one or more subject sensor elements based on, at least in part, signals associated with a plurality of neighboring sensor elements in proximity to the block of sensor elements. For example, in a local binary pattern (LBP) implementation of CV computation hardware, CV computation hardware can include hardware that receives signal values corresponding to raw image signals—or combinations, sums, or averages of raw image signals (generated, for example, using an integral image)—and generates a digital LBP label or vector based on the raw image signals. In implementations where multi-block LBP is computed, the block of one or more subject sensor elements can include a block of m by n sensor elements, for example, 11 by 11 sensor elements. It is also understood that a pixel-level LBP computation may also be made where the block of one or more subject sensor elements for which the localized CV feature is computed is a single subject sensor element. Although the description above referenced CV computation hardware 242 as separate from the dedicated microprocessor 216, it is understood that in some implementations, dedicated CV computation hardware 242 may be implemented in hardware within the dedicated microprocessor 216.

Generating the CV features, such as the LBP labels discussed above, in dedicated hardware can reduce the electrical power of the vision sensor compared to computing the CV features in a processor, for example a general purpose processor such as an application processor or even microprocessor 216. However, the vision sensor may still include a microprocessor 216 coupled to the CV computation hardware 242 to perform functions other than CV feature computation, such as CV-related operations or computations other than CV feature computation, or to perform additional CV feature computation relative to computations performed using CV feature computation hardware 242. The microprocessor 216 receives the hardware-computed CV features from the CV computation hardware 238 and can perform higher-level computer vision operations such as object-class detection (of which face detection can be regarded as a specific case, with other examples including upper torsos, pedestrians, and cars), in which the task is to find the locations and sizes of all objects in an image that belong to a given class, among other computer vision operations. Furthermore, the microprocessor 216 can provide control signals to the line buffer(s) 230, ADC 234, two dimensional integration hardware 236, hardware scanning window array 238, and CV computation hardware 242. In some implementations, to perform the object-class detection or other computer vision operations, the microprocessor 216 may use a cascade classifier algorithm to perform object-class detection, for example face detection. In an optional implementation, further electrical power savings are possible by implementing the cascade classifier in hardware, to further reduce the computational burden on the microprocessor 216.

The optional cascade classifier hardware 244 includes a hardware implementation of a cascade classifier. In some implementations, the cascade classifier is trained using machine learning techniques on a data set of images including examples of the reference object the cascade classifier will be trained to detect or classify and examples of non-objects, for example images of faces and non-faces, or images of cars and non-cars, or images of upper torsos and non-upper torsos, etc. For example, in a first stage, the cascade classifier hardware may request the CV computation hardware 242 to compute LBP features for a certain number, l, of subject sensor elements stored in, for example, the hardware scanning window array 238. In addition, the location of the subject sensor elements, $\{(x_{11}, y_{11}), \ldots (x_{1l}, y_{1l})\}$, will also be provided by the cascade classifier hardware 244. Once the CV computation hardware 242 computes and provides the requested LBP features, which can be treated as vector values, the cascade classifier hardware performs a summation of a dot product of each of the LBP features with one or more weights to generate a first weighted scalar sum value. In general, each LBP feature, $(LBP_{11}, \ldots, LBP_{1l})$ will be multiplied by a given weight, $(w_{11}, \ldots, w_{1l})$, each of which can be different. The first weighted scalar sum value is then compared to a first threshold. If the scalar sum is less than the threshold, then to a given probability, there is no reference object in the portion of the image represented by the signals stored in the hardware scanning window array 238, and hence the cascade classifier hardware 244 sends a signal to the hardware scanning window array 238, and optionally to other components of the vision sensor, such as the line buffer(s) 230 and the sensor array unit 212, to indicate that the hardware scanning window array 238 should continue scanning and add one or more new columns and/or rows and remove one or more old columns and/or rows. With a subsequent window of the image, or a subsequent plurality of signals corresponding to a subsequent subset of sensor elements of the sensor array unit, stored in the hardware scanning window array 238, the process can begin anew. It is understood that the subsequent window of the image may overlap in large part with the previous window of the image. In some implementations, the image is scanned from left to right, and once the end of the sensor array unit 212 is reached, the image may be scanned again from left to right after moving down one or more rows. In another implementation, the image may be scanned from right to left after shifting down by one or more rows, which may allow for an increased overlap with the prior image.

If the scalar sum is instead greater than the first threshold, then the cascade classifier hardware 244 moves to the next stage. In the next (in this example, second) stage, the cascade classifier hardware again requests the CV computation hardware 242 to provide LBP features for m subject sensor elements at locations $\{(x_{21}, y_{21}), \ldots (x_{2m}, y_{2m})\}$ stored in the hardware scanning window array 238. Once the CV computation hardware 242 computes and provides the requested LBP features, $(LBP_{21}, \ldots, LBP_{2m})$, the cascade classifier hardware 244 performs another summation of a dot product of each of the LBP features with one or more weights, $(w_{21}, \ldots, w_{2m})$, to generate a second weighted scalar sum value. The second weighted scalar sum value is then compared to a second threshold. If the scalar sum is less than the second threshold, there is a low likelihood of a reference object being present in the portion of the image represented by the signals stored in the hardware scanning window array 238, and the cascade classifier sends a signal to the other components in the vision sensor array to continue scanning and move to a next portion of the image. If the second weighted scalar sum value is greater than the second threshold, the process continues to a third stage as described above. At the end of a final stage, for example an Nth stage in an N-stage cascade classifier, if the Nth weighted scalar sum value is greater than the Nth threshold, then a reference object is detected in the portion of the image stored in the hardware scanning window array 238. The cascade classifier hardware 244 can then indicate to the microprocessor 216 that the reference object has been detected, and may further optionally indicate the location of the portion of the image in which the reference object, or portion of reference object, was detected. In general, the cascade classifier hardware 244 can be configured to send an indication to the microprocessor 216 that the reference object was detected along with data associated with the reference object, such as the all or some of the CV features computed in the process of detecting the reference object, the location within the image of those CV features, or any other data associated with the computations or operations performed by the CV computation hardware 242 and/or the cascade classifier hardware 244.

The numbers and locations of subject sensor elements within the hardware scanning window array 238 for which LBP features, labels, or vectors is to be computed at each stage is generally programmed into the cascade classifier hardware 244 and result from the machine learning training discussed above. Similarly, the weights to multiply to each of the LBP features are also generally determined during machine learning training and then programmed into the cascade classifier hardware 244. The number of stages also results from the training, and is programmed into the cascade classifier hardware 244. In some implementations, a cascade classifier can include between 1 and 31 stages, for example, 16 stages. In some implementations, a cascade classifier can include between 1 and 31 stages, for example, 16 stages. Cascade classifier hardware 244 can, in some implementations, be considered dedicated cascade classifier hardware in the sense that it is hardware designed to perform the cascade classifier function and little to no other significant functions. While the implementation described above relates to a cascade classifier based on programmed weights and thresholds based on previous, in the laboratory, training and machine learning to generate a model, it is understood that cascade classifier hardware 244, or other hardware in peripheral circuitry designed to perform CV operations based on hardware-computed CV features received from CV computation hardware 242, can be designed to perform machine learning in the field.

In the implementations just described, the microprocessor 216 can then determine what to do with the, for example, reference object detected event. For example, it may send an event to a second microprocessor. In some implementations, the microprocessor 216 and the second microprocessor may correspond to microprocessor 216 and the main processor 220 of FIG. 2A. As illustrated in FIG. 2B, the microprocessor 216 includes an interface 246 for communications with the second microprocessor. Additionally or alternatively, the microprocessor 216 might track a position of the detected reference object over time (e.g., over multiple images) to determine movement for gesture recognition, risk of collision, danger, and/or other events, for example.

More generally, some embodiments can enable a wide range of functionality by first detecting an object then determining other features. On such embodiments, object detection may be made via peripheral circuitry (e.g., cascade classifier hardware 244 and/or other dedicated hardware), and additional operations may be performed by a microprocessor 216. For instance, a coming into view of an object may be determined first by detection of the object, then (e.g., using a microprocessor) a determination that the object has been in the camera's field of view for a threshold period of time. Gesture detection, as noted above, may be made by detecting a gesture-control object (e.g., a hand), then determining the movement of the hand. Risk of collision may be made by detecting an object and determining movement indicative of risk of collision with the object (e.g., by the camera, by a second object within the camera's field of view, etc.). A person of ordinary skill in the art will recognize that embodiments may include any combination of the features above, and/or variations on these features.

Although the description above referenced cascade classifier hardware 244 as separate from the microprocessor 216, it is understood that in some implementations, the cascade classifier hardware 244 may be implemented in hardware within the microprocessor 216. Also, cascade classifier hardware 244 can, in some implementations, be given some controlling functionality to allow it to, as illustrated, control CV computation hardware 242 and hardware scanning window array 238. As such, the cascade classifier hardware 242 can detect features autonomously from microprocessor 216, and hence microprocessor 216 can be in a low-power state while cascade classifier hardware 244 performs its functions. As such, the smart sensor can perform lower-power operations based on the one or more computed CV features, and when an object, for example, is detected, cascade classifier hardware 242 can provide an event, including data such as a sensor reading to the microprocessor 216, to awaken the microprocessor 216. Microprocessor 216 can then determine the next course of action, for example sending an event to a second microprocessor through interface 246. It is understood that even in the low-power state, microprocessor 216 can, in some implementations, still provide control signals to sensor array unit 212, line buffer(s) 230, etc., or, alternatively or additionally, such control signals may be provided by lower power control logic. Alternatively, a cascade classifier may be run as a software algorithm on the microprocessor 216. Furthermore, other software algorithms may be run on the microprocessor in the place of the cascade classifier. For example, reference object detection may be performed using histograms, as described in FIG. 11C. In some such implementations, a histogram of all LBP labels computed for a sample window of the image stored in the scanning window array 238 can be compared to a reference histogram to detect the presence of a face in the sample window stored in the scanning window array 238. In some implementations, dedicated hardware may be implemented to detect, for example, a face using histograms. Such an implementation may include such dedicated hardware in the place of, or in addition to, cascade classifier hardware 244.

In the implementation illustrated in FIG. 2B, one or more of the line buffer(s) 230, the ADC 234, the two dimensional integration hardware 236, the hardware scanning window array 238, the CV computation hardware 242, the cascade classifier hardware 244, or any combination thereof, may be considered peripheral circuitry, that is circuitry that is peripheral to the sensor array unit 212 and may correspond to peripheral circuitry 214 of FIG. 2A. It is also understood that the various components just listed, or any combination thereof, may be implemented instead as in-pixel circuitry within the sensor array unit 212.

Figure 3A:
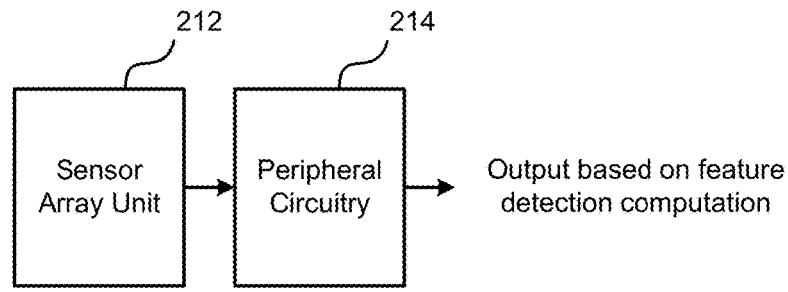
FIGS. 3A-3C are block diagrams illustrating how components of a sensor system can be utilized to provide low-power sensor processing, according to some embodiments.
Figure 3B:
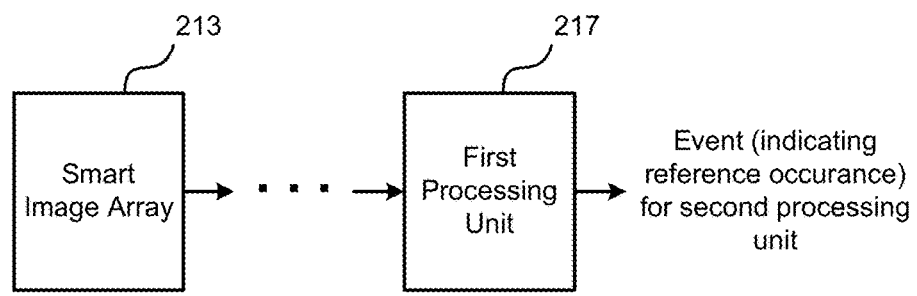
Figure 3C:
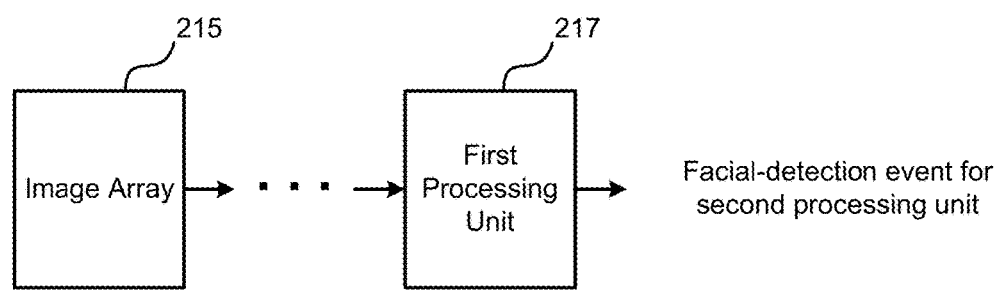

FIGS. 3A-3C are block diagrams illustrating how components of a sensor system 210 can be utilized to provide low-power sensor processing. Here, only certain components are illustrated. It will be understood that the sensor system may have additional components, as shown in FIGS. 2A and 2B.

In FIG. 3A, peripheral circuitry 214 is coupled with a plurality of sensor cell outputs of a sensor array unit 212. The sensor array unit 212 and/or peripheral circuitry 214 include dedicated CV computation hardware to perform a feature detection computation using at least a subset of the plurality of sensor cell outputs, where the subset of the plurality of sensor cell outputs correspond to a region of the sensor array unit 212 (e.g., an image array) comprising neighboring sensor cells or pixels. Thus, the output of the peripheral circuitry 214 is based (at least partially) on the feature detection computation. Such feature detection computation can include any of a variety of computations using neighboring sensor cells or pixels of the sensor array unit 212 that can provide for feature detection (e.g., edge detection, line detection, etc.). Such feature detection computations include, for example, LBP, HSG, and the like. In some embodiments, the dedicated CV computation hardware may comprise an integrated circuit.

In FIG. 3B, a first processing unit 217 is communicatively coupled with one or more outputs of a smart image array 213, in which multiple sensor pixels are coupled with memory and/or logic circuitry. Here, the first processing unit 217 may correspond to the microprocessor 216 of FIGS. 2A and 2B, and the smart image array 213 may correspond to the sensor array unit 212 of FIGS. 2A and 2B. The smart image array 213 may include dedicated CV computation hardware for computing CV features computed using readings from neighboring sensor pixels, as described above in regard to FIG. 3A and/or FIG. 2B. As shown in FIGS. 2A and 2B, these two components may not be directly coupled to each other, but may have intervening circuitry. The first processing unit 217 processes signals received from the one or more outputs of the smart image array to detect a reference occurrence. The first processing unit 217 then generates an event, indicating the reference occurrence, to be received by a second processing unit (e.g., the main processor 220 of FIG. 2A).

The event can be generated based on processing signals resulting from operations that are based on one or more computed CV features. Such operations can include, in some implementations, operations or computations performed by the cascade classifier (e.g., cascade classifier hardware 244 of FIG. 2B) to detect a face. The event being generated based on processing signals resulting from those operations may therefore include the microprocessor processing a signal, such as an indication from the cascade classifier, that a reference object was detected. The indication may include data associated with the detected object, such as the location, associated LBP features and their locations, and/or the image data itself. This enables the microprocessor to conserve energy by not analyzing image data when no reference object is detected.

In FIG. 3C, the setup is similar to FIG. 3B. Here, a first processing unit 217 is communicatively coupled with one or more outputs of an image array 216. Again, the first processing unit 217 may correspond with the microprocessor 216 of FIGS. 2A and/or 2B, and the image array 216 may similarly correspond with the sensor array unit 212 of FIGS. 2A and/or 2B. In this embodiment, however, the first processing unit 217 determines that a face has been detected and generates the face-detection event for a second processing unit. Depending on desired functionality, the first processing unit 217 may be operable to detect a face using the one or more signals received from the one or more outputs of the image array 216.

Figure 4:
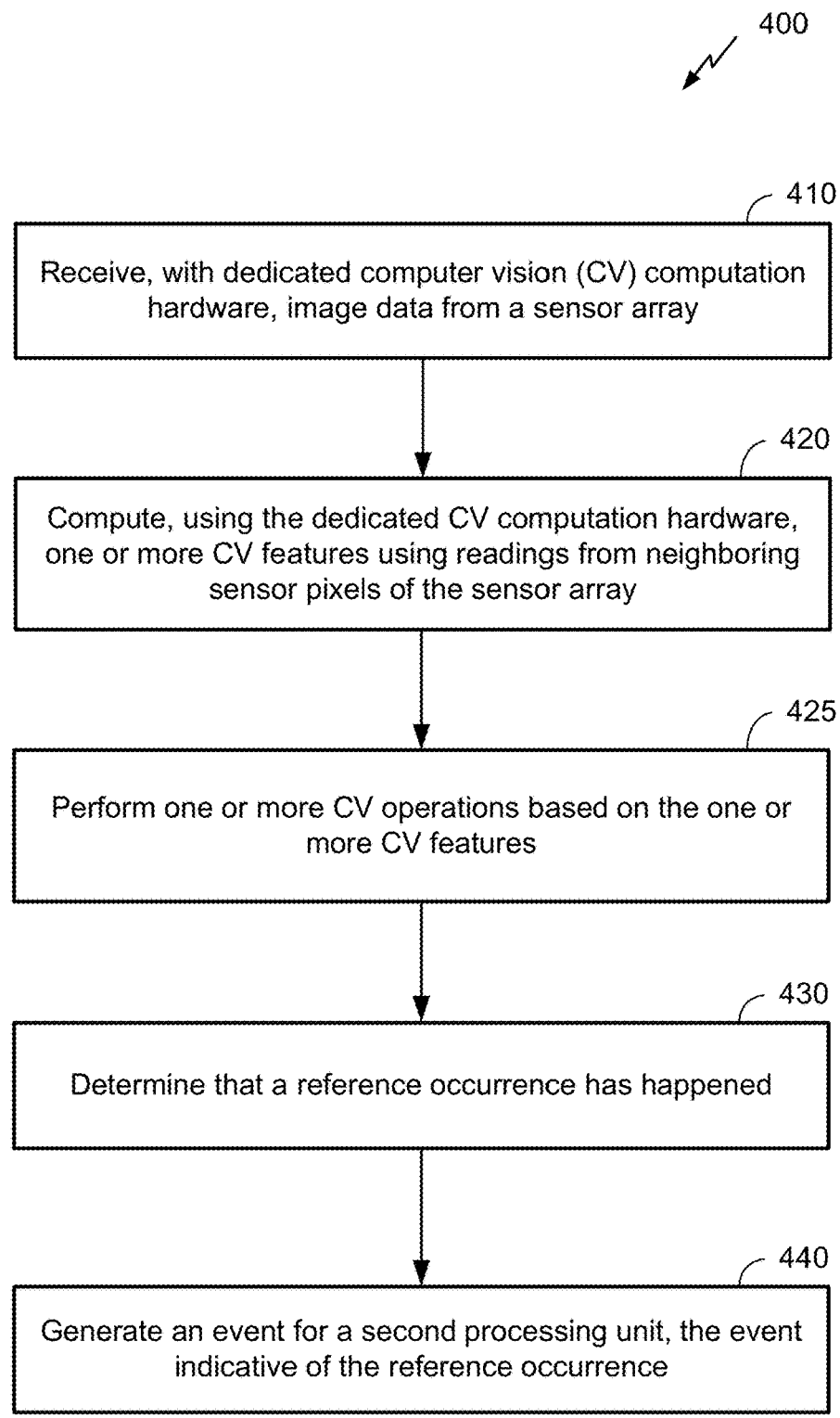
FIG. 4 is a flow diagram of a method of sensing dynamic scene-based occurrences, according to an embodiment.

FIG. 4 is a flow diagram illustrating a method 400 of sensing dynamic scene-based occurrences, according to an embodiment. As with other figures provided herein, FIG. 4 is provided as a non-limiting example. Alternative embodiments may include additional functionality to that shown in the figure, and/or the functionality shown in one or more of the blocks in the figure may be omitted, combined, separated, and/or performed simultaneously. Means for performing the functionality of the blocks may include one or more hardware and/or software components of an electronic device, such as one or more components of the mobile device illustrated in FIG. 5 and described below. A person of ordinary skill in the art will recognize many variations.

The method 400 can begin at block 410, where dedicated CV hardware receives image data from a sensor array. The image data can include sensor readings from a plurality of image pixels of the sensor array. As previously indicated, the dedicated CV hardware may be implemented in and/or incorporated into the sensor array unit 212 and/or peripheral circuitry 214 of FIG. 2A. (The sensor array can be included in the sensor array unit 212.)

At block 420, one or more CV features is computed by the dedicated CV computation hardware using readings from neighboring sensor pixels of the sensor array. Here, CV features can include edges, lines, and the like, which may be computed using, for example, LBP, HSG, and/or other computations. The usage of the dedicated CV computation hardware can enable quick and efficient computations without the need to use comparatively higher amounts of electrical power.

At block 425, one or more CV operations are performed based on the one or more CV features. As previously noted, such operations can occur in peripheral circuitry. For example, as described in relation to FIG. 2B a cascade classifier may perform operations to detect a face or other object, and provide a signal indicative of the detection of the face or other object to a microprocessor. As noted below, however, performing CV operations based on one or more CV features can be performed by either or both peripheral circuitry (e.g., dedicated hardware) and/or a microprocessor. The hardware and/or software components performing the CV operations can produce output signals (e.g., an output of a cascade classifier, signals indicating the LBP computations received directly from the CV computation HW, signals internally generated within the microprocessor, etc.). The microprocessor may use one or more of these signals to determine a reference occurrence (e.g., face detection) has happened.

At block 430, it is determined that a reference occurrence has happened. As indicated previously, a reference occurrence can include one or more of a variety of events. These can include, for example, a coming into view of a human face, an emotion expressed on a human face, coming into view of an non-human animal face, coming into view of a human hand, a hand gesture, a coming into view of a reference object, a change from an indoor environment to an outdoor environment, a reference movement, rapid movement in a scene indicating a fall, motion toward an object indicating a risk of collision, movement or objects in a scene indicating danger, or any combination thereof. In some embodiments, these reference occurrences may be predefined and/or user configurable.

At block 440, an event for a second processing unit is generated, where the event is indicative of the reference occurrence. As used herein, the term "event" describes information provided to a processing unit, indicative of a reference occurrence. Here, the event is provided to a second processing unit. In some embodiments, the event may simply include an indication that a reference occurrence has happened. In some embodiments, the event may further include an indication of the type of reference occurrence that was detected. The event may be generated by the first processing unit and sent to the second processing unit. In some embodiments, there may be intervening circuitry between the first and second processing units.

It can be noted that the functionality performed by the various blocks illustrated in FIG. 4 can be performed by various components of a sensor system (e.g., sensor system 210 of FIGS. 2A and 2B), depending on desired functionality. The functionality of block 410 and 420, for example, may be performed by in-pixel or peripheral circuitry (e.g., CV computation hardware). The functionality of block 425, for example, may be performed by a microprocessor or dedicated hardware (e.g., a cascade classifier or other dedicated hardware). In some embodiments, the functionality of blocks 425, 430, and 440 may all be performed by a microprocessor. Alternatively, some embodiments may perform the functionality of block 425 with peripheral circuitry, and the functionality of blocks 430 and 440 with a microprocessor. A person of ordinary skill in the art will recognize several variations.

Referring again to FIG. 2A, embodiments of the sensor system 210 described herein can further perform different types of functions, such as lower-power operations and higher-power operations, which relate to power or energy consumption used in respective lower-power and higher-power modes. In the higher-power mode, for example, the sensor system may provide image processing capabilities within the sensor system 210 itself by utilizing dedicated CV computation hardware as described herein. It is understood that the use of "lower-power" and "higher-power" herein is intended to be relative. In other words, even in the higher-power mode, the sensor system described may still be capable of performing powerful CV-based computations based on hardware-computed CV features using less electrical power than performing those same CV-based computations with a microprocessor running CV algorithms in software. As detailed previously, dedicated CV computation hardware can include in-pixel circuitry integrated into the sensor array unit 212, which may include circuits for some or all pixels, capable of performing processing on each respective pixel, such as detecting a sensed light intensity relative to one or more neighboring pixels, detecting edges of objects based on differences in colors or intensities of sensed light with respect to neighboring pixels, and/or making LBP, HSG, and/or other CV computations. Dedicated CV computation hardware can further include peripheral circuitry 214, which can be used in addition or alternatively to in-pixel circuitry to perform some or all of these computations. Embodiments may disable, or otherwise operate in a low-power mode, some or all of this dedicated CV computation hardware of the sensor system 210 when higher-power operations are not needed, which can save power. Thus, as described herein, higher-power operations involve dedicated CV computation hardware (e.g., in-pixel circuitry in the sensor array unit 212 and/or peripheral circuitry 214), whereas lower-power operations are performed when some or all of the dedicated CV computation hardware is disabled or in a reduced-power state.

In one example, the sensor system 210 can configure the sensor array unit 212 to operate as a single pixel. In such a case, the sensor system 210 can disable all in-pixel circuits and/or and peripheral circuitry 214. In such a configuration, each of the individual pixels of the array contribute to a single sensed value for the entire sensor array.

Figure 5:
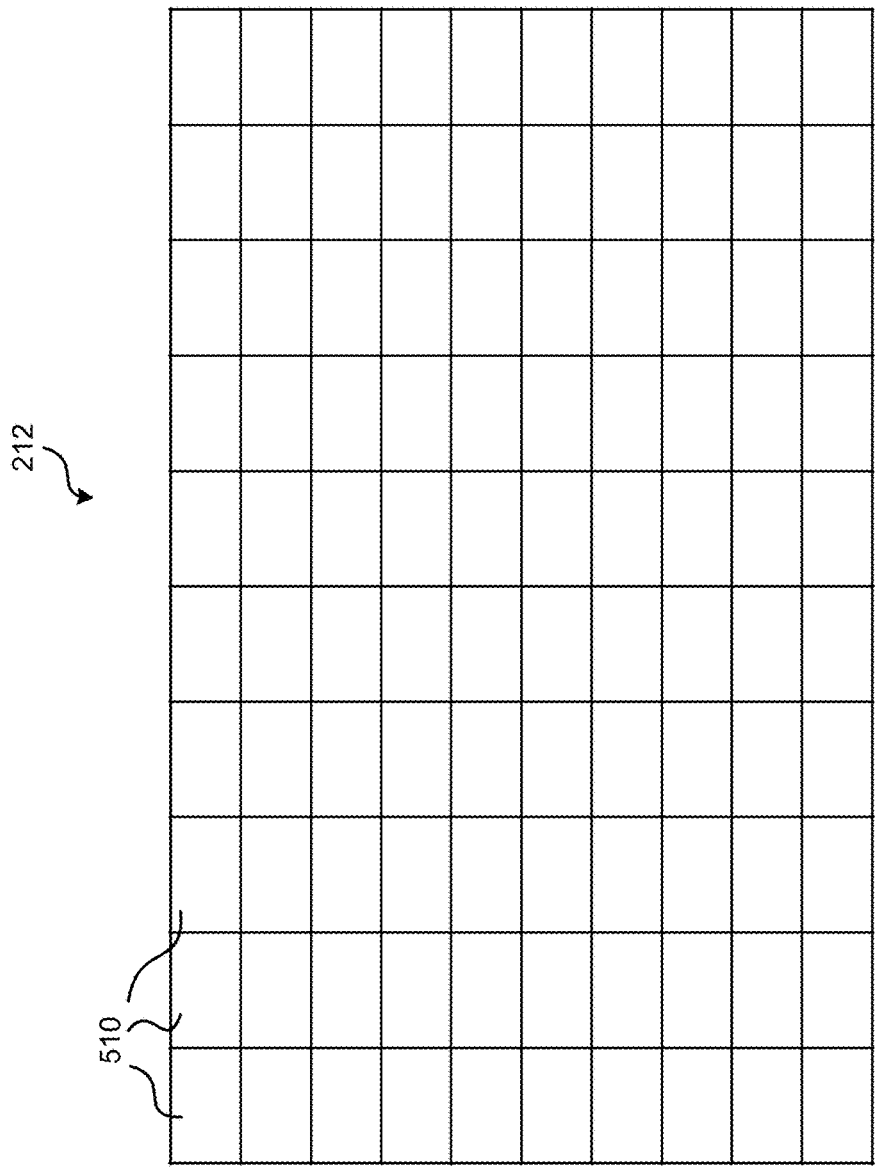
FIG. 5 is a simplified illustration of an example sensor array.

FIG. 5 shows a simplified illustration of the sensor array unit 212 of FIG. 2A. In the sensor array unit 212, pixels 510 are arranged in rows and columns and placed in the focal plane of a receiving optics to provide image capture. (For clarity, only a few pixels 510 in FIG. 5 have numerical labels.) It will be understood that features of the sensor array unit such as pixel size, aspect ratio, resolution, and the like can vary depending on desired functionality. For instance, the simplified illustration of FIG. 5 shows a 10×10 pixel array, but embodiments may have hundreds, thousands, or millions of pixels (or more).

As previously indicated, each pixel 510 may include a sensor as well as in-pixel circuitry to perform CV calculations for the pixel 510. Additionally or alternatively, peripheral circuitry may be included to perform CV calculations for the pixel, as indicated elsewhere herein. Continuing with the example above, one or more components in in-pixel circuitry of the sensor array unit 212 and or peripheral circuitry may be disabled to enable the sensor array unit 212 to perform lower-power operations in a power efficient manner to, for example, turn of all but one pixel, or read and combine sensed values from all pixels to effectively operate as only a single pixel, referred to as a "single-pixel mode." In this configuration, the sensor system 210 is configured to perform one or more lower-power operations, such as ambient light sensing (ALS), proximity detection (PD), proximity to a reference object detection, or motion detection. In some cases each of these functions may be adequately performed using a sensor array having only a single pixel.

Figure 6:
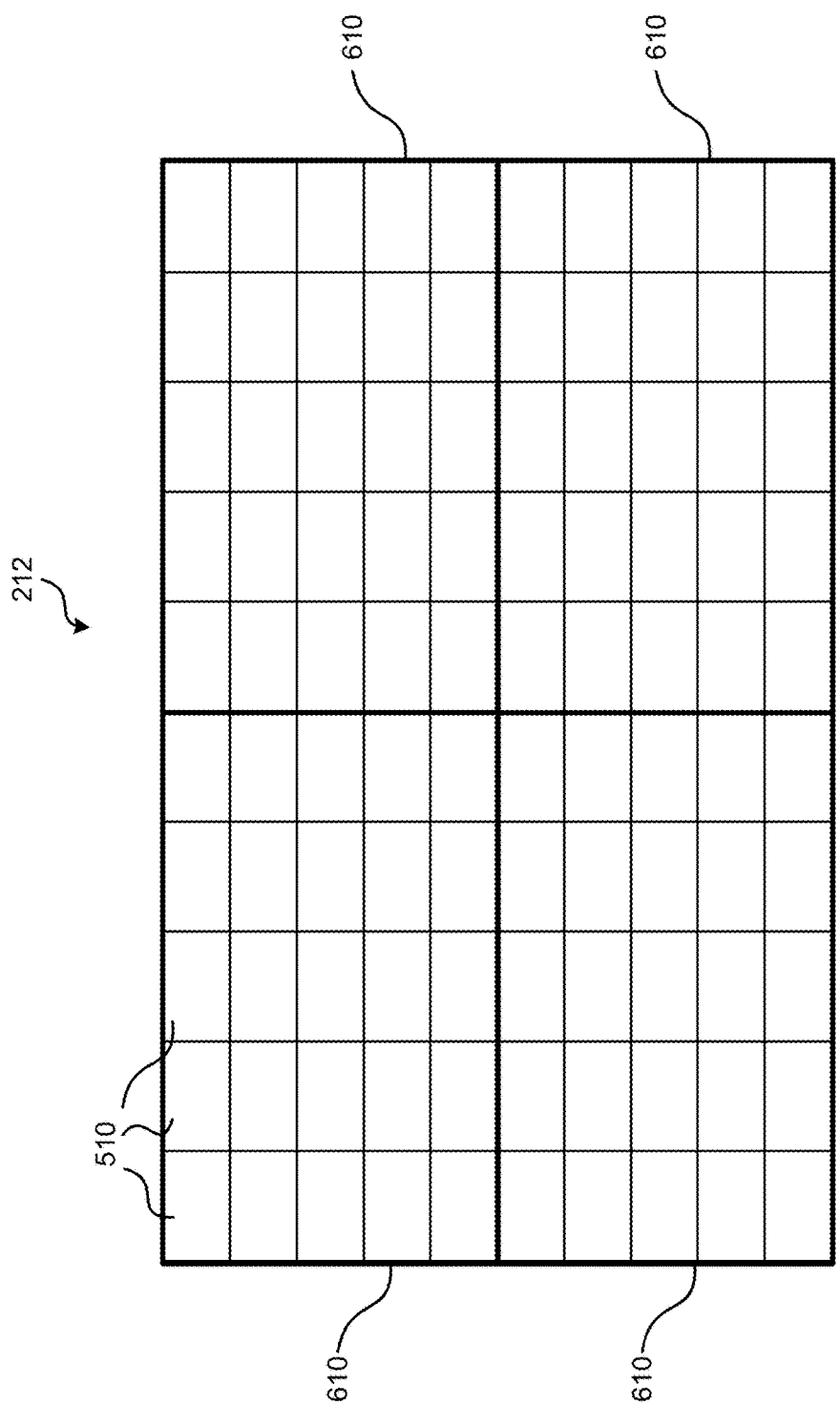
FIG. 6 shows an illustrative configuration of the sensor array of FIG. 5.

Additionally or alternatively the sensor array unit 212 may enable in a lower-resolution configuration in which, rather than effectively operating as only a single pixel, the sensor array unit 212 may operate as a plurality of pixels. As shown in FIG. 6, subgroups 610 of pixels 510 of the sensor array unit 212 can each operate in a manner similar to the single-pixel mode described above, thereby effectively operating as a sensor with multiple pixels (in the configuration of FIG. 6, the four subgroups 610 effectively form a 2×2 pixel array). Again, for example, some or all of the dedicated CV computation hardware of the sensor system 210 (e.g., peripheral circuitry 214 and/or in-pixel circuitry of the sensor array unit 212) can be disabled during this mode. In this configuration, the sensor system 210 may perform one or more lower-power operations, such as ALS, PD, change detection (CD), or motion detection (MD). And while the example of FIG. 6 employs an apparent resolution of 2×2 pixels, other reduced resolutions may be configured. Again, such reduced resolutions may include aggregating multiple individual pixels 510 to operate collectively as a fewer number of pixels, or may include disabling one or more of the pixels 510 in the sensor array unit 212 such that the pixel does not sense light or does not provide an output while it is disabled.

As with the operations described in relation to FIGS. 3A-3C, the sensor system 210 may be configured to detect one or reference occurrences and generate one or more corresponding events while it is performing in a lower-power operation. For example, the sensor system 210 may be incorporated into a mobile phone and configured to detect a reference occurrence when a sensed value for the single pixel 310 indicates a significant increase in an amount of light detected by the sensor system 210. Such a change in the amount of detected light may indicate that the mobile phone has been retrieved from a user's pocket or has been picked up from a table or nightstand. The sensor system 210 can determine, while in lower-power operation, that this reference occurrence happened and generate an event indicative of the reference occurrence for the main processor 220. Upon detecting this event, the sensor system 210 can further activate dedicated CV computation hardware to enable higher-power operation to perform different types of CV operations, such as face detection and face recognition.

Figure 7:
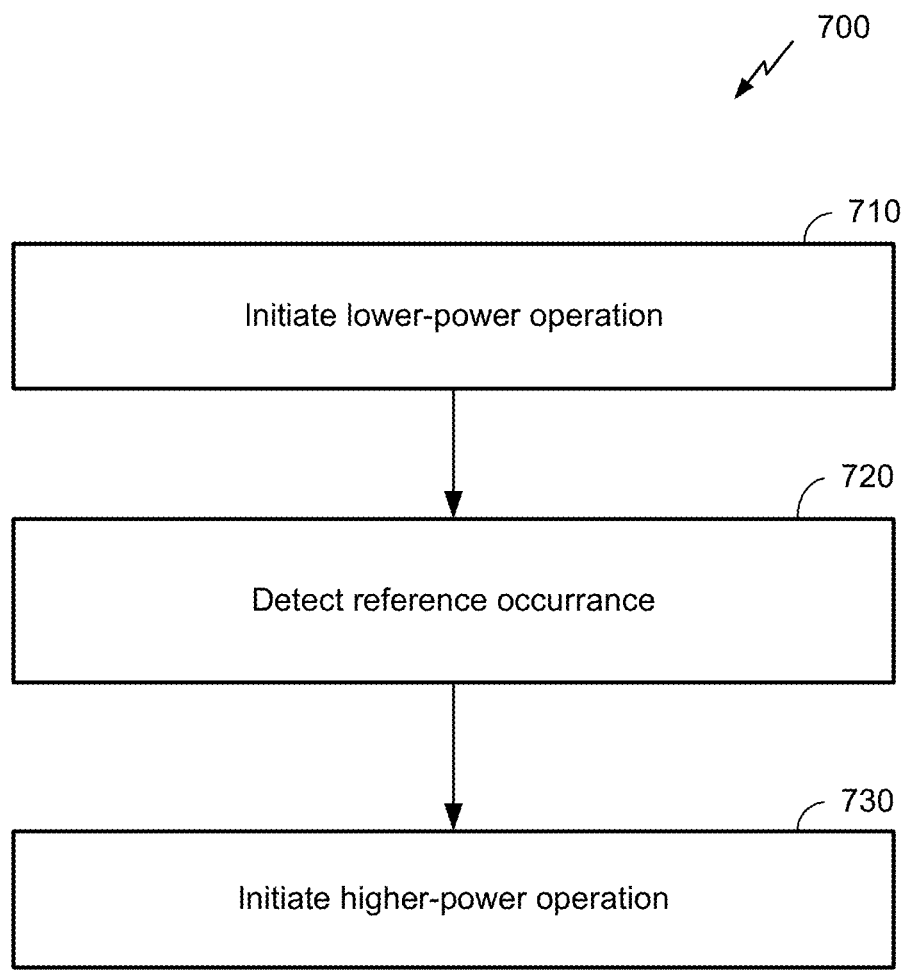
FIGS. 7-9 are flow diagrams illustrating example methods for using a sensor system for computer vision computations and lower-power optical sensor readings.

FIG. 7 is a simplified flow diagram illustrating an example method 700 for using a sensor system as an optical sensor. As with other figures provided herein, FIG. 7 is provided as a non-limiting example. Additionally, the method 700 may apply broadly to embodiments described herein, including the method 400 of sensing dynamic scene-based occurrences shown in FIG. 4. Means for performing the functionality of the blocks illustrated in FIG. 7 may include one or more hardware components of the sensor system, such as the sensor system 210 of FIG. 2A. In some embodiments, means may further include a main processor, such as the main processor 220 of FIG. 2A. And although the method 500 is described below as being performed by the sensor system 210 of FIG. 2A, embodiments are not limited to such a sensor system.

The method 700 can begin at block 710 when the sensor system 210 initiates a lower-power operation. For example, in one aspect, the sensor system 210 initiates one of an ALS operation, a PD operation, CD operation, or a MD operation. In this aspect, the sensor system 210 initiates the lower-power operation by disabling dedicated CV computation hardware, and configures the sensor array unit 212 to operate at a reduced resolution. As discussed above, in different examples, the reduced resolution may include a single-pixel mode. In some embodiments, the sensor system 210 may initiate a plurality of lower-power operations, such as both an ALS operation and a PD operation, a CD operation and MD operation, or all four of an ALS operation, a PD operation, CD operation, and a MD operation. After initiating the lower-power operation, the method 700 proceeds to block 720.

At block 720, while performing the lower-power operation, the sensor system 210 detects a reference occurrence. In one example in which the sensor system 210 is configured to perform an ALS function, the sensor system 210 generates at least one lower-power optical sensor reading, which may be used to detect the reference occurrence. For example, a lower-power optical sensor reading may indicate a change in an amount of ambient light, and the sensor system 210 may detect a reference occurrence based on the lower-power optical sensor reading when a sensed level of light changes at a rate above a reference threshold, or changes color at a rate above a reference threshold.

In another example, the sensor system 210 is configured to perform a PD function. In this example, the sensor system 210 further comprises a light emitter, such as a light emitting diode (LED), and the sensor array unit 212 is configured to detect an amount of reflected light. When the amount of detected reflected light exceeds a threshold, the sensor system 210 detects a reference occurrence. For example, the sensor system 210 may detect a reference occurrence indicating an object is near the sensor system 210. In one aspect, when the amount of detected reflected light is below a threshold, the sensor system 210 may detect a reference occurrence. For example, the sensor system 210 may detect an event that an object is no longer near the sensor system 210.

In one example, the sensor system 210 is configured to perform a CD function. Change detection can detect a change in the scene that exceeds a threshold where such a scene change corresponds to a reference occurrence, for example, as described in block 720 of FIG. 7. With reference to FIG. 2B, in some implementations, hardware scanning window array 238, CV computation hardware 242, cascade classifier 244, and/or dedicated microprocessor 216, or any combination thereof, may be disabled or in a low-power mode. As used here, disabled is intended to indicate that such components are in a reduced power state as their functionality is either not being utilized or their functionality is drastically reduced compared to their normal operation. Therefore, in such a state, the sensor system can operate in a lower-power mode compared to normal operation involving CV feature computation and subsequent CV operations. Pixel values for large blocks of pixels in the sensor array unit 212, for example as illustrated in FIG. 6 blocks corresponding to subgroups 610, can be summed to get a single value representing all pixel values in each block. Such a summation can be computed using an integral image provided by the two-dimensional integration hardware 236 and stored, for example, in an integral image frame buffer (not shown in FIG. 2B). The block summations can then be compared from frame to frame in time. In a given block, if the change in the summation value from a current frame compared to a previous frame is greater than a reference change threshold, then a scene change reference occurrence can be detected. In an alternative implementation, a scene change reference occurrence will be detected only if a reference minimum number of blocks register such a change. For example, in a system with the sensor element array divided into 81 blocks (pixels are grouped into a 9 by 9 array, where each block in the 9 by 9 array includes a subarray of pixels), change in each block can be detected as described above, and a scene change reference occurrence may only be triggered if three, four, or another number of blocks register a change. Upon detecting the scene change, the sensor system 210 can further activate any combination of hardware scanning window array 238, CV computation hardware 242, cascade classifier 244, and/or dedicated microprocessor 216. It is understood that CD operation described above may be implemented without the use of an integral image or two-dimensional integration hardware, but may use other hardware to determine the summed block values.

In one example, the sensor system 210 can be configured to perform a MD function. In this example, the sensor system 210 configures the sensor array unit 212 to have a reduced resolution greater than a 2×2 pixel resolution, but less than a maximum resolution of pixels in the sensor array unit 212. In this example, the sensor system 210 is configured to detect relative changes in sensed light at different effective pixels. In such an example, the sensor system 210 analyzes an amount of light sensed at each of the effective pixels (e.g., subgroups 610 as shown in FIG. 6), determines a first set of differences between the amount of light sensed at each effective pixel relative to at least one other effective pixel. The sensor system 210 then detects a second amount of sensed light at each of the effective pixels, and determines a second set of differences between the amount of light sensed at each effective pixel relative to at least one other effective pixel. The sensor system 210 then determines a change in the differences based on the first set and the second set. The sensor system 210 detects a reference occurrence if the change in the differences exceeds a reference motion threshold. In one aspect, the sensor system 210 may detect a motion event if a first effective pixel indicates a positive change in sensed light relative to a second effective pixel, and subsequently the first effective pixel indicates a negative change in sensed light relative to a second effective pixel.

The detection of the reference occurrence at block 720 can then trigger the initiation of at least one higher-power operation. In block 730, the sensor system 210 initiates a higher-power operation by enabling dedicated CV computation hardware. For example, the sensor system 210 may initiate a face detection operation or a face recognition operation, or a gesture recognition operation. Alternatively, the sensor system 210 may initiate an object detection operation to detect the presence of a reference object in the images captured by the sensor system 210.

In situations where the reference occurrence that triggers the higher-power operation is a PD operation, detection of a reference object in images captured by the sensor system 210 could indicate the proximity of the reference object. Thus, in this example method, the higher-power operation is based on a one-way dependence relationship between the lower-power operation and the higher-power operation. The one-way dependence relationship in this example relates to the higher-power operation only occurring after the lower-power operation detects a reference occurrence.

Further, the higher-power operation may be based on evaluating the at least one lower-power optical sensor reading. For example, as discussed above, the sensor system 210 may perform a lower-power ALS operation and initiate a higher-power operation. In some examples, the higher-power operation may also evaluate the sensor reading from the lower-power ALS operation. For example, a higher-power operation may include a face detection or recognition function. In one aspect, the sensor system 210 may evaluate the ALS sensor reading to determine an ambient light level and adjust an exposure time or an aperture size when performing the face recognition function. Or in some aspects, a PD function may generate a sensor reading that a higher-power operation may evaluate to determine an estimated range to a detected object. In some aspects, the sensor system 210 may initiate other or multiple higher-power operations. In some aspects, the sensor system 210 may repeatedly execute the method 700. For example, after performing a higher-power operation, the sensor system 210 may restart the method 700 and perform the functionality at block 710 by initiating a lower-power operation. Upon detecting the scene change, for instance, the sensor system 210 can further activate any combination of additional components (e.g., hardware scanning window array 238, CV computation hardware 242, cascade classifier 244, and/or microprocessor 216) to perform one or more higher-power operations. The sensor system 210 may then revert back to a lower-power mode once the higher-power operations are performed.

While the method 700 of FIG. 7 has been described as a sequence of lower-power and higher-power operations, in some examples, the sensor system 210 may substantially simultaneously perform both lower-power and higher-power operations. For example, at block 730, after performing the higher-power operation, the sensor system 210 may initiate a lower-power operation but continue to perform higher-power operations. Thus, in some examples, at block 710, while the sensor system 210 is performing a lower-power operation, the sensor system 210 may also be performing additional functions, such as higher-power operations, and by initiating a lower-power operation, the sensor system 210 may not be exclusively performing lower-power operations. Further, when the sensor system 210 initiates a higher-power operation at block 730, the sensor system 210 in some examples may continue to perform lower-power operations.

Figure 8:
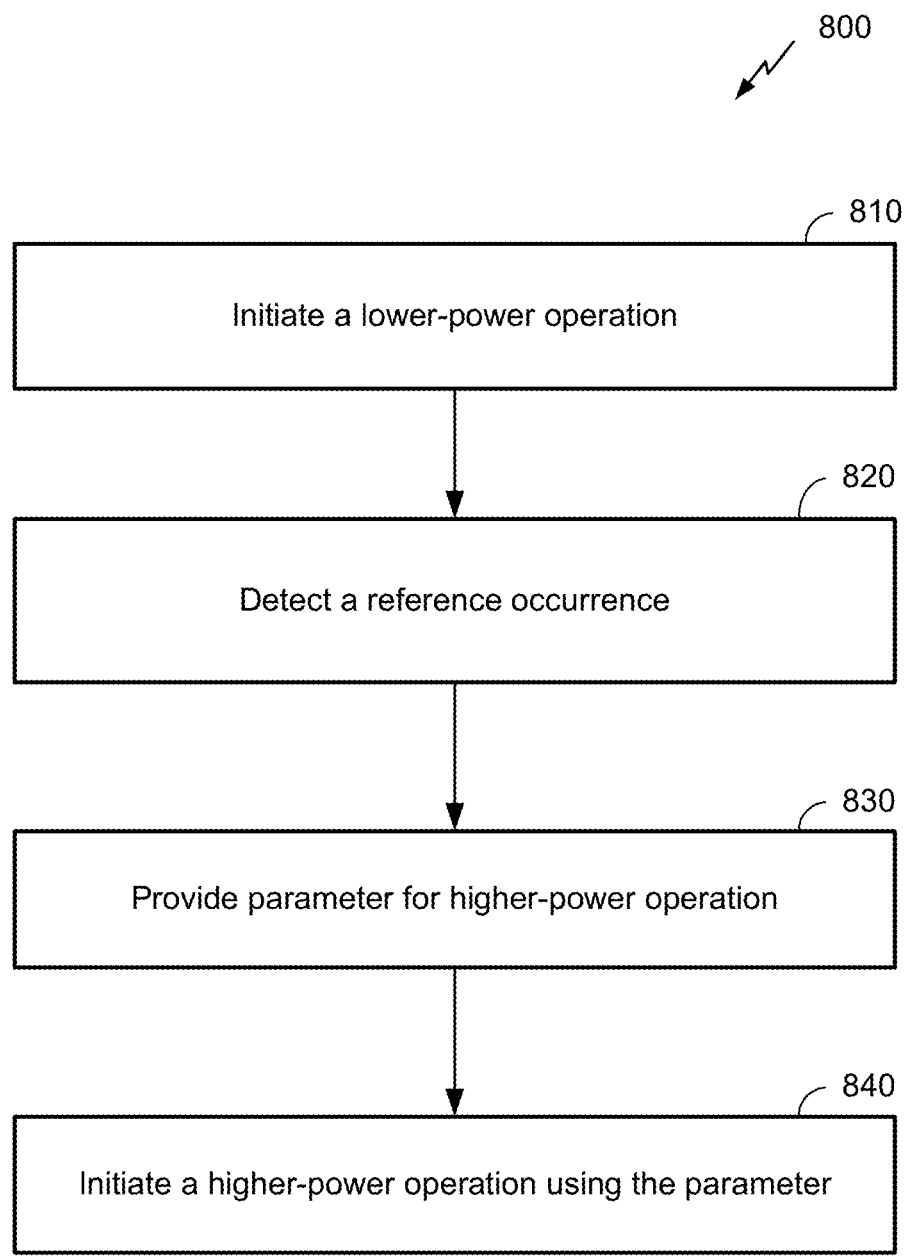

FIG. 8 shows an example method 800 for using a sensor system as an optical sensor. Again, the method 800 will be discussed with respect to the example sensor system 210 shown in FIG. 2A, but is not limited to such a sensor system.

The method 800 begins at block 810, where the sensor system 210 initiates a lower-power operation as discussed above with respect to the method 700 of FIG. 7. At block 820, while performing the lower-power operation, the sensor system 210 detects a reference occurrence as discussed above with respect to the method 700 of FIG. 7. After detecting the reference occurrence, the method 800 proceeds to block 830.

At block 830, the sensor system 210 provides a parameter value for a higher-power operation. In one example, the sensor system 210 provides a level of ambient light as a configuration setting for a higher-power operation. In this example, the sensor system 210 may provide the parameter value as a configuration setting associated with a light intensity or auto-exposure parameter, or with an integration time for an image. In another example, the sensor system 210 provides an estimated distance to an object. In one such example, if the sensor system 210 performed a PD operation and detected an object, the sensor system 210 provides an estimated distance to the object or an amount of detected reflected light. In another example, the sensor system 210 provides a direction of motion to a higher-power operation. In one such example, the sensor system 210 may be configured to perform a lower-power MD operation and/or movement of a block registering change (see discussion of CD, above) and detect a direction of motion based on changes in relative amounts of sensed light over time. The direction of motion may be provided to a higher-power operation, such as a gesture detection operation.

In some embodiments, the sensor system 210 may be configured to provide a parameter that indicates whether a scene viewed by the sensor system 210 is likely an indoor scene or an outdoor scene. For example, if a level of ambient light is above a pre-defined threshold, the sensor system 210 may provide a parameter indicating that the scene is an outdoor scene, while if the ambient light is below a second pre-defined threshold, the sensor system 210 may provide a parameter indicating that the scene is an in scene. In some examples, an indoor/outdoor determination may be made based on a peak intensity detected at one or more frequency.

In some embodiments, the sensor system 210 may be configured to provide a parameter indicating a region of interest in the scene. In one example, the sensor system 210 has configured the sensor array unit 212 to operate in a reduced resolution of 3×3 effective pixels. In such an example, the sensor system 210 may determine an effective pixel of interest, which may be based on detected changes in ambient light, a proximity detection reference occurrence, change detection in one or more of the effective pixels, and/or a detected direction of motion. In one example, the sensor system 210 may be configured to provide a parameter associated with a reference occurrence frequency. In this example, the sensor system 210 detects multiple occurrences of an event and determines a frequency at which the event occurs.

According to some embodiments, a parameter may be used to determine a higher-power operation. In one example, a parameter may indicate a CV feature selection operation. For example, the parameter may indicate whether to use an LBP function, an HSG function, or a CV function based on intensity of light. After the sensor system 210 provides the parameter, the method proceeds to block 840.

At block 840, the sensor system 210 initiates a higher-power operation using the parameter (provided at block 830) as discussed above.

As discussed above with respect to the method 700 of FIG. 7, while the method 800 of FIG. 8 has been described as a sequence of lower-power and higher-power operations, in some examples, the sensor system 210 may substantially perform both lower-power and higher-power operations simultaneously. For example, at block 840, after performing the higher-power operation, the sensor system 210 may initiate a lower-power operation but continue to perform a higher-power operation. Thus, in some examples, at block 810, while the sensor system 210 is performing a lower-power operation, the sensor system 210 may also be performing additional functions, such as higher-power operations, and by initiating a lower-power operation, the sensor system 210 may not be exclusively performing lower-power operations. Further, when the sensor system 210 initiates a higher-power operation at block 840, the sensor system 210 in some examples may continue to perform lower-power operations. Here, rather than disabling dedicated CV computation hardware to perform lower-power operations, the sensor system 210 may continue to operate with the dedicated CV computation hardware enabled. However, the lower-power operations may simply not utilize the dedicated CV computation hardware.

Figure 9:
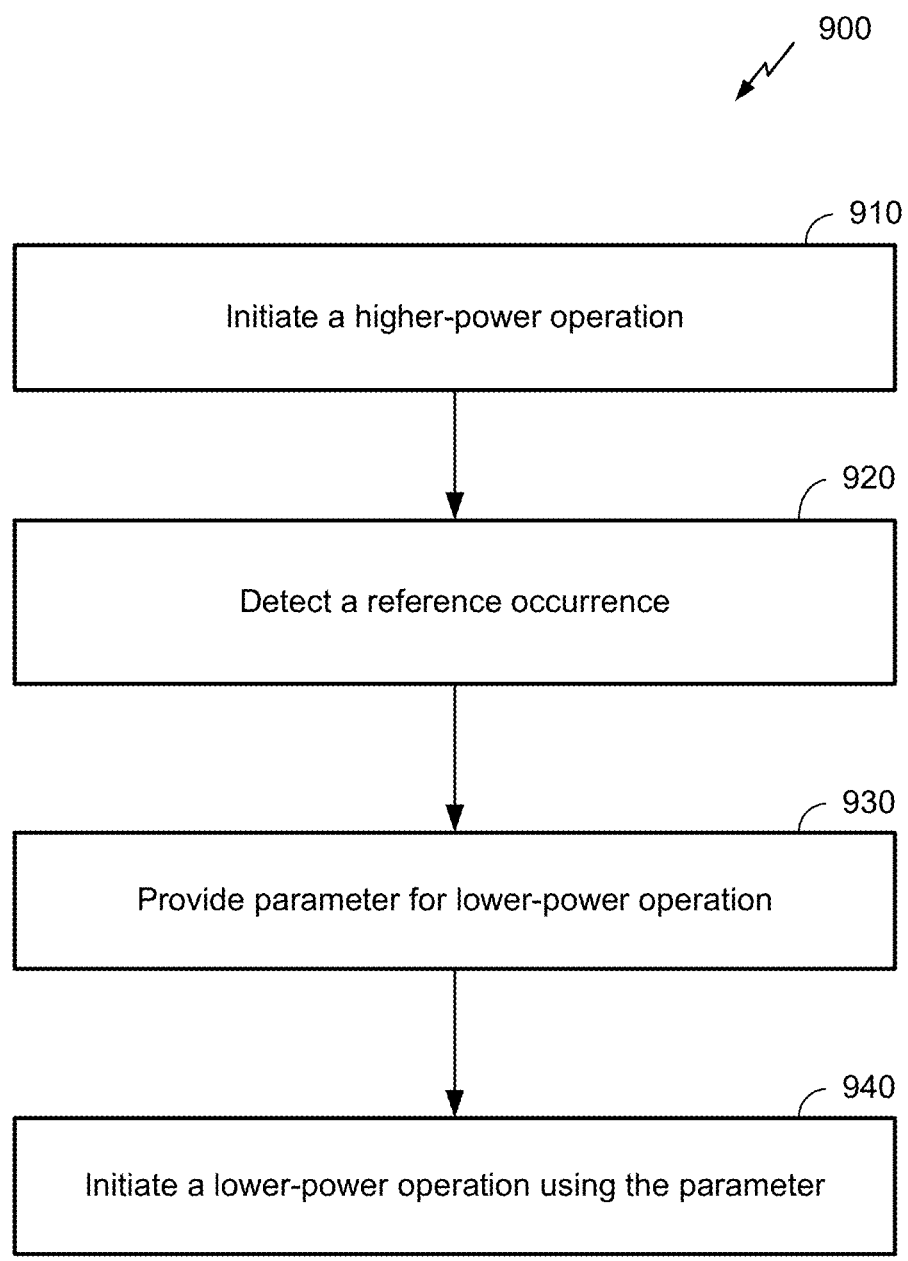

FIG. 9 shows an example method for using a sensor system as an optical sensor. As with other methods described herein, the method 900 will be discussed with respect to the example sensor system shown in FIG. 2A, but is not limited to such a sensor system.

The method 900 begins at block 910, where the sensor system 210 initiates a higher-power operation as discussed above. At block 920, the sensor system 210 detects a reference occurrence, such as face detection or face recognition, based on the higher-power operation at block 910. After detecting the reference occurrence, the method 900 proceeds to block 930.

At block 930, the sensor system 210 provides a parameter for lower-power operation. In one embodiment, a higher-power operation may detect an object near the sensor system 210, and in some example systems may also determine an estimated distance to the object. The sensor system 210 may provide an event comprising a parameter to the lower-power operation indicating the presence of the object, or may also (or instead) provide a parameter indicating a distance to the object. Such a parameter may be employed by the lower-power operation to assist with or enhance a PD function. For example, the PD function may be able to more accurately detect an object near the sensor based on the parameter, such as by establishing or adjusting a threshold intensity level.

In some embodiments, the sensor system 210 can provide a parameter indicating a direction to a light source. For example, a higher-power operation may detect an illuminated object or a reflective object, and a location or a direction to the object. The sensor system 210 may provide a parameter based on the higher-power operation indicating a direction to the light source. The lower-power operation may employ this parameter, for example when performing ALS. In one example, the higher-power operation may determine that a scene viewed by the sensor system 210 is an indoor or an outdoor scene. The sensor system 210 may provide a parameter to the lower-power operation. For example, the parameter may assist or enhance the lower-power operation, such as by assisting with an ALS function by providing information associated with a threshold for detecting changes in ambient lighting.

In some embodiments, the example sensor system 210 provides a parameter indicating an indicator of occupancy of a room or of a number of people visible in a scene viewed by the sensor system 210. For example, a higher-power operation may detect one or more faces, or one or more people, in a scene viewed by the sensor system 210. The sensor system 210 may then provide a parameter indicating a number of people or faces in a scene, or an indicator of a level of occupancy of an area. In one example, a lower-power operation, such as a MD function, may use such information to better detect motion, or to reduce a sensitivity of the MD function to motion. For example, if the sensor system 210 provides a parameter indicating a high level of occupancy, the MD function may switch to a predetermined threshold that requires a stronger indication of motion and thus the MD function is less sensitive to motion. Alternatively, if the sensor system 210 provides a parameter indicating a low level of occupancy, a MD function may increase its sensitivity when detecting motion events. In another example, a higher power operation may set the threshold and/or the minimum number of blocks for the CD operation described above.

At block 940, the sensor system 210 initiates a lower-power operation using the parameter. For example, the sensor system 210 may initiate a lower-power operation as described above with respect to FIGS. 7 and 8. In this example, the lower-power operation, after initiation, is configured to use the parameter. For instance, as discussed above, a PD function may be able to more accurately detect an object near the sensor based on the parameter, such as by establishing or adjusting a threshold intensity level. In one example, the parameter may assist or enhance the lower-power operation, such as by assisting with an ALS function by providing information associated with a threshold for detecting changes in ambient lighting.

Some embodiments may repeatedly execute the method 900. For example, after performing a higher-power operation, the sensor system 210 may restart the method 900 and initiate a lower-power operation at block 910.

As discussed above with respect to the methods 700, 800 of FIGS. 7 and 8, while the method 900 of FIG. 9 has been described as a sequence of higher-power and lower-power operations, in some examples, the sensor system 210 may substantially perform both lower-power and higher-power operations simultaneously. For example, at block 940, after performing the lower-power operation, the sensor system 210 may initiate a higher-power operation but continue to perform lower-power operations. Thus, in some examples, at block 910, while the sensor system 210 is performing a higher-power operation, the sensor system 210 may also be performing additional operations, such as lower-power operations, and by initiating a higher-power operation, the sensor system 210 may not be exclusively performing higher-power operations. Further, when the sensor system 210 initiates a lower-power operation at block 940, the sensor system 210 in some examples may continue to perform higher-power operations.

In some embodiments, one or more methods may be combined. For example, the methods of FIG. 7 or 8 may be combined with the method of FIG. 9. For example, after completing block 730 of the method 700 of FIG. 7, the method may proceed to block 920 of the method 900 of FIG. 9. In one example, after completing block 840 of the method 800 of FIG. 8, the method may proceed to block 920 of the method 900 of FIG. 9. Still further combinations are contemplated as well.

FIG. 10A shows an example state diagram for computer-vision computations and lower-power optical sensor readings, which may be performed by the sensor system 210. FIG. 10A includes two states, a lower-power operation(s) state 1010 and a higher-power operation(s) state 1020. In a lower-power operation(s) state 1010, the sensor system 210 is configured to perform one or more lower-power operations and may obtain one or more sensor readings. In a higher-power operation(s) state 1020, the sensor system 210 is configured to perform one or more higher-power operations, such as computer-vision computations and operations, and may obtain one or more sensor readings. In some embodiments, the sensor system 210 is configured to be in either the lower-power operation(s) state 1010 or the lower-power operation(s) state 1020, but not both simultaneously. In one such example, the sensor system 210 is configured to transition from one state to the other based on sensor readings, which may establish a one-way dependence relationship between the states. For example, in one example, execution of a higher-power operation is dependent on a sensor reading from a lower-power operation, or execution of a lower-power operation is dependent on a sensor reading from a higher-power operation.

However, in some examples, the sensor system 210 may be configured to operate in both states 1010, 1020 substantially simultaneously. For example, in one example, the sensor system 210 may comprise a plurality of sensor array units 212, one of which may be configured to perform lower-power operations and another of which may be configured to perform higher-power operations. In some examples, the sensor system 210 may subdivide a sensor array unit 212 such that a portion of the sensor array unit 212 is configured to perform a lower-power (or operations), while another portion of the sensor array unit 212 is configured to perform a higher-power operation (or operations). In one example where a sensor system 210 is configured to operate in both states 1010, 1020 substantially simultaneously, a one-way dependence relationship may be established based on a sensor reading from one of the states that causes the initiating of a specific operation in the other state or causes a reconfiguring of an operation in the other state. In some embodiments, an operation in one state may provide one or more parameter values usable by an operation in the other state, such as may be seen in FIG. 10B.

FIG. 10B shows an example state diagram for computer-vision computations and lower-power optical sensor readings, which may be performed by the sensor system 210. FIG. 10B includes the states described above with respect to FIG. 10A, but also includes state transitions or information passing between states 1010, 1020 in response to event detections in one or both of the states 1010, 1020. As with the state diagram in FIG. 10A, the sensor system 210 may transition between the two states 1010, 1020 in sequence, or may operate in both states 1010, 1020 simultaneously. The sensor system 210 can be configured to detect events in each of the states. Examples of reference occurrences are described earlier in this disclosure. As shown in FIG. 10B, the sensor system 210 provides one or more parameter values based on a detected event from a function in one state to one or more functions in the other state.

For example, if the sensor system 210 is performing a PD operation in a lower-power operation state 1010 and detects an object near the sensor system 210, the sensor system 210 provides a parameter value, such as a flag value indicating an object is detected or an estimated range to the object, to a computer-vision function in the higher-power operation state 1020, such as a face detection function. In some situations, the sensor system 210 may also transition from the lower-power operation state 1010 to the higher-power operation state 1020; however, the sensor system 210 may activate or continue executing operations in the higher-power operation(s) state 1020 using the one or more parameter values. The sensor system 210 may also detect events in the higher-power operation state 1020 and provide one or more parameter values to a lower-power operation and the sensor system may transition to the lower-power operation state or activate or continue executing operations in the lower-power operation(s) state 1020 using the one or more parameter values.

Figures 11A, 11B, 11C:
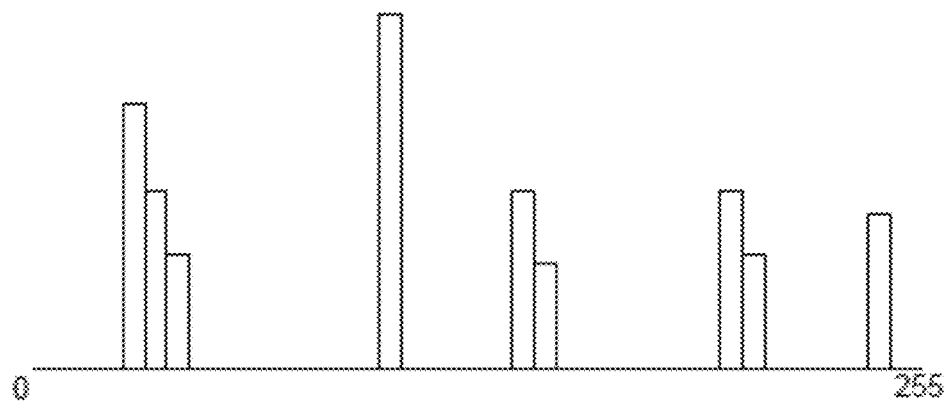
FIGS. 11A-11C illustrate a process of converting the sensor readings from a plurality of sensor elements to CV features, according to some embodiments.

FIGS. 11A, 11B and 11C illustrate a process of converting the sensor readings from a plurality of sensor elements to CV features, according to some embodiments.

FIG. 11A illustrates a group of sensor readings (window 1102) from a plurality of sensor elements of a sensor array unit (e.g., sensor array unit 212 of FIG. 2A or 2B) that are under consideration for generating a histogram and detecting features.

FIG. 11B illustrates the process of generating the binary threshold values for the center sensor element 1104 for generating an LBP label. CV computation hardware 242 of FIG. 2B can include hardware for computing the LBP label. The label generated for the center sensor element may be represented by the binary value 1111000. Similarly, an LBP label is generated for each of the nine sensory elements from window 1102. Each label may provide an indication of a CV feature from the perspective of the subject sensor element.

The thresholding to generate the label may be repeated for signals corresponding to multiple subject sensor elements in the sensor array. The pixel-level LBP illustrated in FIG. 11B can be expanded to include multi-block LBP where the illustrated binary threshold values are generated for a block of one or more subject sensor elements by comparing a value corresponding to the block of one or more subject sensor elements, such a sum of the values associated with the one or more subject sensor elements in the block, to its neighboring sensor element blocks. Computations of the values corresponding to each of the blocks of sensor elements can be facilitated by computing an integral image. Similarly, it is understood that extensions of LBP may also be similarly computed, such as local ternary patterns (LTP), which provides three outputs depending on the difference between the subject sensor element and the neighboring sensor elements. For example, in one implementation of LTP, the output is one if the signal corresponding to the neighboring sensor element is greater than the signal corresponding to the subject sensor element plus a threshold, the output is zero if the signal corresponding to the neighboring sensor element is within the threshold compared to the signal corresponding to the subject sensor element, and the output is negative one if the signal corresponding to the neighboring sensor element is less than the signal corresponding to the subject sensor element minus the threshold.

FIG. 11C illustrates a normalized histogram for a window, for example a window representing some subset of sensor elements from a sensor element array, generated from the plurality of labels for each of the sensor elements from the window, for example a sample window stored in hardware scanning window array 238 of FIG. 2B. As shown in FIG. 11C, each of the LBP labels for the sensor readings from window 1102 may fall anywhere on a histogram with, for example, 256 slots. So, for example, when comparing a subject sensor element to its eight neighbors, an 8 bit number will be generated meaning that 256 different LBP labels are possible. The histogram can represent the number of times each of the given LBP labels were actually generated in the window. To determine if a face is present in the window, in one implementation, the generated histogram can be compared to a reference histogram of a face. An intersection between the generated histogram and the reference histogram can be computed, and a scalar sum generated from a summation of the intersection. If the scalar sum is greater than a threshold, then, to a given probability, a face is detected within the window. The reference histogram and the threshold are generally determined in a training phase using machine learning algorithms on a dataset of, in this example, sample faces and sample non-faces and their LBP histograms. Once the reference histogram and the threshold are determined in the training phase, for the same architecture, they can be programmed in, for example, the microprocessor 216 of FIG. 2A or 2B, or alternatively the above histogram process may be performed by dedicated hardware for computing a histogram for a given window within an image and determining whether a face, or other object, is present within the window similar to cascade classifier hardware 244 discussed in FIG. 2B above. It is understood that the LBP labels can be used by a cascade classifier for object detection, as discussed in FIG. 2B, instead of or in addition to using the LBP labels for histogram generation.

Preparatory Tasks to Support Iris-Related Operations

Figure 12:
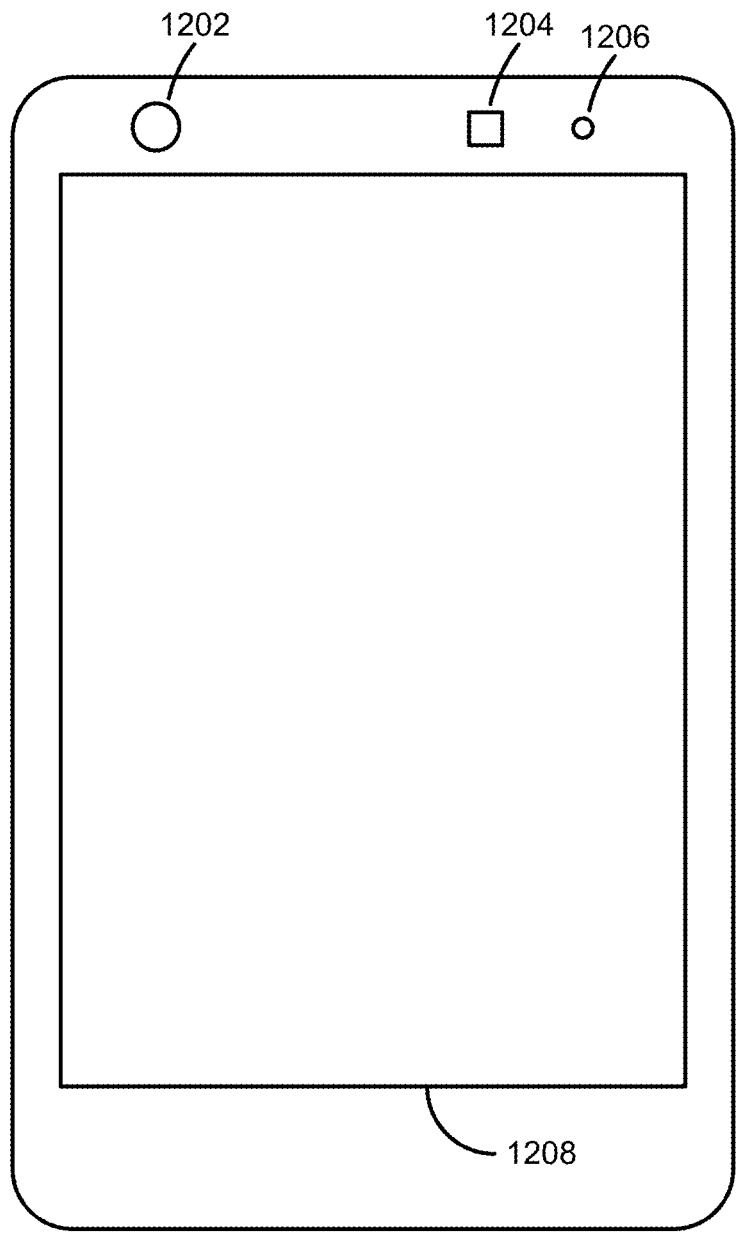
FIG. 12 illustrates the front face of a mobile device, including exterior views of a visual sensor, an infrared (IR) light source, and an IR sensor, to support iris-related operations according to various embodiments.

FIG. 12 illustrates the front face of a mobile device 1200, including exterior views of a visual sensor 1202, an infrared (IR) light source 1204, and an IR sensor 1206, to support iris-related operations according to various embodiments. Mobile device 1200 may also include a display 1208. As discussed previously, iris scan techniques have not been adopted widely due to power consumption concerns, especially in battery-operated devices such as mobile handsets. Embodiments of the visual sensory system described herein may be used to greatly improve performance of iris-related operations, particularly with respect to power consumption. FIG. 12 shows an embodiment using two different types of sensors—a visual sensor 1202 and an IR sensor 1206. Example implementations of visual sensor 1202 can include sensor system 210 of FIG. 2A, sensor system of FIG. 2B, or visual sensor system 1310 of FIG. 13. Although visual sensor 1202 and IR sensor 1206 are illustrated as two separate sensors, in some implementations described further below, it is understood that CV computation hardware within visual sensor 1202 can perform CV feature computation based on IR images captured by IR sensor 1206. In such implementations, no opening in the front of the phone will be necessary for visual sensor 1202 as both events for activating iris scanning or other iris processing as well as the iris scanning or processing itself can be based on processing of IR images from the IR sensor 1206.

Here, while mobile device 1200 is in a low-power state, the visual sensor 1202 is used to continually monitor the scene for the possible presence of one or more irises. For example, visual sensor 1202 may be used in conjunction with the vision sensor system described herein, to attempt to detect a face. As discussed, features of the visual sensor system, such CV computational hardware 242 and cascade classifier hardware 244 shown in FIG. 2B, allow mobile device 1200 to perform operations such as face detection while in a low-power state. Detection of a face can then serve as an indication that one or more irises may be present.

Once an indication of the presence of one or more irises within the scene has been found, mobile device 1200 may be transitioned to a high-power state to perform iris-related operations, according to this embodiment. The IR light source 1204 may be turned on, and the IR sensor 1206 may be used to capture images of the surroundings illuminated by the IR light source 1204. Images captured by the IR sensor 1206 may be used for iris-related tasks such as iris detection, iris authentication, etc. As discussed previously, iris-related operations may be particularly power-hungry. For example, iris detection and iris authentication may require complex processing associated with high power consumption. This may be true in embodiments that perform iris-related operations using IR images or non-IR (e.g., visual) images. In cases where IR images are used, the need to activate an IR light source, such as IR light source 1204, further exacerbates the power consumption problem. By waiting until an indication that one or more irises are present (e.g., when a face is detected), mobile device 1200 avoids performing unnecessary operations in the attempt to detect the location of irises, for example, when no iris is present in the scene. Instead, the mobile device only performs power intensive iris-related operations, such as turning on the IR light source 1204, iris detection to location irises, iris authentication, etc. when there is an indication that one or more irises may be present in the scene. Such an approach greatly improves power consumption performance and allows iris-based user authentication to be widely implemented, especially in battery-operated devices.

Figure 13:
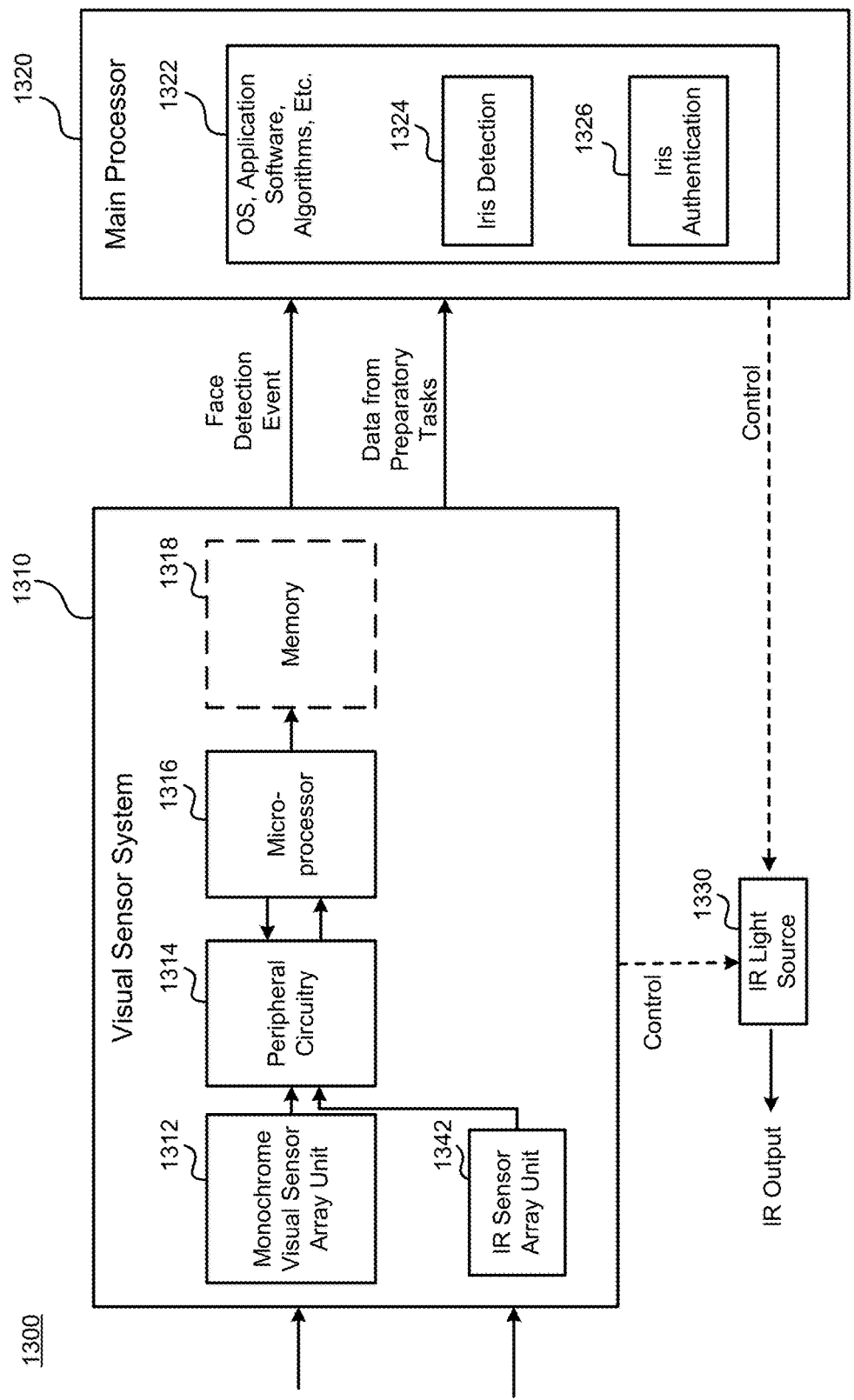
FIG. 13 is a block diagram illustrating a two-sensor approach for iris scanning, employing a visual sensor system to perform low-power face detection to trigger iris-related operations, as well as perform preparatory tasks in support of iris-related operations.

FIG. 13 is a block diagram of components in a portion of a mobile device 1300 illustrating a two-sensor approach for iris scanning, employing a visual sensor system 1310 to perform low-power face detection to trigger iris-related operations, as well as perform preparatory tasks in support of iris-related operations. Visual sensor system 1310 comprises a visual sensor array unit 1312, an IR sensor array unit 1342, peripheral circuitry 1314, a microprocessor 1316, and optional memory 1318, according to an embodiment. Visual sensor system 1310 maybe similar to the sensory system 210 of FIG. 2A or the sensor system of FIG. 2B.

Visual sensor system 1310 receives visual input comprising light in the visible spectrum. The visual input is captured by the visual sensor array unit 1312 in the form of one or more images. Visual sensor array unit 1312 comprises a plurality of pixels arranged in an array, such as a rectangular shaped array. According to one embodiment, visual sensor array unit 1312 comprises monochrome pixels. Monochrome operation allows the visual sensor array unit 1312 to function at relatively low power levels. Visual sensor array unit 1312 maybe part of a sensor, such as visual sensor 1202 shown in FIG. 2, that further comprises physical lenses and other components. IR sensor array unit 1342 receives IR input comprising light in the infrared spectrum. IR sensor array unit 1342 comprises a plurality of pixels arranged in an array, such as a rectangular shaped array.

Peripheral circuitry 1314 operates on image data captured by visual sensor array unit 1312 and/or IR sensor array unit 1342. Peripheral circuitry 1314 may include sub-systems such as those illustrated in FIG. 2B, such as ADC 234, 2D integration hardware 236, hardware scanning window array 238, CV computation hardware 242, and cascade classifier hardware 244. Microprocessor 1316 may control operations of peripheral circuitry 1314. The subsystems of visual sensor system 1310 may perform computer vision operations, such as LBP and other operations, on the image data, in order to detect features in one or more images captured by visual sensor array unit 1312 and/or IR sensor array unit 1342. For example, one type of feature detection may be face detection. Results may be outputted and/or stored in optional memory 1318. As discussed, visual sensor system 1310 operates with very low power consumption.

Mobile device 1300 further comprises a main processor 1320. Main processor 1320 may be similar to main processor 220 of FIG. 2A. Mobile device 1300 may rely on main processor 1320 to execute application programs. Main processor 1320 supports a software environment 1322 that includes an operating system (OS), application software, etc. Main processor 1320 may be capable of operating in different modes, including, for example, a lower-power mode (e.g., sleep mode, power-down mode, etc.) in a higher-power mode (e.g., awake mode, normal mode, etc.). The ability to execute different application programs allows the main processor 1320 to support a wide range of operations. This may include iris-related operations, which may involve complex calculations. The main processor 1320 has sufficient processing capabilities to carry out such operations. However, a significant drawback of the main processor 1320 is that it operates with relatively high power consumption. According to an embodiment of the disclosure, the main processor 1320 stays in a low-power mode until a detection event, such as a face detection event, is generated by the visual sensor system 1310. At that point, the visual sensor system 1310 sends a signal to the main processor 1320. For example, as shown in FIG. 13, visual sensor system 1310 detects a face and sends a signal to the main processor 1320.

In response to the detection event (e.g., face detection), visual sensor system 1310 may also be configured to perform one or preparatory tasks in support of iris-related operations and send data generated from the one or more preparatory tasks to main processor 1320. Here, iris-related operations may comprise iris detection, iris authentication, etc., which may be performed by main processor 1320. Advantageously, the preparatory tasks give main processor 1320 a "head start" in performing iris-related operations. In one example, an IR image captured by an IR sensor array unit 1342 is preprocessed to identify the location of the user's eyes as the relevant regions of interest (ROI). Thus, when called upon to perform iris detection or iris authentication, the main processor 1320 is already aware of the ROI within the IR image. The main processor 1320 may proceed with iris detection and authentication by focusing only on the identified ROI. This precludes a more time- and resource-intensive search for the irises over the entire face of the user or the entire IR image. Instead, the main processor 1320 only needs to detect the irises within the identified ROI and perform iris authentication on the detected irises. Other examples of tasks that can give main processor 1320 a "head start" may include tasks that determine lighting levels, locations to illuminate within the scene, the angle of a face, the state of glasses, etc.

Iris-related operations refers to operations performed based directly or indirectly on one or more images of an iris. In one embodiment, iris-related operations comprise iris authentication. Iris authentication may involve comparing an iris to a plurality of registered iris data records. In one embodiment, data in support of iris-related operations is generated to accelerate iris-related operations, such as iris detection and/or iris authentication, to be performed by a second processing unit (such as main processor 1320). Just as an example, generating data in support of iris-related operations may comprise generating data indicating the location of landmarks within an image to demarcate the eye(s) of a user, indicating or facilitating detection of the eye(s) of the user, detecting of one or more eyes or irises of the user, as well as authentication of one or more irises of the user, as discussed below with respect to FIG. 16.

Capturing of the IR image may involve use of an IR light source 1330 to illuminate the target (e.g., user's face). In one embodiment, the IR light source 1330 is controlled by visual sensor system 1310. For example, visual sensor system 1310 may send a control signal to light, i.e., turn on, IR light source 1330. IR light source 1330 may correspond to IR light source 1204 in FIG. 12. Alternatively, main processor 1320 may send a control signal to activate IR light source 1330. When lit, IR light source 1330 emits IR light to illuminate the scene. The IR light reaches surfaces of objects in the scene and reflects back. The reflected IR light is captured by an IR sensor array unit 1342. In the present embodiment, data generated from the preparatory tasks, e.g., location information regarding the ROI within the IR image is forwarded to main processor 1320. In addition, the IR image is also forwarded to main processor 1320, e.g., via memory 1318. Main processor 1320 then performs iris detection and iris authentication using the IR image, with the benefit of having already received data from the preparatory tasks in support of iris-related operations.

As shown in FIG. 13, the software environment 1322 of main processor 1320 includes an iris detection unit 1324 and an iris authentication unit 1326, which may be implemented in the form of one or more application programs, built-in functions of the operating system, and the like. Iris detection unit 1324 detects irises within an image. Typically, iris detection includes identifying the location of the one or more detected irises within the image. The iris detection operation can be greatly streamlined by use of the data generated from preparatory tasks mentioned previously, such as data identifying the ROI in which irises are likely to be present. Iris authentication unit 1326 compares one or more irises detected in the image against registered irises in a data record. In one example, the registered irises may simply comprise the pair of irises of the known user of the mobile device 1200. In another example, the registered irises may comprise a large number of irises stored in a local or remote database of registered users with verified identities. Iris authentication may be performed by comparing the actual image of an iris, one or more transforms of the image of the iris, certain parameters or statistics derived from the image of the iris, etc., against similar data for one or more registered irises.

Figure 14:
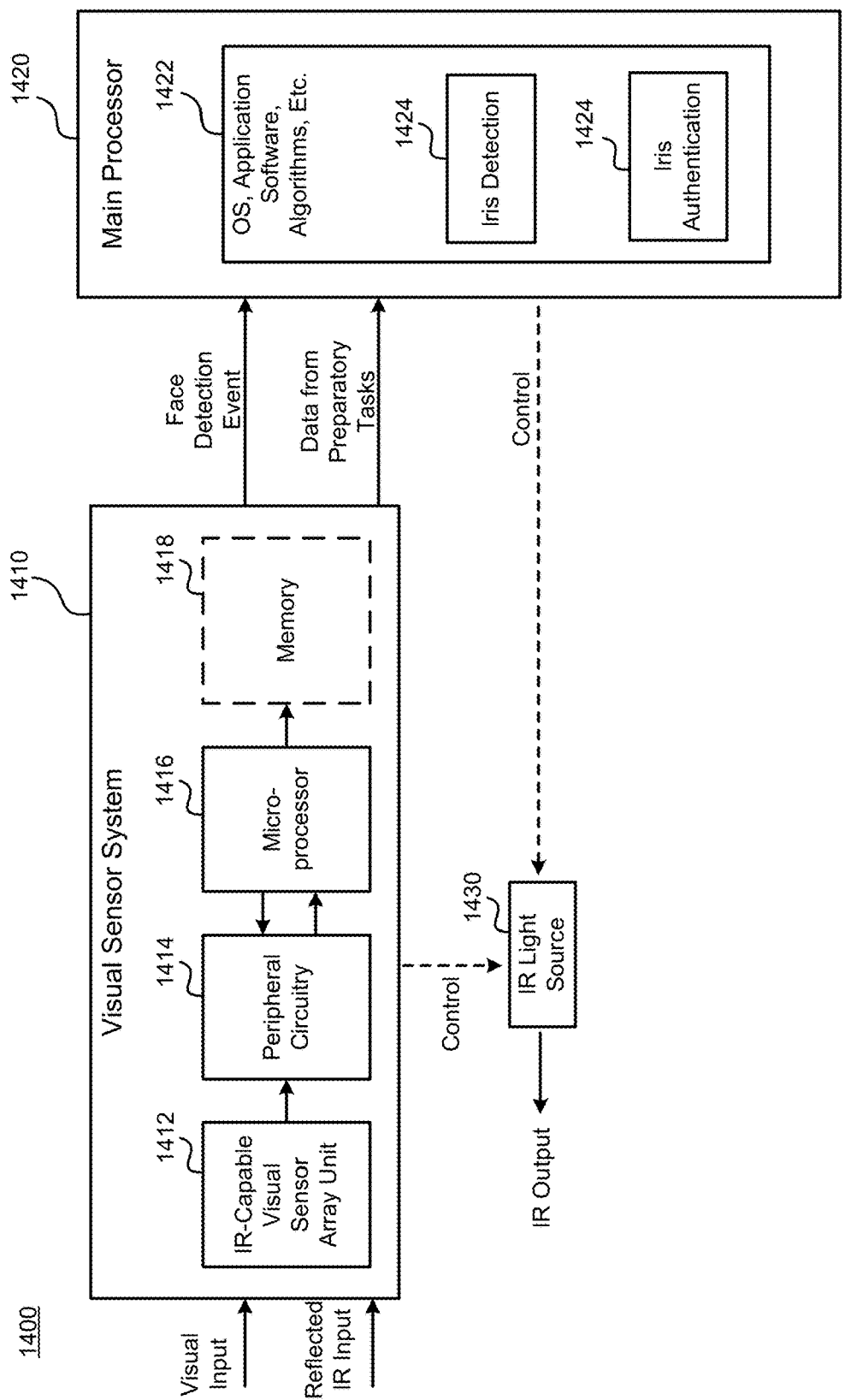
FIG. 14 is a block diagram illustrating a one-sensor approach for iris scanning, employing a visual sensor system to perform low-power face detection to trigger iris-related operations, as well as perform preparatory tasks in support of iris-related operations.

FIG. 14 is a block diagram of components in a portion of a mobile device 1400 illustrating a one-sensor approach for iris scanning, employing a visual sensor system 1410 to perform low-power face detection to trigger iris-related operations, as well as perform preparatory tasks in support of iris-related operations. Visual sensor system 1410 comprises an IR-capable visual sensor array unit 1412, peripheral circuitry 1414, a microprocessor 1416, and optional memory 1418, according to an embodiment. Visual sensor system 1410 may be similar to the sensor system 210 of FIG. 2A or the sensor system of FIG. 2B, although in the implementation of FIG. 14 the sensor array unit can include an IR-capable visual sensor array unit. Mobile device 1300 further comprises a main processor 1420. Main processor 1420 may be similar to main processor 220 of FIG. 2A. In addition, mobile device 1400 may also comprise an IR light source 1430.

Operation of the components shown in FIG. 14 may be similar to that of FIG. 13, with one notable exception. In FIG. 14, instead of using two separate sensor arrays, i.e., a visual sensor array and a separate IR sensor array, a single IR-capable visual sensor array unit 1412 is used to capture both visible light image(s) and IR light image(s). In one implementation, the IR-capable visual sensor array unit 1412 is constructed as part of a visible sensor array/camera without an IR filter. Regular visual sensor arrays/cameras are often constructed to include an IR filter. The IR filter blocks out the components of the light entering the camera that belong in the infrared (IR) spectrum. The filtered light thus has IR components substantially removed, leaving visible light components. The result is a less "noisy" visible light that is captured by the sensor. Here, the IR-capable visual sensor array unit 1412 may be constructed as part of a visible sensor array/camera that is implemented without such an IR filter. As a result, both the IR spectrum and the visible spectrum of the light are allowed to reach the sensor array, and it is capable of capturing both visible light images and IR images.

When the IR light source 1430 is not lit, the scene may be ambient light-dominated—i.e., objects in the scene are predominantly illuminated by visible light. Under such conditions, an image taken by the IR-capable visual sensor array unit 1412 largely correspond to a visual image. By contrast, when the IR light source 1430 is lit, the scene may be IR light-dominated—i.e., objects in the scene are predominantly illuminated by IR light. Under such conditions, an image taken by the same IR-capable visual sensor array unit 1412 largely correspond to an IR image. Thus, a single IR-capable visual sensor array unit 1412 may be used to capture both visual images and IR images, at different times. The visual sensor system 1410 may perform face detection using an visual image, turn on the IR light source 1430 once a face is detected, capture an IR image while the IR light source 1430 is turned on, perform one or more preparatory tasks using the IR image, then perform iris detection or iris authentication with the benefit of having data generated from the preparatory tasks. Thus, a single IR-capable visual sensor unit 1412 may satisfy all the image-capturing needs illustrated in FIG. 14.

As shown in FIG. 14, the software environment 1422 of main processor 1420 includes an iris detection unit 1424 and an iris authentication unit 1426, which may be implemented in the form of one or more application programs, built-in functions of the operating system, and the like. As discussed, the iris detection operation can be greatly streamlined by use of the data generated from preparatory tasks. Iris detection unit 1424 detects irises within an image, in a similar manner as mentioned previously.

While various sensor array units illustrated in FIGS. 13 and 14 are shown to be part of the visual sensor system, such an arrangement is not necessarily required. Indeed, various sensor array units can very well be located outside of a visual sensor system. For example, referring to FIG. 13, visual sensor array unit 1312 is shown in the figure to be a part of visual sensor system 1310. However, in a different embodiment, visual sensor unit 1312 may be located outside of visual sensor system 1310. In such a scenario, visual sensor unit 1312 may generate output data, e.g., captured images, that are provided as input to visual sensor system 1310. In a similar manner, IR-capable visual sensor array unit 1412 may be located outside of visual sensor unit 1410.

Figure 15:
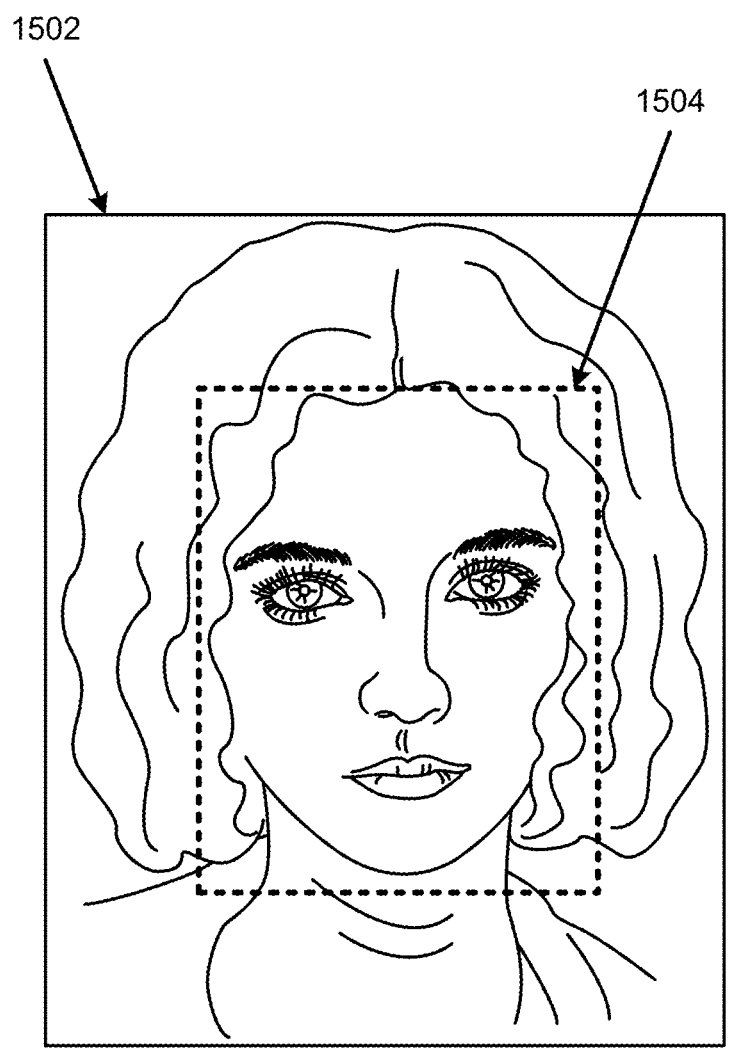
FIG. 15 depicts an example of a visual image and a bounding box resulting from a successful face detection, according to an embodiment of the disclosure.

FIG. 15 depicts an example of a visual image 1502 and a bounding box 1504 resulting from a successful face detection, according to an embodiment of the disclosure. Visual image 1502 may be captured by, for example, visual sensor array unit 1312 or IR-capable visual sensor array unit 1412. Face detection may be performed, for example, by visual sensor system 1310 or 1410, which operate with relatively low electrical power.

Bounding box 1504 represents just one example of how a face detection result may be generated. Alternatively or additionally, the result of a face detection may take the form of a bit field or a single bit, for instance. A single bit having a value of "1" may represent a positive face detection. A value of "0" may represent a negative face detection. An "event" generated from the face detection operation may include data for the coordinates of bounding box 1504, a bit field containing contents that describe results of the face detection operation, a bit indicating a positive or negative face detection, or the like.

Figure 16:
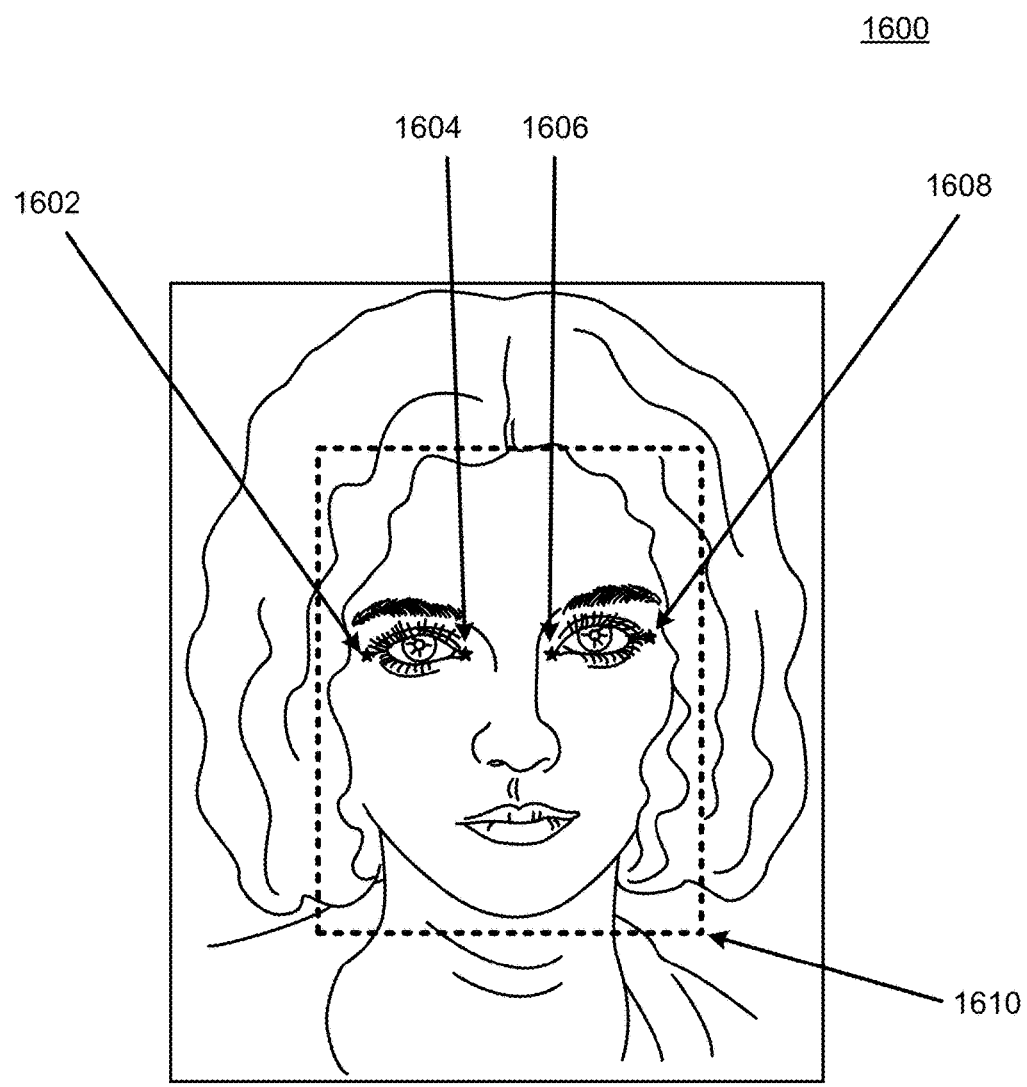
FIG. 16 depicts detection of four landmarks within an IR image to demarcate the eyes of a user as regions of interest (ROI), as an example of preparatory tasks in support of iris-related operations in accordance with an embodiment of the disclosure.

FIG. 16 depicts detection of four landmarks within an IR image 1600 to demarcate the eyes of a user as regions of interest (ROI), as an example of preparatory tasks in support of iris-related operations in accordance with an embodiment of the disclosure. Such landmark detection may be performed by visual sensor system 1310 or 1410 shown in FIGS. 13 and 14, for example. As shown in FIG. 16, the result of ROI identification results in detection of the locations of landmarks 1602, 1604, 1606, and 1608 within a bounding box 1610. There may be different types of landmarks that may be used. Here, the landmarks represent pairs of "corner points" for an eye. Each pair of corner points may consist of a left-corner point and a right-corner point, which demarcate a region of interest (i.e., an eye) likely to include an iris. For example, iris locations 1602 and 1604 correspond to a left-corner point and a right-corner point that, together, demarcate a region of interest that likely contains the iris of the left eye of the face within the IR image 1600. Similarly, iris locations 1606 and 1608 correspond to a left-corner point and a right-corner point that, together, demarcate a region of interest that likely contains the iris of the right eye of the face within the IR image 1600.

As shown in FIG. 16, data generated from one or more preparatory tasks supporting iris-related operations may indicate the location and/or size of eye regions within an IR image. For example, landmarks 1602 and 1604 indicate both the location and the size of the left eye within the IR image. Similarly, landmarks 1606 and 1608 indicate both the location and size of the right eye within the IR image. While FIG. 16 shows an example in which the format of the ROI information corresponds to "corner point" type landmarks, other formats of ROI information may be used.

In some embodiments, data generated from the preparatory tasks may include data indicating whether the one or more irises are sufficiently sized in an image for subsequent iris authentication. Just as an example, the distance between landmarks 1602 and 1604, which indicate the left-corner point and right-corner point of an eye, may be compared to a predefined minimum eye width. Such measures may be in units of number of pixels, for instance. If the distance between iris locations 1602 and 1604 is less than the minimum eye width, the corresponding iris (of the left eye in FIG. 16) may be deemed insufficiently sized, i.e., too small, for performing proper iris authentication. Similarly, the distance between landmarks 1606 and 1608 may also be compared to the minimum eye width, to determine whether the corresponding iris (of the right eye in FIG. 16) may be deemed insufficiently sized for performing proper iris authentication.

If one or more of the detected irises is deemed insufficiently sized, various responsive steps can be taken. In one example, the mobile device may provide audio and/or visual feedback to the user, to prompt the user to place the mobile device closer to his or her face. Once one or more irises are detected that are deemed sufficiently sized, then the mobile device may proceed with lighting the IR light source and performing iris authentication.

Figure 17:
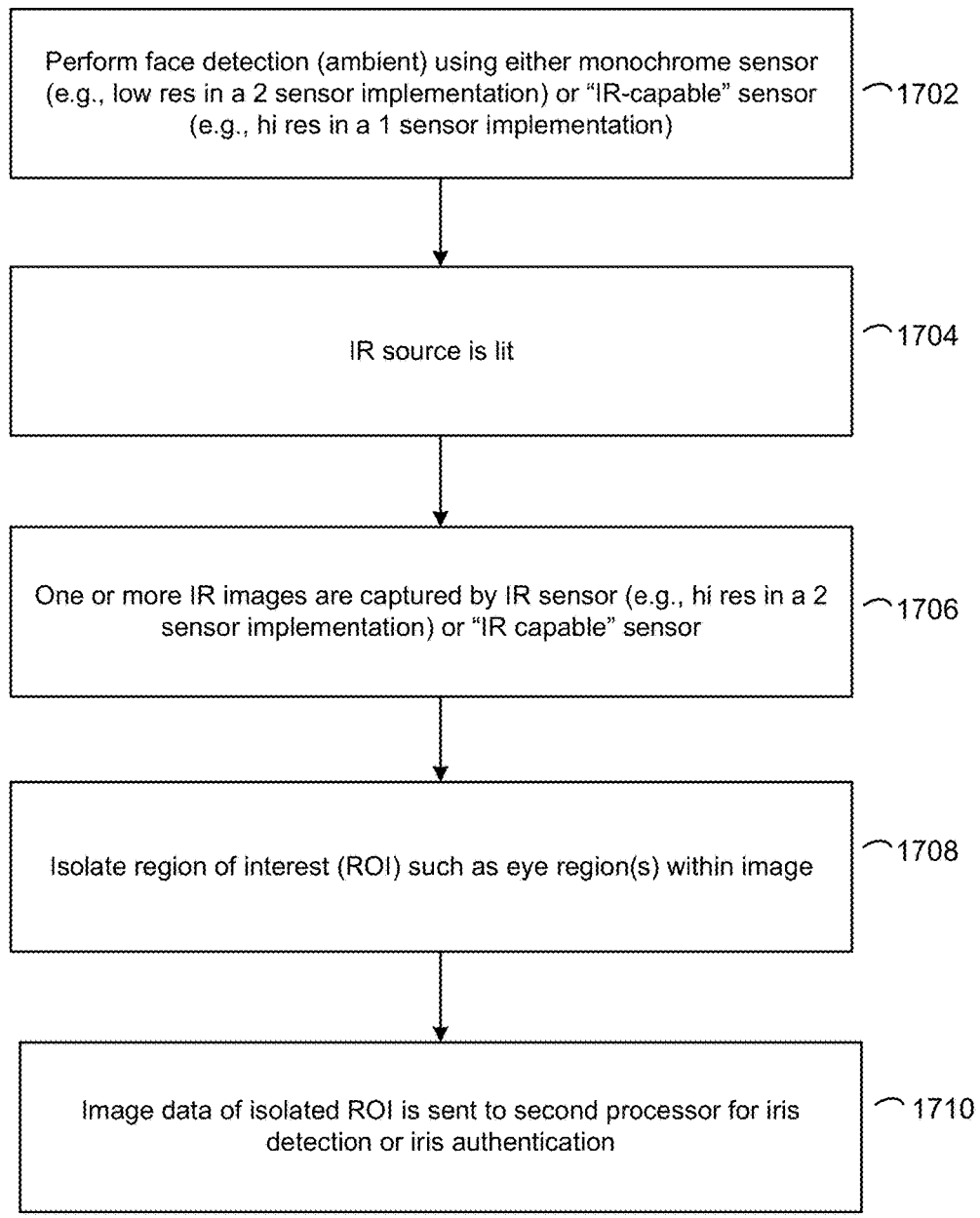
FIG. 17 is a flowchart illustrating a process for performing power-conserving iris scanning, according to an embodiment of the disclosure.

FIG. 17 is a flowchart illustrating a process 1700 for performing electrical-power-conserving iris scanning, according to an embodiment of the disclosure. In a step 1702, the system performs face detection in an ambient light-dominated environment, using either a visual sensor or an IR-capable visual sensor. In a two-sensor implementation, the visual sensor may be a low-resolution monochrome sensor. In a one-sensor implementation, the IR-capable visual sensor may be a high-resolution color sensor. In a step 1704, an IR light source is lit, in response to the event of detecting a face in step 1702. In a step 1708, one or more IR images are captured by an IR sensor or an IR-capable sensor. In a two-sensor implementation, the IR sensor may be a high-resolution color IR sensor. In a step 1708, the system isolates an iris or a portion of an iris within the image. For example, a face detection operation may generate one or more iris locations. In a step 1710, image data of the isolated iris or portion of iris is sent to a second processor for iris recognition/processing. Examples of such a processor include main processor 1320 or 1420. Iris recognition/processing may comprise iris authentication as described previously.

Figure 18A:
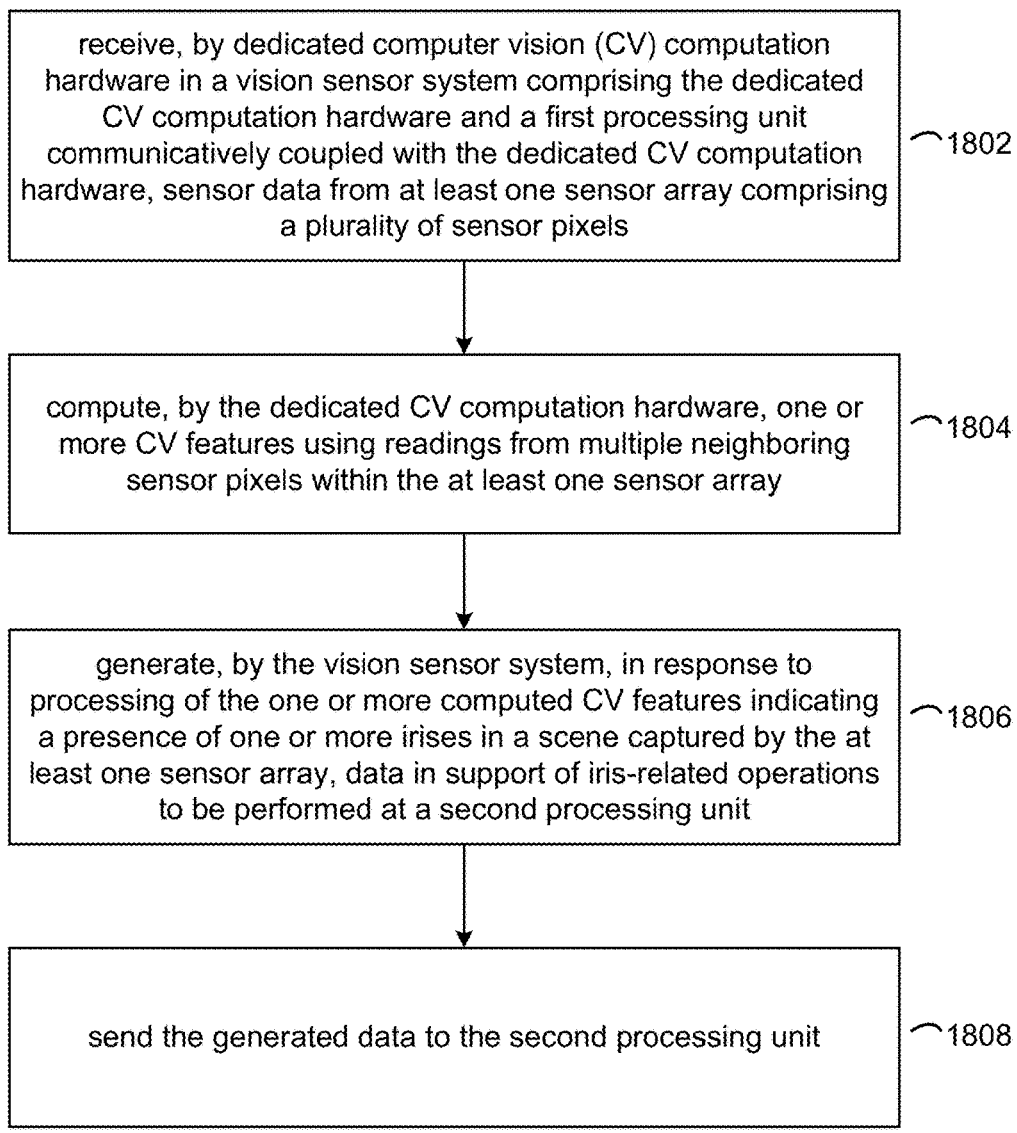
FIG. 18A is a flowchart illustrating steps for sensing scene-based occurrences, in accordance with an embodiment of the disclosure.

FIG. 18A is a flowchart illustrating steps of a process 1800 for sensing scene-based occurrences, in accordance with an embodiment of the disclosure. In a step 1802, sensor data is received by dedicated computer vision (CV) computation hardware in a vision sensor system comprising the dedicated CV computation hardware and a first processing unit communicatively coupled with the dedicated CV computation hardware, the sensor data being received from at least one sensor array comprising a plurality of sensor pixels. In a step 1804, one or more CV features are computed by the dedicated CV computation hardware, using readings from multiple neighboring sensor pixels within the at least one sensor array. Means for performing the functionality of step 1802 and/or 1804 can include, but are not limited to and need not include, for example, sensor array unit 212 and peripheral circuitry 214 of FIG. 2A; sensor array unit 212, line buffer(s) 230, ADC 234, 2D integration hardware 236, hardware scanning window array 238, and CV computation hardware 242 of FIG. 2B; sensor array unit 212 and peripheral circuitry 214 of FIG. 3A; smart image array 213 of FIG. 3B; image array 215 and first processing unit 217 of FIG. 3C; visual sensor array 1312, IR sensor array 1342, peripheral circuitry 1314 of FIG. 13; and/or IR-capable visual sensor array 1412, peripheral circuitry 1414 of FIG. 14. In a step 1806, data in support of iris-related operations to be performed in a second processing unit is generated by the vision sensor system, in response to processing of the one or more computed CV features indicating a presence of one or more irises in a scene captured by the at least one sensor array. In one embodiment, the processing of the one or more computed CV features indicating the presence of the one or more irises in the scene captured by the at least one sensor array comprises the processing of the one or more computed CV features indicating a presence of at least one face in the scene. One example of processing the one or more computed CV features to detect the presence of at least one face in the scene is described with reference, for example, to FIG. 2B. In one embodiment, the generated data is indicative of location of one or more eyes. In one embodiment, the generated data is indicative of a size for each of one or more eyes. In one embodiment, the generated data comprises location data for a plurality of landmarks associated with to one or more eyes. In a more specific embodiment, the plurality of landmarks comprise four landmarks, including a first landmark and a second landmark corresponding to a left corner and a right corner, respectively, of a first eye and a third landmark and a fourth landmark corresponding to a left corner and a right corner, respectively, of a second eye. In an embodiment, the vision sensor system is configured to generate the location data for the plurality of landmarks using a trained classifier. In a further embodiment, the trained classifier comprises a plurality of cascaded stages. An example trained classifier to determining the plurality of landmarks is described with reference to, for example, FIGS. 19A to 19D. Means for performing the functionality of step 1806 can include, but are not limited to and need not include, for example, peripheral circuitry 214 and microprocessor 216 of FIG. 2A; 2D integration hardware 236, hardware scanning window array 238, CV computation hardware 242, cascade classifier hardware 244, and microprocessor 216 of FIG. 2B; peripheral circuitry 214 of FIG. 3A; smart image array 213 and first processing unit 217 of FIG. 3B; first processing unit 217 of FIG. 3C; peripheral circuitry 1314 and microprocessor 1316 of FIG. 13; and/or peripheral circuitry 1414 and microprocessor 1416 of FIG. 14. In a step 1808, the generated data is sent to the second processing unit. The data generated from the one or more preparatory tasks can provide a "head start" to greatly improve the efficiency of iris-related operations such as iris detection and/or iris authentication performed at the second processing unit. Means for performing the functionality of step 1808 can include, but are not limited to and need not include, for example, microprocessor 216, memory 218, and data path for events/triggers of FIG. 2A; microprocessor 216 and interface 246 of FIG. 2B; first processing unit 217 as well as data path for outputs and/or events described in FIGS. 3A to 3C; microprocessor 1316, memory 1318, and data path for event and/or data from preparatory tasks of FIG. 13; and/or microprocessor 1416, memory 1418, and data path for event and/or data from preparatory tasks of FIG. 14.

FIG. 18B is a flowchart illustrating an optional step that may be added to process 1800 shown in FIG. 18A for sensing scene-based occurrences, in accordance with an embodiment of the disclosure. In a step 1810, an indication for an infrared (IR) light source to be lit is sent by the vision sensor system, in response to the processing of the one or more computed CV features indicating the presence of the one or more irises in the scene captured by the at least one sensor array. In an embodiment, the generating, by the vision sensor system, the data in support of iris-related operations comprises generating the data using readings from an IR sensor array captured while the IR light source is lit. In an embodiment, the at least one sensor array comprises two sensor arrays, a visual sensor array configured to capture visible light and the IR sensor array configured to capture IR light. In a further embodiment, the visual sensor array is configured to capture images at a first resolution, and the IR sensor array is configured to capture images at a second resolution higher than the first resolution. In an alternative embodiment, the at least one sensor array comprises the IR-capable visual sensor array, the IR-capable visual sensor capable of capturing both visual light and IR light.

FIG. 18C is a flowchart illustrating optional steps that may be added to process 1800 shown in FIG. 18A for sensing scene-based occurrences, in accordance with an embodiment of the disclosure. In a step 1812, an event is generated by the vision sensor system, in response to the processing of the one or more computed CV features indicating the presence of the one or more irises in the scene captured by the at least one sensor array. In a step 1814, the event is sent, by the vision sensor system, to the second processing unit, wherein the second processing unit is configured to, in response to receiving the event, transition from a first power state to a second power state, the second power state being associated with a higher power level than the first power state.

Example Landmark Detector

FIGS. 19A-19D depict various components of an example landmark detector, according to an embodiment of the present disclosure. The landmark detector could be implemented in various embodiments in, for example, peripheral circuitry 214 or microprocessor 216 of FIG. 2A; microprocessor 216 of FIG. 2B; peripheral circuitry 214 of FIG. 3A; smart image array 213 and first processing unit 217 of FIG. 3B; first processing unit 217 of FIG. 3C; peripheral circuitry 1314 and microprocessor 1316 of FIG. 13; and/or peripheral circuitry 1414 and microprocessor 1416 of FIG. 14. In general, a landmark detector can be implemented in software within a microprocessor or alternatively in hardware, or, some aspects may be implemented in software while others are implemented in hardware. The landmark detector may be trained to detect specific landmarks, or features, within an image. In one embodiment, the landmark detector is a trained, machine learning (ML) classifier that is comprised of a plurality of cascaded stages, each stage configured to output an improved estimate of the location data corresponding to the plurality of landmarks. It is understood that the description of the classifier below may describe a classifier that is different from the cascade classifier hardware 244 described with reference to FIG. 2B. One use of the landmark detector is detection of landmarks demarcating a region of interest (ROI) corresponding to the eyes of a user, within an IR image obtained from IR sensor array unit 1342 of FIG. 13 or IR-capable visual sensor array unit 1412 of FIG. 14, to support iris-related operations such as iris detection or iris authentication.

The landmark detector may be implemented, for instance, in peripheral circuitry (e.g., peripheral circuitry 214 in FIG. 2A, peripheral circuitry 1314 in FIG. 13, and peripheral circuitry 1414 in FIG. 14), a microprocessor (e.g., microprocessor 216 in FIG. 2A, microprocessor 1316 in FIG. 13, and microprocessor 1416 in FIG. 14), or a combination of both peripheral circuitry and one or more microprocessors, within a visual sensor system. In particular, the classifier components of the landmark detector may be implemented within a cascade classifier (e.g., cascade classifier hardware 244 of FIG. 2B) of the peripheral circuitry, using inputs data such as CV features generated from a CV computation unit (e.g., CV computation hardware 242 of FIG. 2B) of the peripheral circuitry.

Operation of the example landmark detector will be described using various scalars, vectors, matrices, and functions, by adopting notation below:

Scalars are in lowercase (e.g., u)

Vectors are in lowercase, bold (e.g., u)

Matrices and lookup tables are in uppercase (e.g., U)

Functions are in lowercase, followed by parenthesis (e.g., u(•))

Inputs to the landmark detector may include (1) an image, (2) a face bounding box, and (3) a landmark detector model. The face bounding box may be defined within the image. For simplicity of description, a square-shaped box with side c (default c=128 pixels) is assumed in the discussions below. However, a rectangular shaped bounding box may also be used. An example of a bounding box is bounding box 1610 defined within image 1600, as shown in FIG. 16.

The landmark detector model may comprise the following components:

$s_{R,\mu}$=mean shape vector, to be interpreted as a coarse shape estimate, with respect to a reference bounding box (denoted by suffix R, unit square with top left corner at 0).

Corresponding to regressor stage m=1 to M:

SRET$^{(m)}$: Shape Relative Encoding Table storing the relative locations of 512 feature pixels w.r.t. current shape estimate.

Table size is 512 rows×16 bits—from MSB to LSB, first two bits index one of the eyes' four landmarks' locations (00, 01, 10, 11 correspond to the left eye outer, left eye inner, right eye outer, and right eye inner landmarks, respectively), the next seven bits correspond to the relative offset of feature pixel location along the rows, and the final seven bits correspond to the same offset along the column dimension.

FIT$^{(m)}$: Feature Index Table storing information about the specific pairs of pixels that would need to be consumed by each of the 256 decision stumps comprising regressor stage m, i.e., each decision stump would take in as inputs the feature intensities at the locations encoded by the first 16 bits of FIT$^{(m)}$, and compare the intensity difference to a threshold as encoded by the last 8 bits in the entries of FIT$^{(m)}$.

Table size is 256 rows×24 bits—8 bits for index corresponding to feature pixel location 1, 8 bits for index corresponding to feature pixel location 2, and 8 bits for the value of threshold used in the decision tree stump that consumes these two feature pixel intensities.

$LNT^{(m)}$: Leaf Node Table storing the shape correction vector at each of the 512 leaf nodes in regressor stage m.

Table size is 512 rows×32 bits—each leaf node entry corresponds to an 8-dimensional shape correction vector.

$\alpha^{(m)}$: Scalar that controls the dynamic range of the leaf-node entries in $LNT^{(m)}$ Outputs of the landmark detector may consist of the locations of four eye landmarks, i.e., shape estimates $s_1 \in R^8$, corresponding to the four corners of the eyes of the user. Examples of such landmarks may be the landmarks 1602, 1604, 1606, and 1608 shown in FIG. 16. Here, the shape vector is an eight-dimensional vector (two coordinates to describe each of the four eye landmarks).

The operations of the landmark detector may be organized into four distinct steps, described in detail below.

Figure 19A:
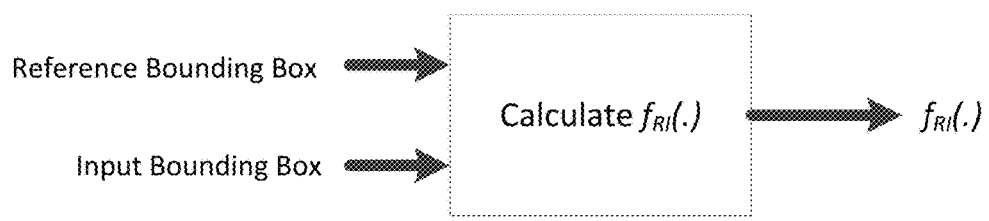
FIGS. 19A-19D depict various components of an example landmark detector, according to an embodiment of the present disclosure.

Step 1:

Compute the transformation $f_{RI}(\cdot)$ to transform any pixel $x \in R^2$ inside a reference bounding box (see table below) to the corresponding pixel $x' \in R^2$ inside the given input bounding box. Step 1 is illustrated in FIG. 19A.

|  | Length of each side | Top left corner coordinates |
|---|---|---|
| Reference bounding box (R) | 1 | 0 |
| Input bounding box (I) | c | a |

$$f_{RI}(x) = x' = a + cx$$

Default value for c=128.

It is common practice in machine learning/optimization to make sure the inputs/features to your classifier/regression algorithm are appropriately normalized, otherwise the objective functions for which the classifier is tuned for, may not produce the correct results. Here, the landmark detector (which implements a multivariate regression algorithm, in one embodiment) is be trained to operate inside the reference bounding box, and the transformation calculated above is therefore meant to facilitate going back and forth between the actual input bounding box (the real input to our algorithm) and the reference bounding box.

Figure 19B:
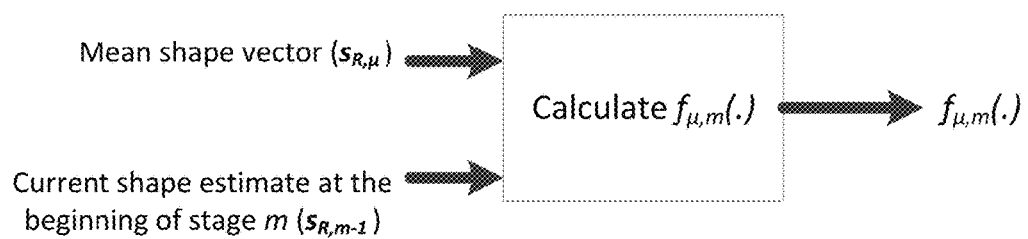

Step 2:

Initialize shape estimate in the reference bounding box to the "mean shape vector" that is stored as part of the model. Denote $s_{R,m}$=shape vector estimate, after regressor stage m, in the reference bounding box. Set $s_{R,0}=s_{R,\mu}$. (Note: $s_{R,\mu}$ is a special variable, and should not be interpreted as the $\mu^{th}$ stage of the Landmark algorithm regressors.). Step 2 is illustrated in FIG. 19B.

In the present embodiment, the landmark detector design is a cascade of several regression trees. The detector starts with an initial estimate of the shape vector, as described above. As operation proceeds through the various stages of the landmark detector, this shape estimate is refined further.

Figure 19C:
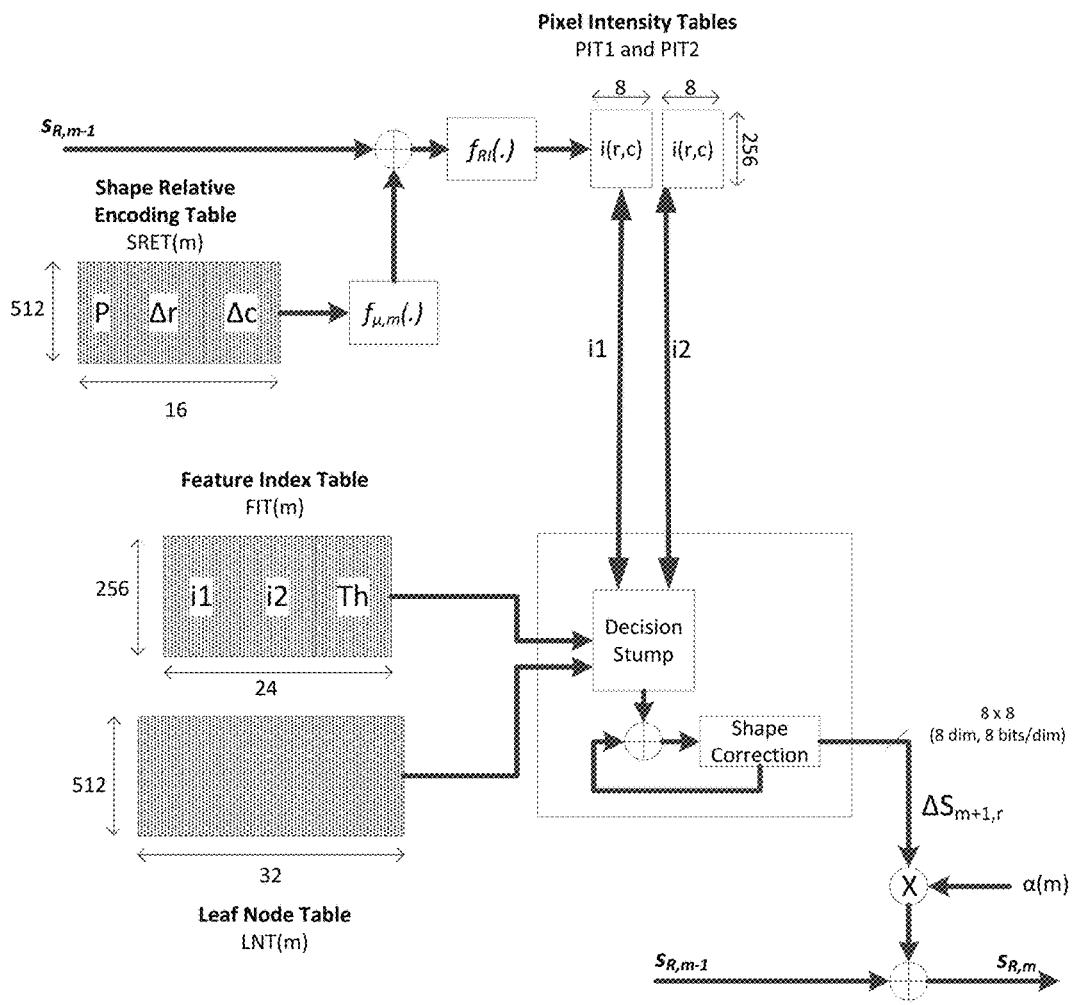

Step 3:

This is the main step that describes the operations in each of the stages of the multi-stage regression algorithm. Step 3 is illustrated in FIG. 19C. To clarify, at the beginning of this step, the available information includes the input bounding box, the model used by the landmark detector, the transformation to go from the input bounding box to the reference bounding box (see Step 1), and an initial shape estimate inside the reference bounding box (see Step 2).

Also, as mentioned previously, the role of each regressor stage in the landmark detector is to refine the shape estimate further, based on the observed input image, and this happens as follows. Corresponding to each stage, a Shape Relative Encoding Table is populated. The purpose of this table is to encode the locations of the various pixels that will be used for feature computation by this stage. Note that the locations of these pixels are all encoded relative to the locations of the current estimate of the shape vector, hence the name Shape Relative Encoding Table. In doing so, it is believed that the procedure becomes more robust to handling different facial poses and orientations (to a certain extent). In the procedure described below, Step A basically handles the transformation required to figure out the "relative encoding" part, and Step B performs the look up operation and tabulates feature values based on $SRET^{(m)}$, the transformation computed in Step A, and the input image.

Here, the computed features for each stage are simply 512 raw pixel intensities. A pair of these 512 values is consumed by a single decision stump (so there are 256 decision stumps at each stage of the landmark detector). Each decision stump outputs a correction to shape vector depending upon whether the difference of its two input pixel intensities is greater or less than a threshold.

The operations performed at each stage is described in steps A, B, and C below:

For stage m=1 to M, perform the following steps to obtain $s_{R,m}$:

A. Calculate transform $f_{\mu,m}(\cdot)$, which is basically a 2×2 rotation matrix, to go from mean shape vector $s_{R,\mu}=[u_1,u_2,u_3,u_4]$ to current shape estimate $s_{R,m-1}=[v_1,v_2,v_3,v_4]$ as follows (note that each $u_j$ and $v_k$ is a two-dimensional vector, corresponding to the (x,y) coordinates of one of the four eye landmarks).

Define $(\Delta u)_j = u_{j+1} - u_j$ for j=1, 2, 3 and $(\Delta v)_k = v_{k+1} - v_k$ for k=1, 2, 3.

The transform to be calculated is (s and $\theta$ are scale and rotation parameters encoding the transformation):

$$f_{\mu,m}(x) = \check{R}x \text{ where } \check{R} = \begin{pmatrix} s \cdot \cos\theta & s \cdot \sin\theta \\ -s \cdot \sin\theta & s \cdot \cos\theta \end{pmatrix},$$

$$s \cdot \cos\theta = \frac{\sum_i (\Delta u)_i^T (\Delta v)_i}{\sum_i \|(\Delta v)_i\|^2}, \quad s \cdot \sin\theta = \frac{\sum_i (\Delta u)_i \times (\Delta v)_i}{\sum_i \|(\Delta v)_i\|^2}$$

B. Based on $SRET^{(m)}$, $f_{\mu,m}(\cdot)$ and $s_{R,m-1}$, compute two pixel intensity tables $PIT_1$ and $PIT_2$ (each table comprises 256 rows×8 bits) as follows:

a. For each row r in $SRET^{(m)}$, look up the absolute pixel location in the reference bounding box (call this $p_r$). Note that $SRET^{(m)}$ provides the pixel locations in the reference bounding box, relative to current shape estimate $s_{R,m-1}$.

b. Transform $p_r$ to original input image coordinates to get $p'_r = f_{RI}(p_r)$.

c. Look up the input image intensity at location $p'_r$ and add it to one of the tables $PIT_1$ or $PIT_2$—the tables are populated in sequential order, i.e., rows 1 to 256 in $PIT_1$ followed by rows 1 to 256 in $PIT_2$.

C. Based on $FIT^{(m)}$, $LNT^{(m)}$, $PIT_1$ and $PIT_2$, update the current shape estimate $s_{R,m-1}$ to obtain the new shape estimate $s_{R,m}$ as follows:

$$s_{R,m} = s_{R,m-1} + \alpha^{(m)} \cdot \sum_{t=0}^{255} z_t^{(m)}$$

where $z_t^{(m)}$ is the shape correction vector output by the $t^{th}$ tree in regressor stage m, calculated as follows: (a)

look up the two feature pixel location indices encoded by row t in $FIT^{(m)}$; (b) compare the difference of two pixel intensities corresponding to the indices obtained in (a); recall that the intensities are stored in $PIT_1$ and $PIT_2$; (c) output $u_t^{(m)}$ as one of the leaf node entries from $LNT^{(m)}$ corresponding to the result of the comparison operation in (b).

Figure 19D:

Step 4:

Obtain the final shape vector estimate in the input image coordinates. The final shape vector contains the location estimates of the four landmarks. In this case, the four landmarks correspond to the left and right corner points of the first eye of the face, as well as the left and right corner points of the second eye, of the face within the input image. Examples of the four landmarks are landmarks 1602, 1604, 1606, and 1608 shown in FIG. 16. Step 4 is illustrated in FIG. 19D and expressed below:

$$s_I = f_{RI}(s_{R,M})$$

Pupil Size Control Using Visible Light

According to various embodiments of the present disclosure, pupil size is controlled using visible light, to provide iris shape normalization and improve the accuracy and efficiency of iris authentication. While implementations can vary, iris authentication essentially compares an iris region (or a representation thereof) of an unknown user against those of known users. As mentioned previously, iris authentication can be extremely effective, as the uniqueness of a single human iris is estimated to be on the order of one (1) in one million (1,000,000). Iris authentication using both eyes can attain uniqueness on the order of one (1) in one trillion (1,000,000,000,000). However, any distortion in the shape of the iris, e.g., as caused by the natural pupillary response of dilation or contraction associated with different light intensities, can degrade the quality of such iris comparisons. In various embodiments described below, the shape of the iris is normalized by the modulation of visible light to control pupil size, in order to minimize effects of iris distortion and promote the quality of iris comparisons.

Figure 20A:
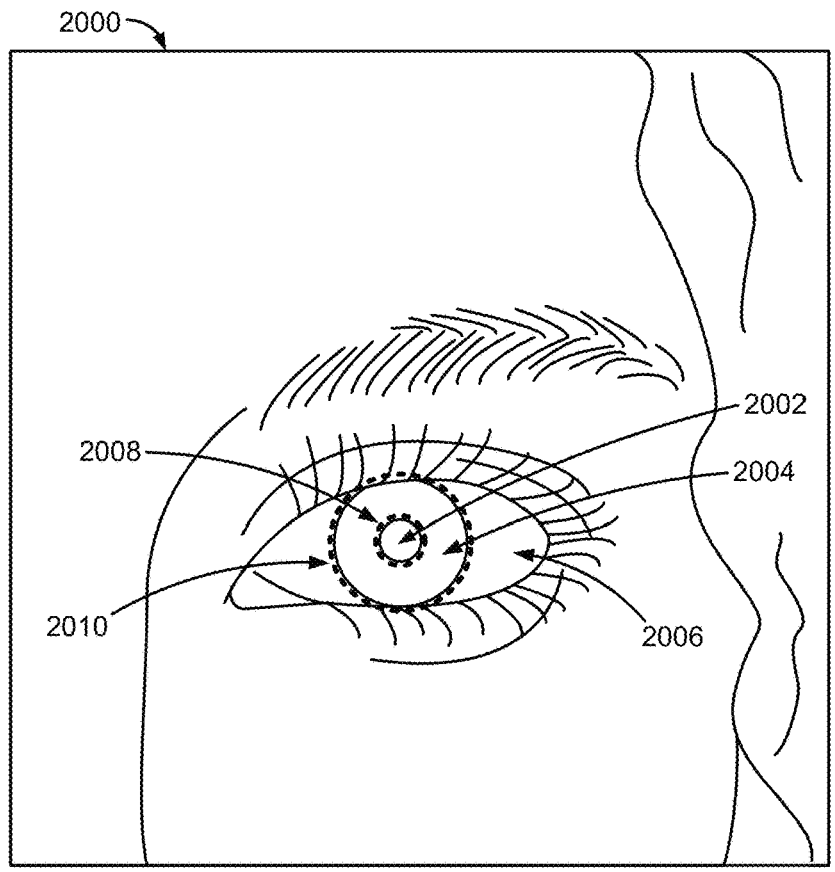
FIG. 20A shows an image of a user's eye comprising a pupil region, an iris region, and a sclera region.

FIG. 20A shows an image 2000 of an eye of a user. As can be seen in the image, the eye comprises a pupil region 2002, an iris region 2004, and a sclera region 2006. Based on image 2000, an inner circular boundary 2008 may be defined as separating the pupil region 2002 and the iris region 2004. An outer circular boundary 2010 may be defined as separating the iris region 2004 and the sclera region 2006.

Figure 20B:
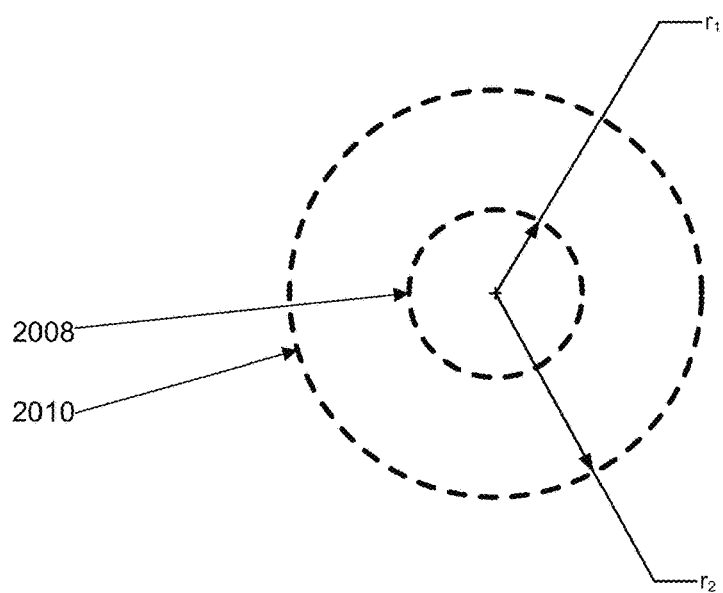
FIG. 20B illustrates size measurements for the inner circular boundary and outer circular boundary shown in FIG. 20A.

FIG. 20B illustrates size measurements for the inner circular boundary 2008 and outer circular boundary 2010 shown in FIG. 20A. Different size measurements indicative of the size of a circular boundary are possible. In one embodiment, a size measurement is based on radius. Alternatively, the size measurement may be based on diameter, or some other estimate. Here, the radius of each circular boundary is estimated. For example, a radius $r_1$ is measured for the inner circular boundary 2008. A radius $r_2$ is measured for the outer circular boundary 2010. A natural pupillary response associated with changing light intensities can cause a distortion in the shape of the iris region 2004. When the light intensity changes, the pupil reacts by either dilating or contracting. Thus, a distortion in the shape of the iris caused by changing light intensities is typically associated with a change in the size (e.g., $r_1$) of the inner circular boundary 2008, while the size (e.g., $r_2$) of the outer circular boundary 2010 remains relatively stable.

A distortion in the shape of the iris can seriously degrade the efficiency and quality of iris authentication. Under different light intensity conditions, even the same iris can appear very different to the iris authentication system—depending on how iris comparison is implemented. For example, an iris of a user can have a first shape under a dark lighting condition. The same iris of the same user can have a second shape (e.g., as caused by a more contracted pupil) under a brighter lighting condition. Comparing an image of the iris under the dark lighting condition against an image of the same iris under the brighter lighting condition can result in a mismatch, simply due to the change in the shape of the iris. This is because as the shape of the iris changes radially (i.e., as the inner circular boundary 2008 expands and contracts), the shape and location of the fine features within the iris change radially, as well. A technique that simply compares a rectangular two-dimensional (2-D) sampling window taken from the image of the iris while it has the first shape (under the dark lighting condition) against a similar rectangular 2-D sampling window taken from the image of the iris while it has the second shape (under the brighter lighting condition) can easily lead to a mismatch, even though the two images depict the same iris. Simply scaling the rectangular 2-D sampling window in the x and/or y direction cannot cancel out the distortion of the iris shape, which is radial in nature. While it is mathematically possible to computationally account for such a distortion, e.g., by mapping the annulus shape of the iris into a rectangular shape, such complicated techniques would be computationally intensive and may be impractical, especially for an iris authentication operation that is performed in real-time by devices with limited computing and power resources.

Figure 21:
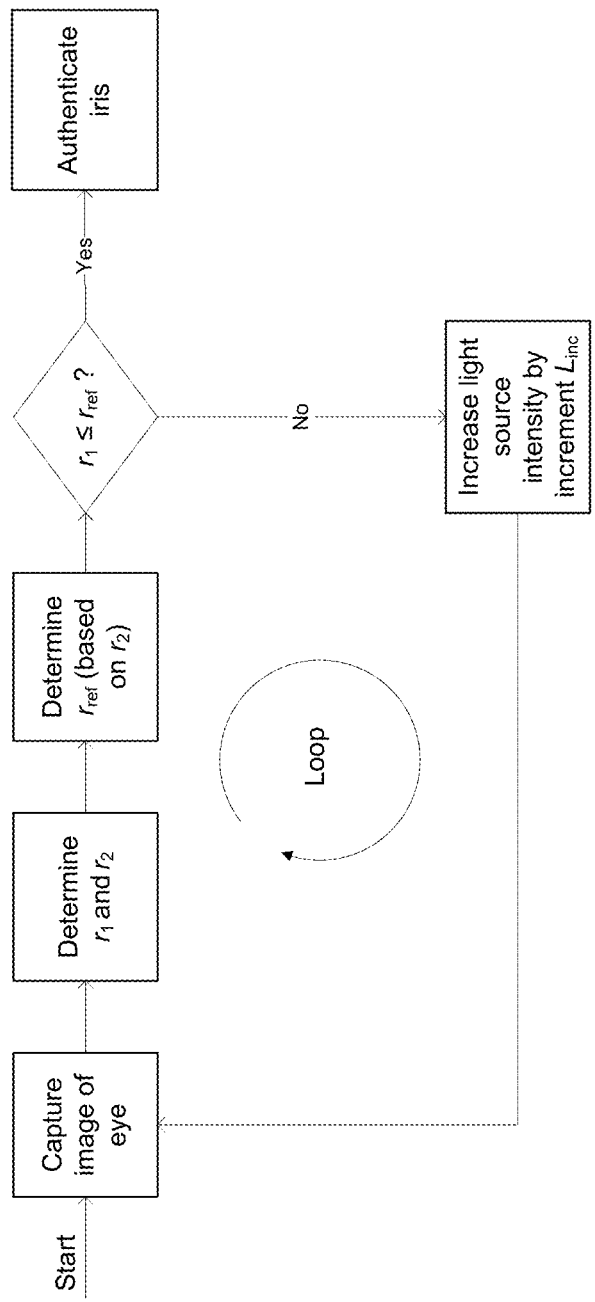
FIG. 21 is a block diagram illustrating a technique to incrementally increase the intensity of a visible light source and change the shape of the iris, until a condition based on the value $r_1$ is satisfied, to facilitate iris authentication in accordance with an embodiment of the disclosure.

FIG. 21 is a block diagram illustrating a technique to incrementally increase the intensity of a visible light source and change the shape of the iris, until a condition based on a measure the size of the inner circular boundary, the value $r_1$, is satisfied, to facilitate iris authentication in accordance with an embodiment of the disclosure. In each loop iteration, a new image of the user's eye is captured. The radius $r_1$ of the inner circular boundary separating the pupil region and the iris region is determined. The radius $r_2$ of the outer circular boundary separating the iris region and the sclera region is also determined. Next, a reference radius $r_{ref}$ may be determined. In one embodiment, the reference radius $r_{ref}$ is determined based on $r_2$, e.g., by using a lookup table. Here, the reference radius $r_{ref}$ represents a threshold to which the inner radius $r_1$ is meant to reach, by incremental adjustment. Having the inner radius $r_1$ reach the reference threshold $r_{ref}$ corresponds to achieving a satisfactory iris shape. Accordingly, as shown in the figure, a decision step compares the inner circular radius $r_1$ to the reference radius $r_{ref}$. If the inner circular radius $r_1$ is greater than (not less than or equal to) the reference radius $r_{ref}$, the system increases the intensity of a light source by an increment value $L_{inc}$. While a single visible light source is described in the present embodiment, one or more visible light sources may be used to adjust the intensity of visible light directed to the eye of the user to effectuate pupil size adjustment, according various embodiments of the disclosure. Returning to FIG. 21, by increasing the amount of visible light directed at the eye, the size of pupil may be decreased as result of the natural pupillary response of the eye. The iterative process then returns to the initial step, where a new image is captured. Here, the new image is captured while the eye of the user is under the effects of the pupillary response resulting from being exposed to the increased amount of light from the visible light source. The process may continue in this fashion in a loop, to iteratively increase the intensity of the visible light source and decrease the size of the user's pupil, until the proper size of the iris is reached—i.e., until $r_1$ is determined to be less than or equal to $r_{ref}$. If the inner circular radius $r_1$ is less than or equal to the reference radius $r_{ref}$, the system exits the loop. At this point, the shape of the iris is deemed to be satisfactorily normalized, and iris authentication is performed. The iris authentication operation may be performed using the latest image captured of the eye, i.e., the image captured during the last iteration of the loop.

While FIG. 21 illustrates incrementally increasing the intensity of the visible light source and decreasing the size of the user's pupil, until the proper size of the pupil is reached. In an alternatively embodiment, the intensity of the visible light source can be incrementally decreased and the user's pupil incrementally increased, until the proper size of the pupil is reached. Thus, as used in the present disclosure, "incrementing" the intensity of a visible light source refers to either increasing or decreasing the intensity by an incremental value, e.g., by an increment value $L_{inc}$.

Use of the values $r_1$ and $r_{ref}$ in the decision step of this particular embodiment obviates the need to perform a computationally costly division operation. Generally speaking, the degree of distortion of the shape of the iris due to the pupillary response may be characterized by the ratio $r_1/r_2$. Thus, iris shape distortion across iris scans may be effectively controlled by normalizing the ratio $r_1/r_2$. However, direct computation of the $r_1/r_2$ ratio requires a division operation, which may be computationally intensive. Instead of relying on such a ratio, the present embodiment utilizes the value $r_{ref}$. For instance, $r_{ref}$ may be determined based the value of $r_2$, e.g., by using a table lookup. By comparing $r_1$ to $r_{ref}$ instead of comparing $r_1/r_2$ to a target ratio, the present embodiment can simulate a normalization based on the ratio $r_1/r_2$ and yet avoid a division operation.

Generally speaking, iris authentication involves (1) obtaining an iris data record of the user to be authenticated and (2) comparing the iris data record of the user to one or more registered iris data records, to authenticate the user. The iris data record is derived from the image of the iris. The iris data record may be generated from the image of the iris in many different ways. Various techniques may be employed individually or in combination, such as windowing, computer vision (CV) feature computation, checksums, digests, hash functions, etc. Regardless of how the iris data record is generated, embodiments of the present disclosure utilizes the natural pupillary response of the eye to adjust the shape of the iris prior to image capture, in order to provide iris shape normalization and improve the accuracy and efficiency of iris authentication.

In various embodiments of the present disclosure, the visible light source may be mounted on a device such as mobile device 1200 and oriented toward the user. The light source may be capable of outputting visible light of a controllable intensity. Here, the light source may output light in the visible spectrum for purposes of controlling pupil size, because the human pupil typically contracts and dilates in response to different intensities of light in the visible spectrum.

While visible light is used to control the shape of the iris through the effects of pupillary response, the image captured of the eye may or may not involve use of IR illumination. IR light is often used to highlight internal features and details of the iris when capturing an image for purposes of iris authentication. Embodiments of the present disclosure may be implemented flexibly, either with or without IR illumination. In one example, no IR illumination is used. Here, only visible light is used, and it serves to both control the shape of the iris and provide illumination for the capture of the image of the eye for iris authentication. Thus, only a visible light source may be used. Alternatively, visible light may be used to control the shape of the iris, while IR light is used to highlight iris features in capturing the image of the eye for iris authentication. In one example, the visible light source may be implemented as a separate light source from an IR light source. Referring to FIG. 13, in addition to the IR light source 1330, an additional visible light source (not shown) may be deployed that is also oriented toward the user. In another example, both visible light and IR light are provided by a single light source. Here, referring again to FIG. 13, the IR light source 1330 may output light that has components in both the visible spectrum and components in the IR spectrum. These and other embodiments can be adopted to implement various combinations visible illumination and/or IR illumination for purposes of controlling iris shape and generating images suitable for iris authentication.

Figure 22:
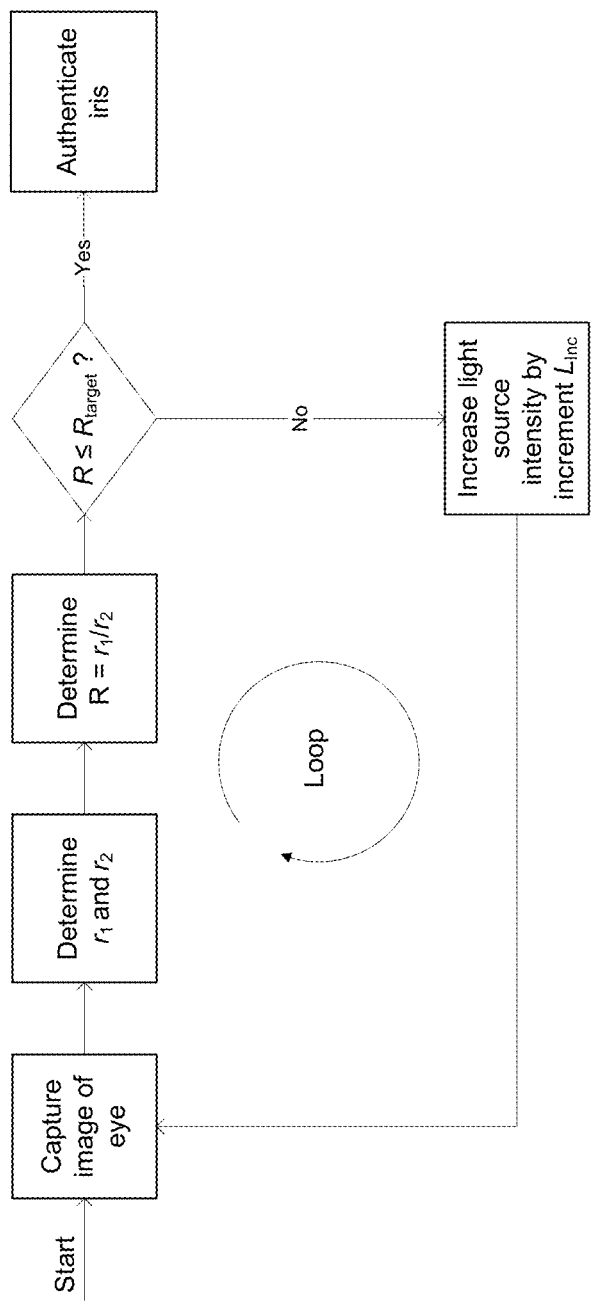
FIG. 22 is a block diagram illustrating a technique to incrementally increase the intensity of a visible light source and change the shape of the iris, until a condition based on the ratio $r_1/r_2$ is satisfied, to facilitate iris authentication in accordance with an embodiment of the disclosure.

FIG. 22 is a block diagram illustrating a technique to incrementally increase the intensity of a visible light source and change the shape of the iris, until a condition based on a measure of the size of the inner circular boundary, in this example the ratio $r_1/r_2$ (where the measure of the size of the inner circular boundary here is further based on the outer circular boundary as well), is satisfied, to facilitate iris authentication in accordance with an embodiment of the disclosure. FIG. 22 is similar to FIG. 21, except that instead of using the value $r_1$, the ratio $r_1/r_2$ is used to compare against a threshold to determine whether the desired shape of the iris has been reached. However, it is understood that a condition based on the value $r_1$ would include any condition based on $r_1$ without reference to $r_2$ as well as any condition based on $r_1$ with reference to $r_2$, as in the present example, a condition based on the ratio $r_1/r_2$. As discussed previously, use of the ratio $r_1/r_2$ may require a division operation, which can be computationally expensive, which may be a disadvantage of adopting this particular embodiment. Returning to FIG. 22, once the image of the eye is captured, the size measurements $r_1$ and $r_2$ are determined. Then, the ratio $R=r_1/r_2$ is determined. If the ratio R is less than or equal to a target ratio $R_{target}$, then the iterative process ends and proceeds to iris authentication. Otherwise, the intensity of the visible light source is incremented by an amount $L_{inc}$. By increasing the amount of visible light directed at the eye, the size of pupil may be decreased as result of the natural pupillary response of the eye. The iterative process then returns to the initial step, where a new image is captured. Here, the new image is captured while the eye of the user is under the effects of the pupillary response resulting from being exposed to the increased amount of light from the visible light source. The process may continue in this fashion in a loop, to iteratively increment the intensity of the visible light source and decrease the size of the user's pupil, until the proper size of the iris is reached—i.e., until the ratio $R=r_1/r_2$ is determined to be less than or equal to $R_{target}$. The system then exits the loop. At this point, the shape of the iris is deemed to be satisfactorily normalized, and iris authentication is performed. Again, the iris authentication operation may be performed using the latest image captured of the eye, i.e., the image captured during the last iteration of the loop.

Figure 23:
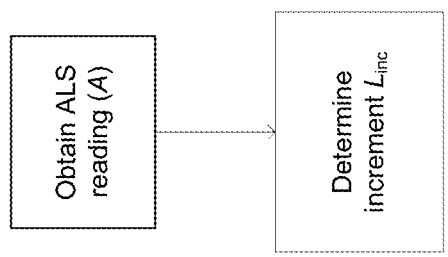
FIG. 23 is a block diagram illustrating an optional technique to define the visible light source intensity increment $L_{inc}$ utilized in FIGS. 21 and 22, based on a reading from an ambient light sensor (ALS).

FIG. 23 is a block diagram illustrating an optional technique to define the visible light source intensity increment $L_{inc}$ utilized in FIGS. 21 and 22, based on a reading from an ambient light sensor (ALS). Generally speaking, the brighter the environment (i.e., high ALS reading), the larger the increment. In a brighter environment, the user's eye is less sensitive to changes in light intensity, and therefore the increment $L_{inc}$ is set at a larger value. Conversely, the dimmer the environment (i.e., low ALS reading), the smaller the increment. In a dimmer environment, the user's eye is more sensitive to changes in light intensity, and therefore the increment $L_{inc}$ is set at a smaller value.

Figure 24:
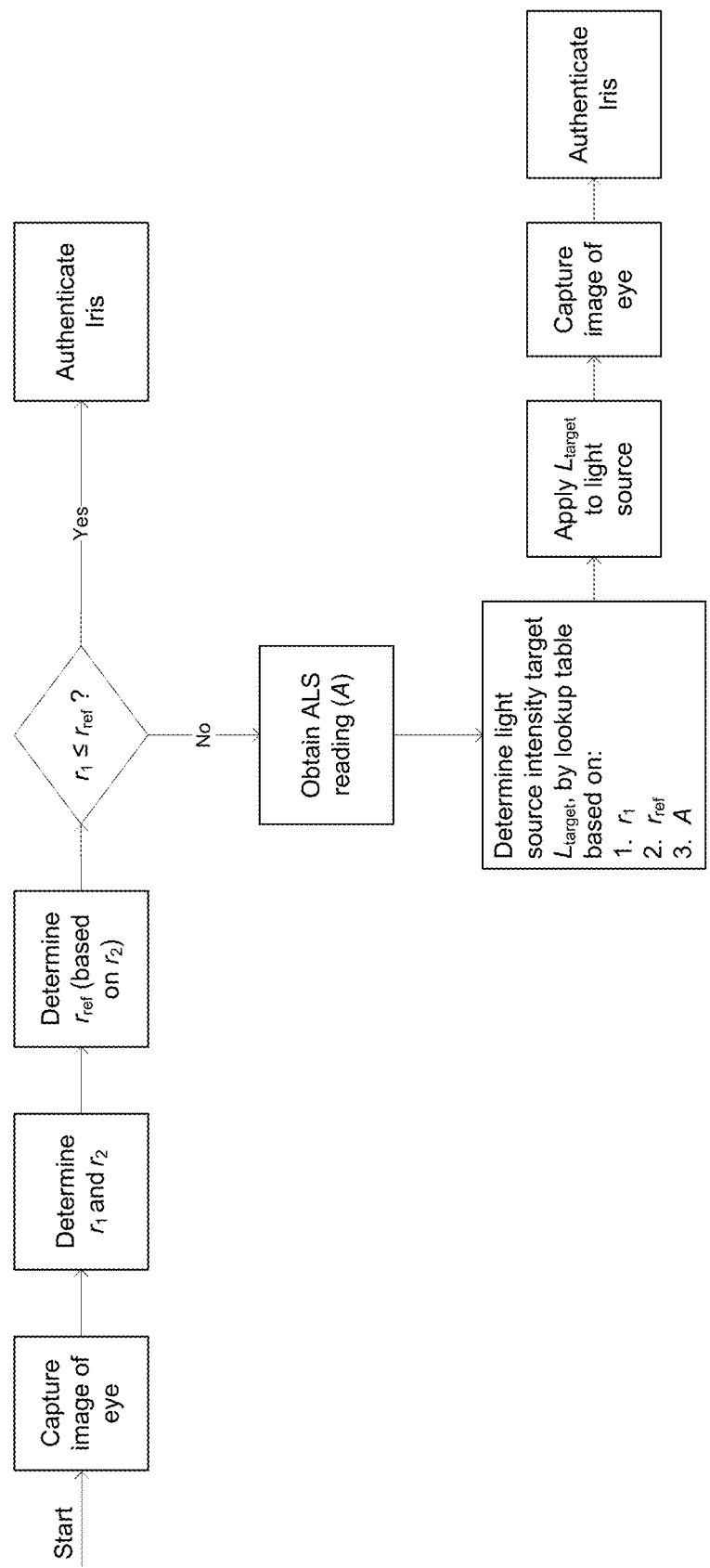
FIG. 24 is a block diagram illustrating a technique to directly determine the appropriate intensity level of a visible light source based on the value $r_1$ and change the shape of the iris, to facilitate iris authentication in accordance with an embodiment of the disclosure.

FIG. 24 is a block diagram illustrating a technique to directly determine the appropriate intensity level of a visible light source based on the value $r_1$ and change the shape of the iris, to facilitate iris authentication in accordance with an embodiment of the disclosure. Here, initial steps are similar to those shown in FIG. 21. For example, a new image of the user's eye is captured. The radius $r_1$ of the inner circular boundary separating the pupil region and the iris region is determined. The radius $r_2$ of the outer circular boundary separating the iris region and the sclera region is also determined. In addition, a reference radius $r_{ref}$ may be determined. The reference radius $r_{ref}$ represents a threshold to which the inner radius $r_1$ is meant to reach. If the $r_{ref}$ is less than or equal to the reference radius $r_{ref}$, the iris is deemed appropriately shaped, and the process proceeds to iris authentication. Otherwise, i.e., if $r_1$ is greater than (not less than or equal to) $r_{ref}$, the process adjusts the intensity of the visible light source in order to normalize the shape of the iris.

However, instead of incrementally adjusting the intensity of light outputted to the eye, the appropriate light intensity level $L_{target}$ is directly determined based on the value $r_1$. In a particular embodiment, the value $L_{target}$ is determined, e.g., by table lookup, based on three inputs: (1) radius $r_1$, (2) the reference radius $r_{ref}$, and (3) A, an ALS reading. In this embodiment, the lookup table is a three-dimensional table, with inputs being $r_1$, $r_{ref}$, and A. The output is the target intensity level $L_{target}$ for the visible light source. Next, the visible light source is adjusted according to the intensity level $L_{target}$. An image of the eye is captured while the eye of the user is under the effects of the pupillary response resulting from being exposed to the increased amount of light from the visible light source. Finally, the process proceeds to iris authentication.

Figure 25:
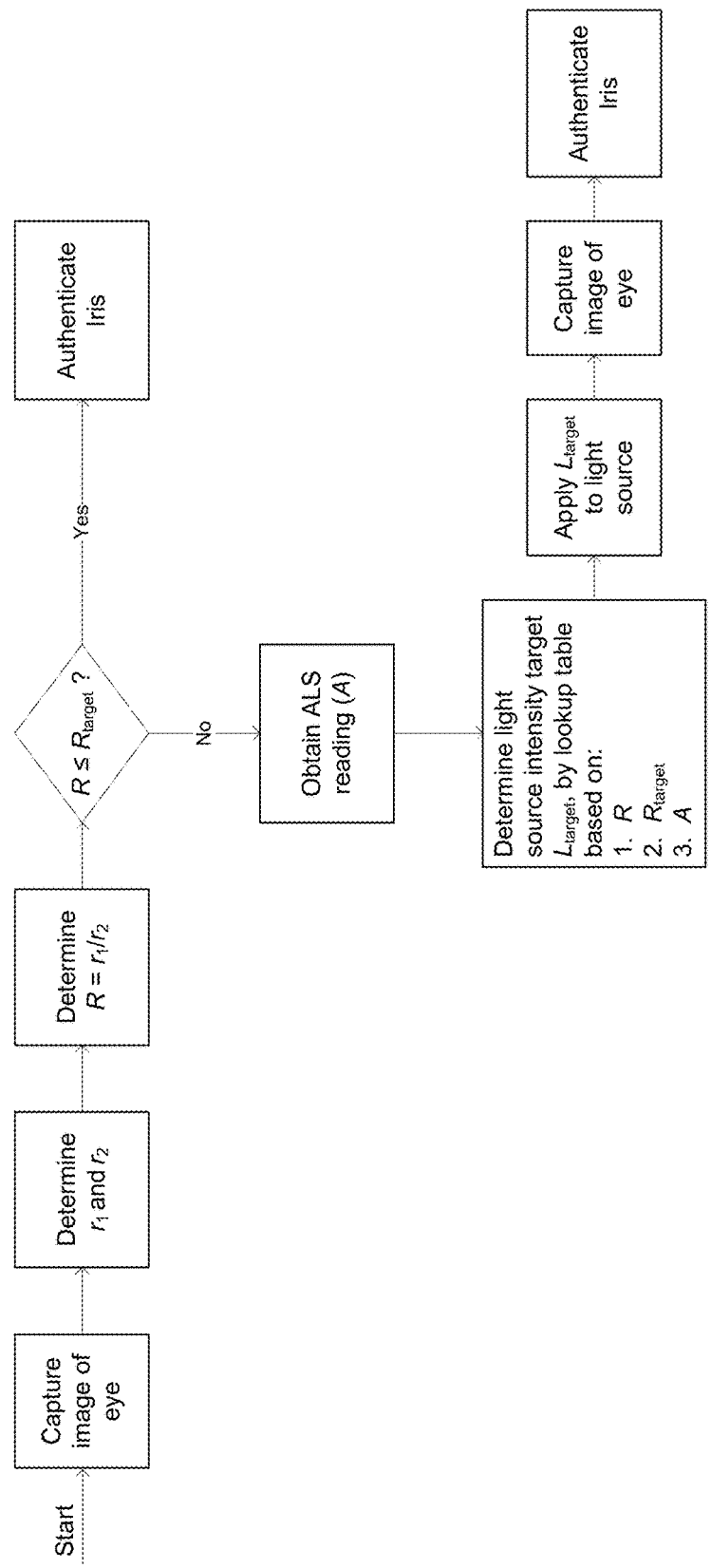
FIG. 25 is a block diagram for a technique to directly determine the appropriate intensity level of a visible light source based on the ratio $r_1/r_2$ and change the shape of the iris, to facilitate iris authentication in accordance with an embodiment of the disclosure.

FIG. 25 is a block diagram for a technique to directly determine the appropriate intensity level of a visible light source based on the ratio $r_1/r_2$ and change the shape of the iris, to facilitate iris authentication in accordance with an embodiment of the disclosure. FIG. 25 is similar to FIG. 24, except that instead of using the value $r_1$, the ratio $r_1/r_2$ is used to compare against a threshold to determine whether the desired shape of the iris has been reached. As discussed previously, use of the ratio $r_1/r_2$ may require a division operation, which can be computationally expensive, which may be a disadvantage of adopting this particular embodiment. Returning to FIG. 25, once the image of the eye is captured, the size measurements $r_1$ and $r_2$ are determined. Then, the ratio $R=r_1/r_2$ is determined. If the ratio R is less than or equal to a target ratio $R_{target}$, then the iterative process ends and proceeds to iris authentication. Otherwise, i.e., if R is greater than (not less than or equal to) $R_{target}$, the process adjusts the intensity of the visible light source in order to normalize the shape of the iris.

Instead of incrementally adjusting the intensity of light outputted to the eye, the appropriate light intensity level $L_{target}$ is directly determined based on the ratio R. In a particular embodiment, the value $L_{target}$ is determined, e.g., by table lookup, based on three inputs: (1) the ratio R, (2) the target ratio $R_{target}$, and (3) A, the ALS reading. Again, the lookup table may be a three-dimensional table. Next, the visible light source is adjusted according to the intensity level $L_{target}$, and an image of the eye is captured while the eye of the user is under the effects of the pupillary response resulting from being exposed to the increased amount of light from the visible light source. Finally, the process proceeds to iris authentication.

In other embodiments, a lookup table may be omitted. For example, it may be possible to define the target intensity setting $L_{target}$ as a function of R, $R_{target}$, and A:

$$L_{target}=F\{R,R_{target},A\}$$

In a more specific example, the function F { } may be defined based on the difference between the measured ratio R and the target ratio:

$$L_{target}=K/[A*(R-R_{target})]; K \text{ being a constant}$$

Figure 26:
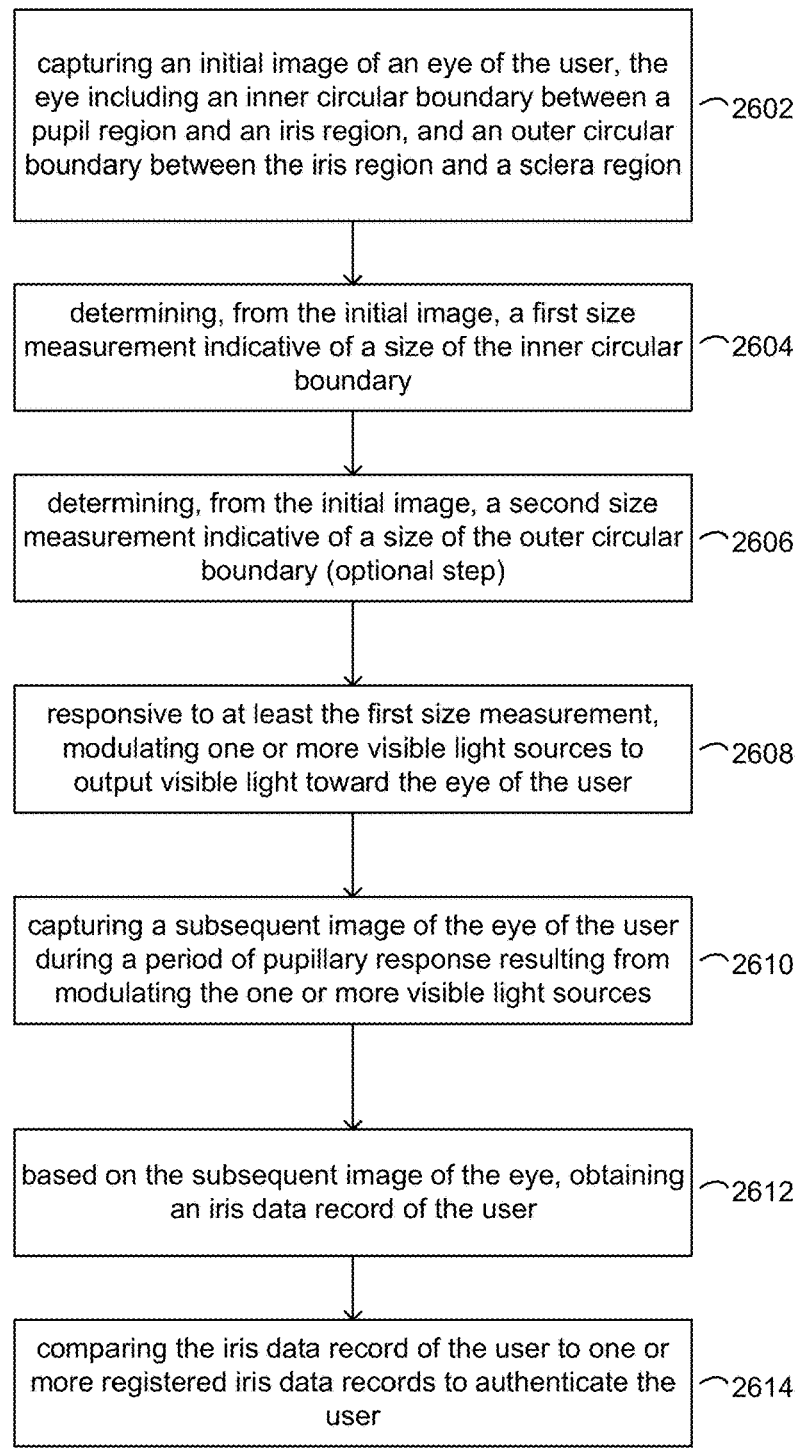
FIG. 26 is a flow chart illustrating representative steps in a process for controlling iris shape by utilizing pupillary response to light in order to facilitate iris authentication, according to an embodiment of the present disclosure.

FIG. 26 is a flow chart illustrating representative steps in a process 2600 for controlling iris shape by utilizing pupillary response to light in order to facilitate iris authentication, according to an embodiment of the present disclosure. In a step 2602, an initial image of an eye of the user is captured. The image may be captured using one or more image sensors, such as the monochrome visual sensory array unit 1312 or the IR sensor array unit 1342 of FIG. 13. Means for performing the functionality of step 2602 can include, but are not limited to and need not include, for example, visual sensor array 1312, IR sensor array 1342 of FIG. 13; IR-capable visual sensor array 1412 of FIG. 14; and/or input device(s) 3570 of FIG. 35. The image may include an inner circular boundary between a pupil region and an iris region and an outer circular boundary between the iris region and a sclera region. In a step 2604, a first size measurement indicative of a size of the inner circular boundary is determined from the initial image. In an optional step 2606, a second size measurement indicative of a size of the outer circular boundary is determined from the initial image. Alternatively to optional step 2606, an average outer iris boundary value (e.g., for a human population) may be used as the second size measurement indicative of the size of the outer circular boundary since the outer circular boundary does not change as a result of exposure to light, while the inner circular boundary does react to light exposure. In one embodiment of either steps 2604 or 2606, to maintain low electrical power operation, the determining of the first or second size measurement could be performed within the visual sensor system 1310 of FIG. 13 or 1410 of FIG. 14, although it is understood that the same could be performed in a main processor instead. Means for performing the functionality of steps 2604 and/or 2606 can include, but are not limited to and need not include, for example, peripheral circuitry 1314, microprocessor 1316, and main processor 1320 of FIG. 13; peripheral circuitry 1414, microprocessor 1416, and main processor 1420 of FIG. 14; and/or processing unit(s) 3510, DSP 3520, and input device(s) 3570 of FIG. 35. In a step 2608, responsive to at least the first size measurement, one or more visible light sources are modulated to output visible light toward the eye of the user. Means for performing the functionality of steps 2608 can include, but are not limited to and need not include, for example, microprocessor 1316 and main processor 1320 of FIG. 13; microprocessor 1316 and main processor 1320 1412 of FIG. 14; and/or processing unit(s) 3510, bus 3505, output device(s) (such as an light emitting diode light source or a display that emits light) 3515 of FIG. 35. In a step 2610, a subsequent image of the eye of the user is captured during a period of pupillary response resulting from modulating the one or more visible light sources. The image may be captured using the one or more image sensors. Means for performing the functionality of step 2610 can include, but are not limited to and need not include, for example, visual sensor array 1312, IR sensor array 1342 of FIG. 13; IR-capable visual sensor array 1412 of FIG. 14; and/or processing unit(s) 3510 and input device(s) 3570 of FIG. 35. In a step 2612, based on the subsequent image of the eye, an iris data record of the user is obtained. Means for performing the functionality of step 2612 can include, but are not limited to and need not include, for example, peripheral circuitry 1314, microprocessor 1316, and main processor 1320 of FIG. 13; peripheral circuitry 1414, microprocessor 1416, and main processor 1420 of FIG. 14; and/or processing unit(s) 3510, DSP 3520, and input device(s) 3570 of FIG. 35. Finally, in a step 2614, the iris data record of the user is compared to one or more registered iris data records, to authenticate the user. In one implementation of comparing the iris data record of the user to the one or more registered iris data records, comparison of the iris data record may be performed in a manner similar to face detection described with reference of FIG. 2B. Alternatively, the comparing the iris data record of the user to the one or more registered iris data records may be performed using various techniques in the main processors of a mobile device, for example, main processor 220 of FIG. 2A, main processor 1320 of FIG. 13, and/or main processor of FIG. 14.

Here, the term "modulate" refers to an adjustment to activate, deactivate, increase intensity, decrease intensity, or otherwise adjust the output of the one or more visual light sources. The one or more visible light sources may be implemented as one light source or multiple light sources. Increasing the intensity of the output of the one or more visible light sources may involve increasing the intensity values of some or all of the one or more visible light sources, increasing the frequency, duty cycle (especially LED light source), or other characteristics of some or all of the one or more visible light sources, or simply activating additional visible light source(s). Similarly, decreasing the intensity of the one or more visible light sources may involve decreasing the intensity values of some or all of the one or more of the visible light sources, decreasing the frequency, duty cycle, or other characteristics of some or all of the one or more visible light sources, or simply deactivating some of the one or more visible light sources. Furthermore, the one or more visible light sources may be implemented separately from one or more IR light sources. For example, a visible light source may be employed in addition to the IR light source 1330 shown in FIG. 13. Alternatively, a visible light source may be implemented as a combined light source that outputs light having components in both the visible spectrum and the IR spectrum.

In one embodiment, modulating the one or more visible light sources comprises increasing the visible light output toward the eye of the user upon determining that the first size measurement exceeds a reference size. In a specific embodiment, the reference size is determined based on the second size measurement. In another embodiment, modulating the one or more visible light sources comprises increasing the visible light output toward the eye of the user upon determining that a size ratio, based on the first size measurement and the second size measurement, exceeds a target ratio.

One embodiment involves a technique for repeating the modulating the one or more visible light sources, the capturing the subsequent image of the eye of the user during the period of pupillary response, and the determining of size measurements from the subsequent image, for a series of increments of an intensity of the visible light. An example of such a technique is illustrated in FIG. 21. For each increment, the technique comprises (a) modulating the one or more visible light sources by incrementing the intensity of the one or more visible light sources, (b) capturing the subsequent image of the eye of the user during the each increment, and (c) determining, from the subsequent image of the each increment, a first size measurement indicative of the size of the inner circular boundary and a second size measurement indicative of the size of the outer circular boundary. As mentioned previously, "incrementing" the intensity of the visible light source refers to either increasing or decreasing the intensity by an incremental value. Here, (a), (b), and (c) are repeated until an iris size or ratio requirement is met, based on the first size measurement and the second size measurement. Furthermore, the obtaining the iris data record of the user comprises obtaining the iris data record of the user based on the subsequent image of the eye for the increment during which the iris size or ratio requirement is met. In a specific embodiment, modulating the one or more visible light sources by incrementing the intensity of the one or more visible light sources comprises increasing the intensity of the one or more visible light sources by an increment amount for the each increment, the increment amount being determined based on an environmental reading from a light sensor. In a further specific embodiment, the environmental reading is an ambient light sensor (ALS) reading.

In one embodiment, the process involves determining a target brightness setting for the one or more visible light sources. The process further involves modulating the one or more visible light sources according to the target brightness setting prior to capturing the subsequent image of the eye of the user. In a specific embodiment, the target brightness setting of the one or more visible light sources is determined based on (1) the first size measurement, (2) the second size measurement, and (3) a brightness reading. In a further specific embodiment, the environmental reading is an ambient light sensor (ALS) reading.

One or more processing units may be used to perform or control various steps described above, such as the capturing of the initial and subsequent images, the determination of the first and second size measurements from the first image, modulation of the visible light source in response to the first and second size measurements, obtaining of the iris data record, and comparison of the iris data record to one or more registered iris data records. Furthermore, the one or more processing units may be part of a vision sensor system, such as vision sensor system 1310 shown in FIG. 13, that includes dedicated CV computation hardware (such as in peripheral circuitry 1314) in addition to the one or more processing units (such as microprocessor 1316). Alternatively, the one or more processing units may not be implemented as part of a vision sensor system. For example, the one or more processing systems may comprise a processing unit such as main processing unit 1320 show in FIG. 13.

In one embodiment, process 2600 may further comprise steps for determining a target brightness setting for the one or more visible light sources and modulating the one or more visible light sources according to the target brightness setting prior to capturing the subsequent image of the eye of the user. In a specific embodiment, the target brightness setting of the one or more visible light sources is determined based on (1) the first size measurement, (2) the second size measurement, and (3) a brightness reading. In a further specific embodiment, the environmental reading is an ambient light sensor (ALS) reading.

Sector-Based Iris Authentication

According to various embodiments of the present disclosure, iris authentication is performed using fewer than all of the sectors defined over an iris region, thereby improving efficiency. Furthermore, by reducing the computation complexity involved in authenticating an entire iris, iris authentication may now optionally be performed using lower electrical power visual sensors systems, such as those illustrated above with reference to FIGS. 2A, 13 and 14, and need not be performed on main processors of a mobile device. Sectors may be selected based on their distinctiveness. Iris authentication, which involves the comparison of an image of the iris of a user against those of known users, may require numerous operations that are computationally intensive. Exhaustive comparison of the entire region of a user's iris against known data records can require significant computational resources and processing delay. Recognizing that visible features and indeed the distinctiveness of visible features within a human iris are often non-uniformly distributed, the present disclosure presents various approaches for sectorizing the iris and performing iris authentication using only those sectors selected based on a measure of distinctiveness of the sector. Such approaches can greatly improve the efficiency of the iris authentication operation.

Figure 27:
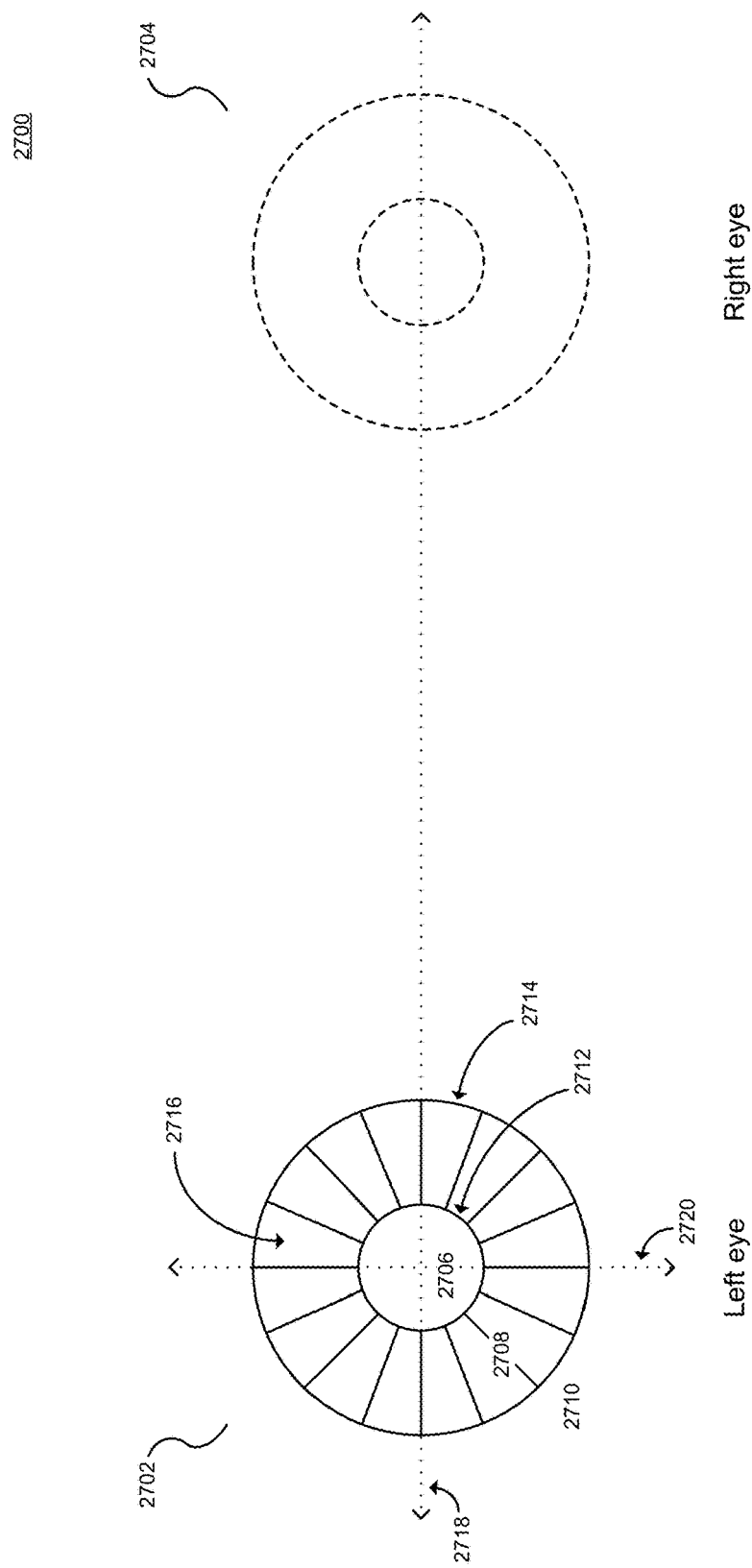
FIG. 27 illustrates a manner by which a plurality of sectors may be defined for an iris region within a captured image of an eye, according to an embodiment of the disclosure.

FIG. 27 illustrates a manner by which a plurality of sectors may be defined for an iris region within a captured image of an eye, according to an embodiment of the disclosure. Image 2700 is an image that includes a left eye 2702 and a right eye 2704 of a user. For purposes of illustration, sectorization of the iris region of the left eye is described. Here, the left eye includes a pupil region 2706, an iris region 2708, and a sclera region 2710. An inner circular boundary 2712 separates the pupil region 2706 and the iris region 2708. An outer circular boundary 2714 separates the iris region 2708 and the sclera region 2710.

A plurality of sectors of the iris region 2708 may be defined, using a facial feature within the image as a reference point. In the embodiment shown in FIG. 27, the center of the other eye, i.e., the right eye 2704, is used as the reference point. Based on this reference point, a plurality of sectors may be defined. Whenever an iris is examined, including for purposes of registration and authentication, it may be advantageous to have the ability to consistently define the same sectors over the iris region being examined. By using a reference point, such as the center of the other eye, the plurality of sectors can be consistently defined over the iris region being examined.

In the present embodiment, sixteen equally sized, identically shaped sectors are defined. In the example shown in FIG. 27, each sector has the shape of a segment of an annulus. Here, the sectors are identically sized and shaped, but have different orientations. The plurality of sixteen sectors shown in the figure may be defined by using image processing to locate the inner circular boundary 2712 and outer circular boundary 2714 of the eye, defining an annulus shape between the inner and outer boundaries, and dividing the annulus shape into sixteen equal-size segments. However, doing so does not address the rotational position of the sixteen segments.

Using a reference point that is a fixed feature on the user's face, such as the center of the other eye, i.e., right eye 2704, may resolve this rotational ambiguity. For example, once the center of the other eye is found, it may be used to define a 2-D coordinate system with an X-axis 2718 and Y-axis 2720. The X-axis 2718 may be defined as intersecting the center of the left eye 2702 and the center of the right eye 2704. The Y-axis 2720 may be defined as being perpendicular to the X-axis 2718 and intersecting the X-axis at the center of the left eye 2702. A first sector 2716 can then be defined as starting at a particular position with respect to the X-axis 2718 or Y-axis 2720. As shown in FIG. 27, the first sector 2716 starts at a position adjacent to the positive portion of the Y-axis 2720. The remaining fifteen sectors may then be defined accordingly. Sixteen equally sized, identically shaped sectors may thus be defined for iris region 2708.

Figure 28A:
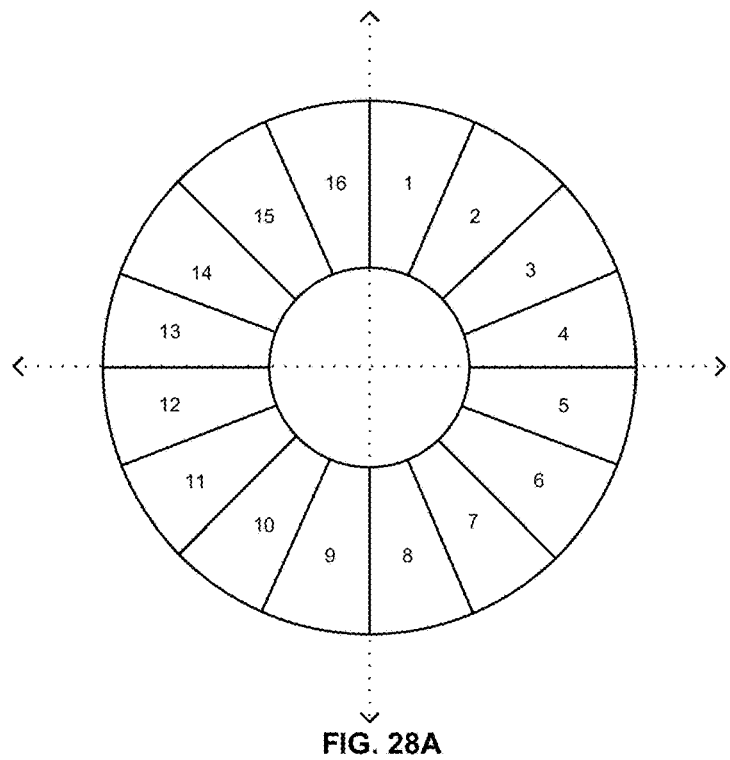
FIG. 28A illustrates sixteen annulus-segment-shaped sectors defined for an iris region.

FIG. 28A illustrates sixteen annulus-segment-shaped sectors defined for an iris region. Note that the sixteen sectors cover the entirety of the iris region in this embodiment. The sixteen sectors are labeled using sector identifiers "1" through "16." In the specific embodiment shown in this figure, the plurality of sectors are equally sized, identically shaped, and non-overlapping. However, in other embodiments, the plurality of sectors defined over an iris area may not necessarily cover the entire iris region. In addition, the sectors may be differently sized, differently shaped, overlapping, or any combination thereof, as will be discussed in sections below.

Figure 28B:
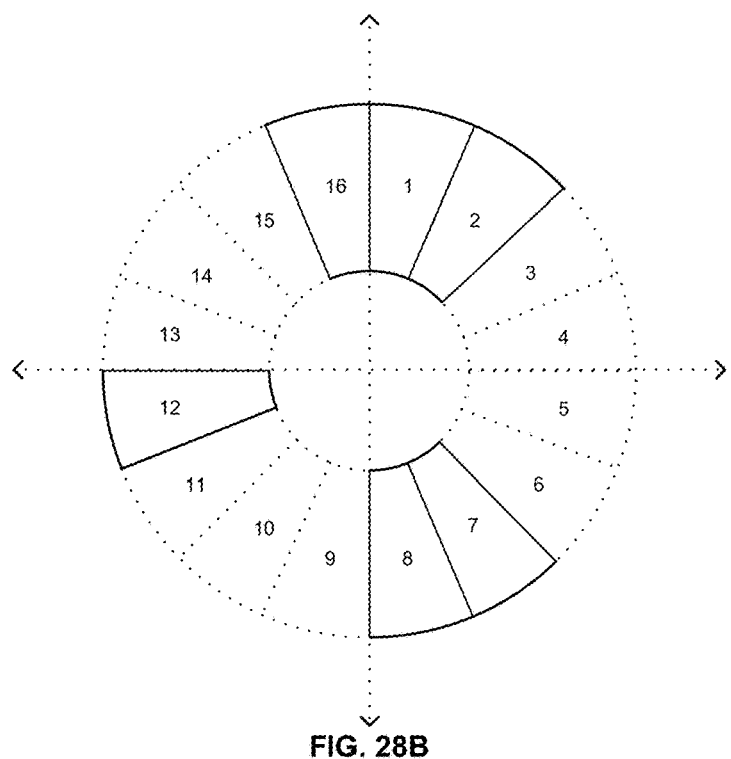
FIG. 28B illustrates a subset of the plurality of annulus-segment-shaped sectors, selected based on a measure of distinctiveness among the sectors, as used in iris authentication.

FIG. 28B illustrates a subset of the plurality of annulus-segment-shaped sectors, selected based on a measure of distinctiveness among the sectors, as used in iris authentication. As illustrated in this particular figure, sectors 1, 2, 7, 8, 12, and 16 are selected as the subset of sectors to be used in iris authentication. Distinctiveness may be measured in different ways. One measure of distinctiveness may relate to a count of the number of identifiable features detected within the sector. Another measure of distinctiveness may relate to the density of identifiable features detected within the sector. If each sector defined over the iris region covers an equally sized area, as is the case in of the example shown in FIG. 26A, the count of the number of identifiable features within a sector may reliably represent a measure of the density of identifiable features within the sector, as well. However it is defined, the measure of distinctiveness may be expressed as a scalar value, e.g., $D_k$ for the kth sector, according to various embodiments.

The measure of distinctiveness $D_k$ may be used to select the subset of sectors used for iris authentication in a variety of different ways. In one embodiment, those sectors having a measure of distinctiveness $D_k$ that meet or exceed a distinctiveness threshold, e.g., $D_{thresh}$, may be selected for use in iris authentication. In another embodiment, the top N sectors having the highest measure of distinctiveness $D_k$ may be selected for use in iris authentication. Other manners of using distinctiveness to select the subset of sectors for iris authentication may also be possible.

Figure 29A:
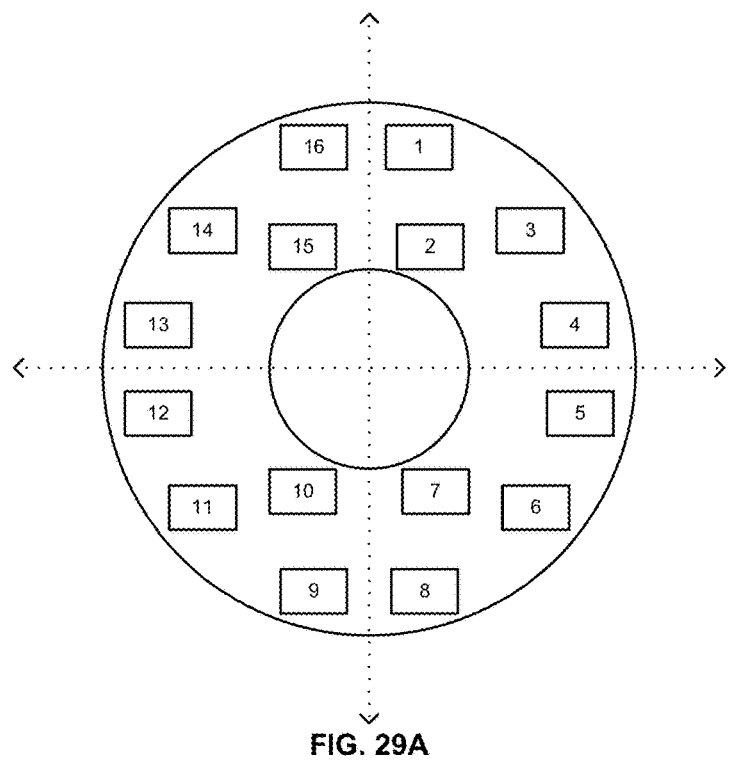
FIG. 29A illustrates sixteen rectangular sectors defined for an iris region.

FIG. 29A illustrates sixteen rectangular sectors defined for an iris region. Note that the sixteen sectors cover less than the entirety of the iris region in this embodiment. The sixteen sectors are labeled using sector identifiers "1" through "16." Defining the sectors as using a rectangular shape may have particular advantages. Many image-processing operations may be more readily implemented to process image data having a rectangular shape. For example, typical 2D windowing functions using a rectangular window, various computer vision (CV) feature computations, 2D transforms, etc., may all be more easily carried out on image data having a rectangular shape. Even though the natural shape of the human iris corresponds more to an annulus shape, various embodiments of the present disclosure define sectors having rectangular shapes for purposes of iris authentication, in order to promote more straightforward image operations. Furthermore, an adequate level of iris authentication may be achieved, despite the fact that the plurality of sectors (1 through 16) together cover less than the entirety of the iris region. For a particular level of iris authentication performance, the coverage of the iris region shown in FIG. 29A may be sufficient. In addition, the size of the rectangular sectors shown in the figure may be increased to effectuate better coverage of the iris region.

Figure 29B:
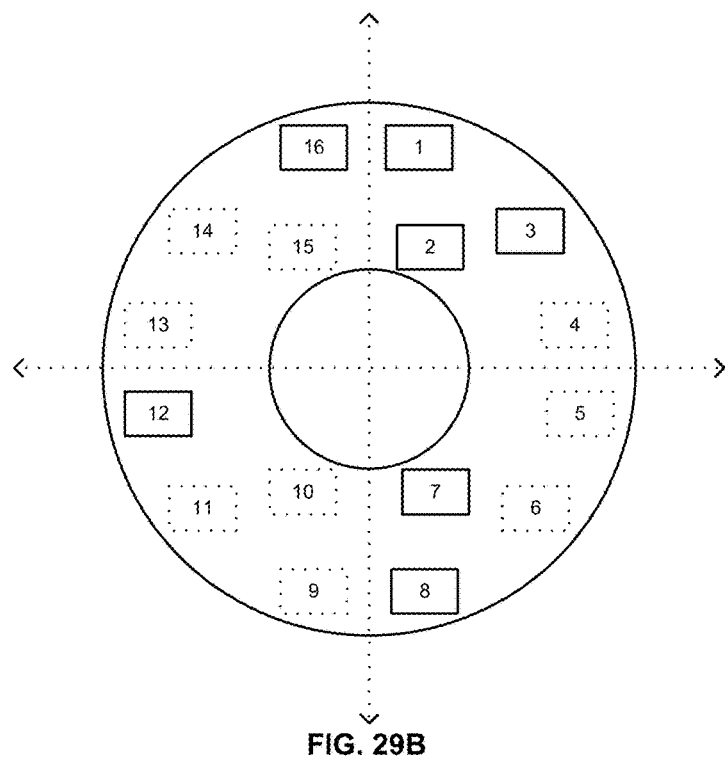
FIG. 29B illustrates a subset of the plurality of rectangular sectors, selected based on a measure of distinctiveness among the sectors, as used in iris authentication.

FIG. 29B illustrates a subset of the plurality of rectangular sectors, selected based on a measure of distinctiveness among the sectors, as used in iris authentication. As illustrated in this particular figure, sectors 1, 2, 3, 7, 8, and 12 are selected as the subset of sectors to be used in iris authentication. As discussed previously, distinctiveness may be measured in different ways. Also, the measure of distinctiveness may be used to select the subset of sectors used for iris authentication in a variety of different ways. The selected subset of sectors is used for iris authentication.

Figure 30A:
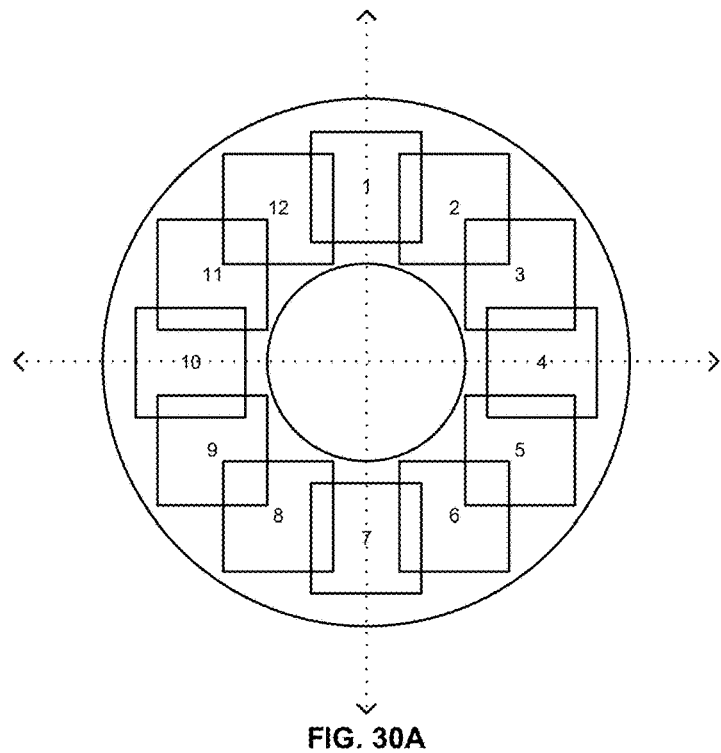
FIG. 30A illustrates twelve partially overlapping rectangular sectors defined for an iris region.

FIG. 30A illustrates twelve partially overlapping rectangular sectors defined for an iris region. As shown in this figure, adjacent sectors overlap with one another. The twelve sectors are labeled using sector identifiers "1" through "12." Defining the sectors as partially overlapping may have advantages in terms of robustness. Many image operations may suffer "edge effects." This includes operations such as 2D transforms, computation of CV features, etc., in which computed values are often based on neighboring pixels. At the edge of a particular image, or edge of a sector, the cutoff of pixel values at the border may adversely affect the image operation. For instance, CV features computed near the border may be artificially diminished or amplified simply because of the edge effect. With the benefit of overlapping adjacent sectors, CV features computed within the overlapping areas may simply be discarded, for example. The use of partially overlapping sectors, such as in the manner shown in FIG. 30A, can significantly reduce the negative impact of edge effects associated with sectorization.

Figure 30B:
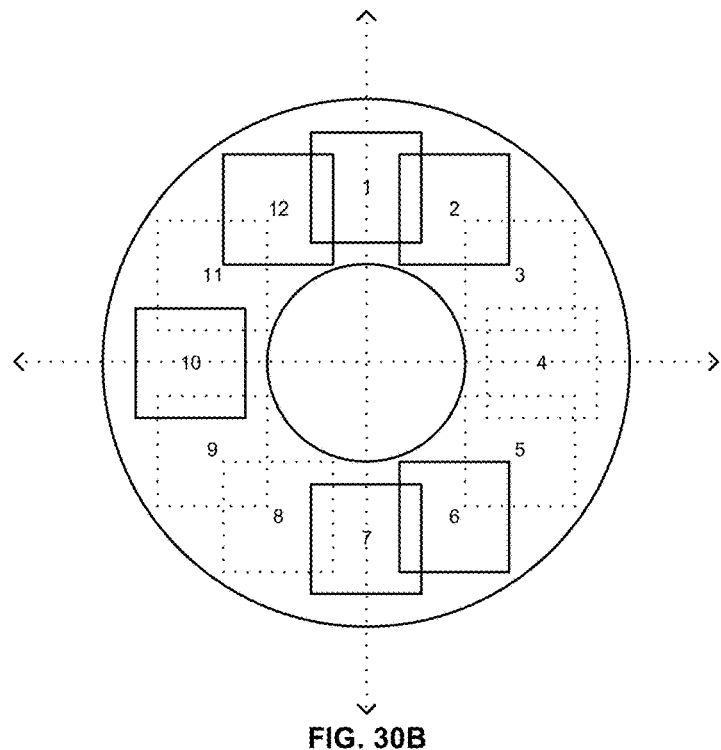
FIG. 30B illustrates a subset of the plurality of rectangular sectors, selected based on a measure of distinctiveness among the sectors, as used in iris authentication.

FIG. 30B illustrates a subset of the plurality of rectangular sectors, selected based on a measure of distinctiveness among the sectors, as used in iris authentication. As illustrated in this particular figure, sectors 1, 2, 6, 7, 10, and 12 are selected as the subset of sectors to be used in iris authentication.

Figure 31A:
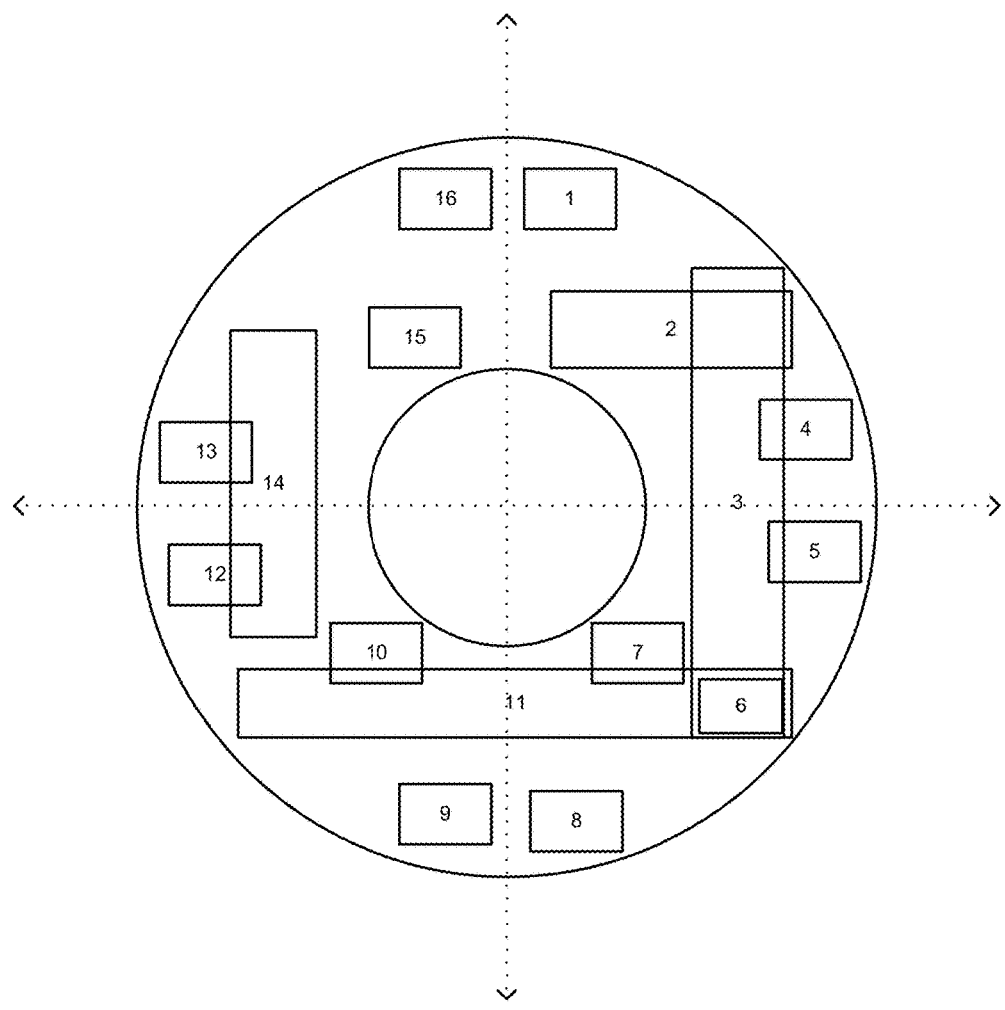
FIG. 31A illustrates sixteen sectors of varying rectangular shapes and sizes defined for an iris region, with some of the sectors being either partially or completely overlapping.

FIG. 31A illustrates sixteen sectors of varying rectangular shapes and sizes defined for an iris region. Some of the sectors are either partially or completely overlapping. The sixteen sectors are labeled using sector identifiers "1" through "16." This particular pattern of sectors may be used consistently across different iris scans. In other words, each time an iris authentication is performed, the same definition of sectors show in FIG. 31A may be used. However, within each iris scan, the combination of varying sector sizes and overlapping sectors may facilitate efficient iris authentication techniques. In particular, this arrangement allows for large sectors (for coarse scale comparisons) to be used first, followed by smaller sectors (for potentially finer scale comparisons).

Just as an example, in a "two-pass" iris authentication scheme, a "first pass" of iris authentication may focus on large sectors such as sectors 3, 11, and 14. The first pass of iris authentication may involve comparison against the entire collection of known iris data records. However, the burden of performing such a large number of comparisons is offset by the fact that for each comparison, only a few sectors (i.e., large sectors 3, 11, and 14) are evaluated. Based on only the large sectors, the first pass of iris authentication may result in a certain number (e.g., M) of hits. That is, M iris data records out of the entire collection of known iris data records may be identified as potentially matching the iris of the user, based only the large sectors 3, 11, and 14. A "second pass" of iris authentication may then focus on small sectors 1, 4, 5, 6, 7, 8, 9, 10, 12, 13, 15, and 16. The second pass of iris authentication may only involve comparison against the M iris data records that were identified in the first pass. There is no need to compare the small sectors 1, 4, 5, 6, 7, 8, 9, 10, 12, 13, 15, and 16 of the iris sample against iris data records other than the M iris data records identified in the first pass. While a two-pass iris authentication scheme is described above as an example, the technique can be extended such that the number of passes is greater than two. Thus, a two-pass or multi-pass iris authentication operation can be characterized as being "greedy." It performs comparison based on the most essential features first, and then proceeds to perform comparison based on finer features.

FIG. 31A also illustrates a situation in which feature density may be used as a measure of distinctiveness for each sector. Here, the various sectors defined over the iris region have different sizes. If the measure of the distinctiveness of a sector is defined based on a count of the number of identifiable features (e.g., CV features) within the sector, as in prior examples, then the measure may be distorted simply due to variation in the size of sectors. Instead, the measure of the distinctiveness of a sector may be based the density of identifiable features within the sector. In such a case, the measure of density $D_k$ for the kth sector may be expressed in terms of number of features per square area (e.g., features/pixels$^2$), for example. In one embodiment, the type of CV features used in the context of comparing sectors of the iris against registered iris data records comprises LBP features, speeded up robust features (SURF) type features, or scale-invariant feature transform (SIFT) type features.

Figure 31B:
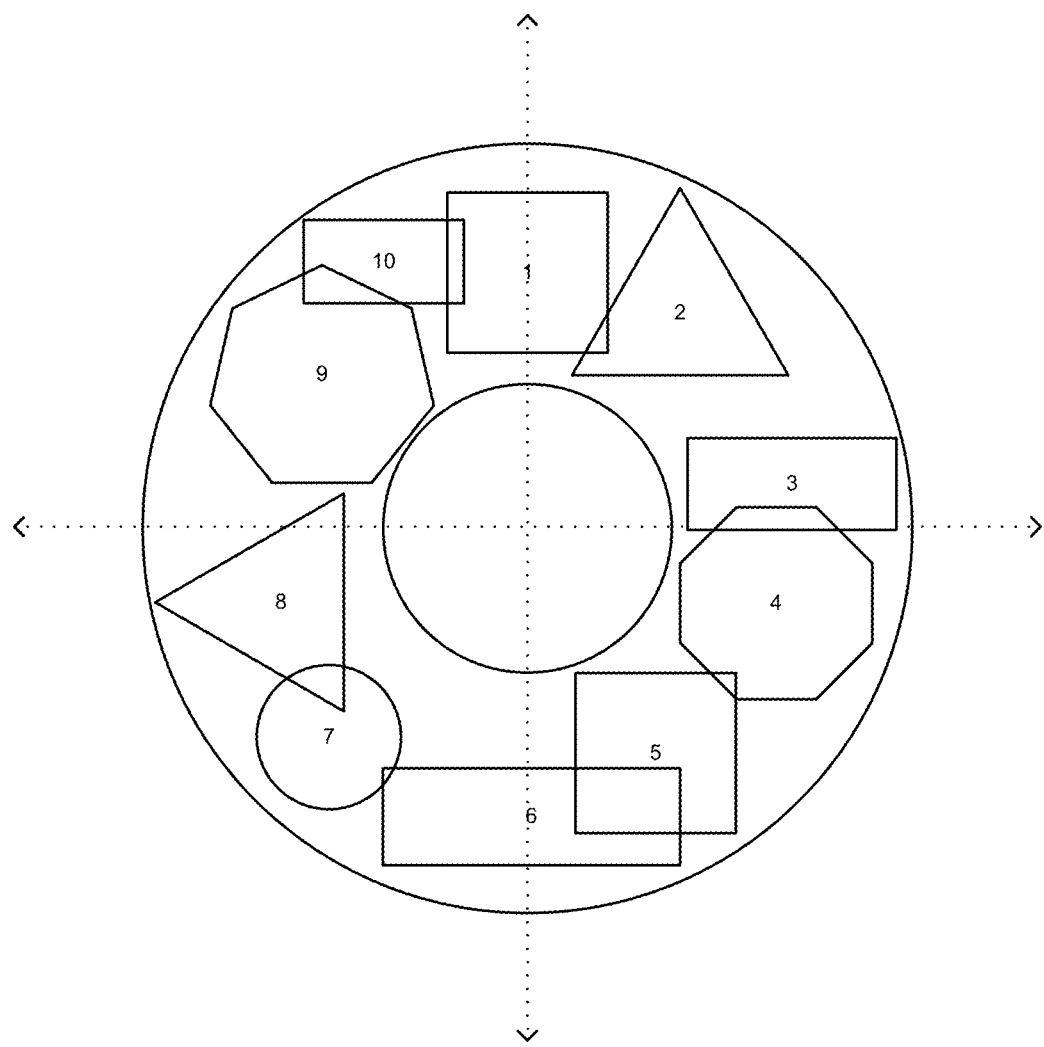
FIG. 31B illustrates ten sectors of varying geometric shapes and sizes defined for an iris region.

FIG. 31B illustrates ten sectors of varying geometric shapes and sizes defined for an iris region. Some of the sectors are overlapping. The ten sectors are labeled using sector identifiers "1" through "10." Again, this particular pattern of sectors may be used consistently across different iris scans. In other words, each time an iris authentication is performed, the same definition of sectors show in FIG. 31B may be used. This figure illustrates that the technique of utilizing sectors for iris authentication may be performed with a wide variety of different types of sector shapes.

Figure 32A:
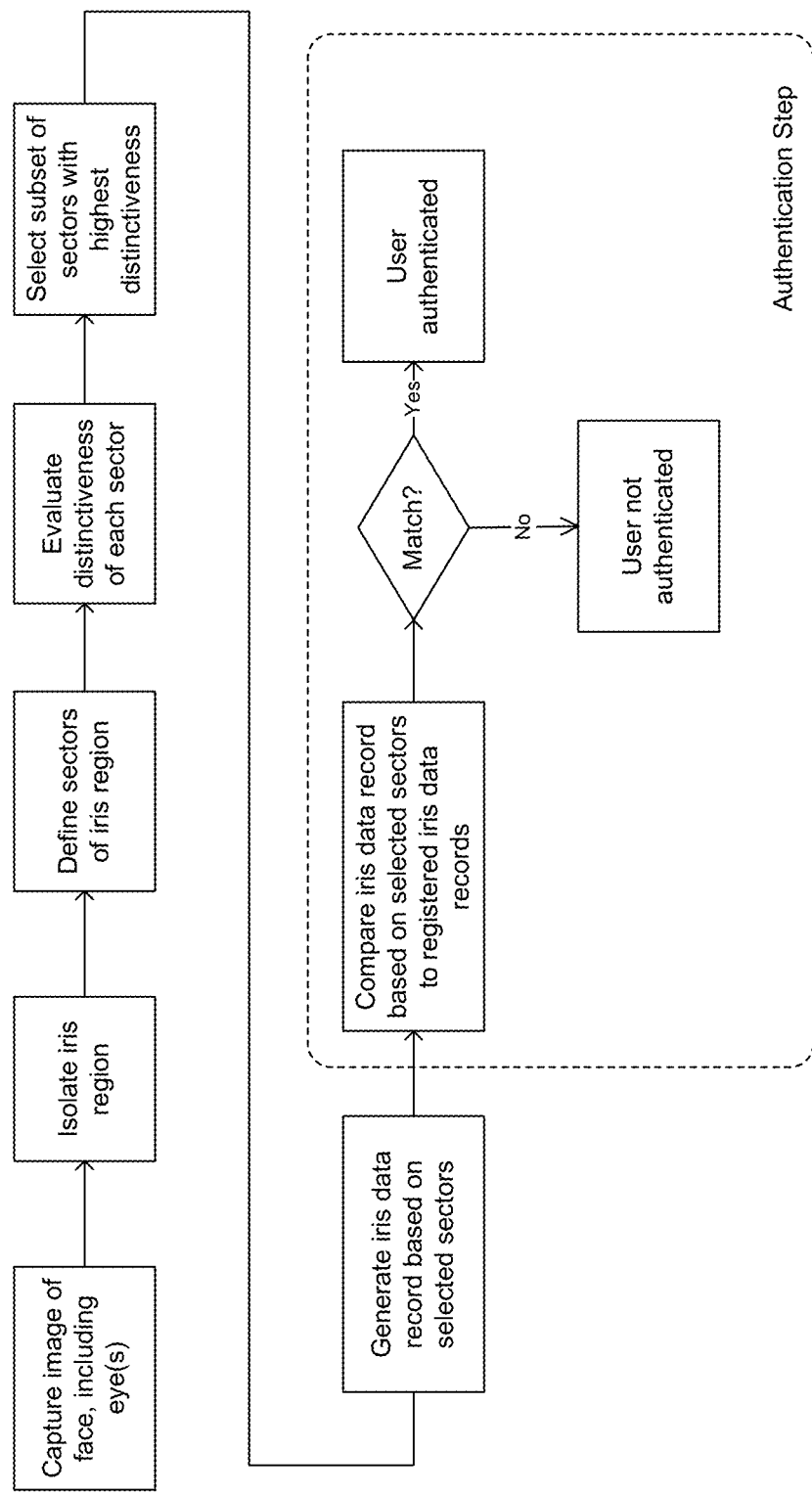
FIG. 32A is a block diagram showing a process for sector-based iris authentication.

FIG. 32A is a block diagram showing a process for sector-based iris authentication. First, an image is captured that includes the face of a user to be authenticated. The image includes the eyes of the user, as well as features of the eyes, as part of the face. In most implementations, the image may include both eyes. While iris authentication is generally described herein with respect to one eye, the process may be applied to each eye of the user. Next, the iris region of an eye within an image is isolated. Next, a plurality of sectors id defined over the iris region. The plurality of sectors may be defined in various ways, as described through examples above. Then, the distinctiveness of each sector is evaluated. This may be achieved using a measure of distinctiveness, e.g., as expressed the value $D_k$, for each sector. Based on the measure of distinctiveness, a subset of the plurality of sectors is selected. In the example show in the figure, the sectors having the highest measures of distinctiveness. For instance, the N sectors having the highest values of $D_k$, may be selected. Next, an iris data record is generated based on the selected subset of sectors. The process then proceeds to an authentication operation—one that uses the iris data record generated from subset of sectors selected based on the measure of distinctiveness. Further details of the authentication step are provided in FIG. 32B.

Figure 32B:
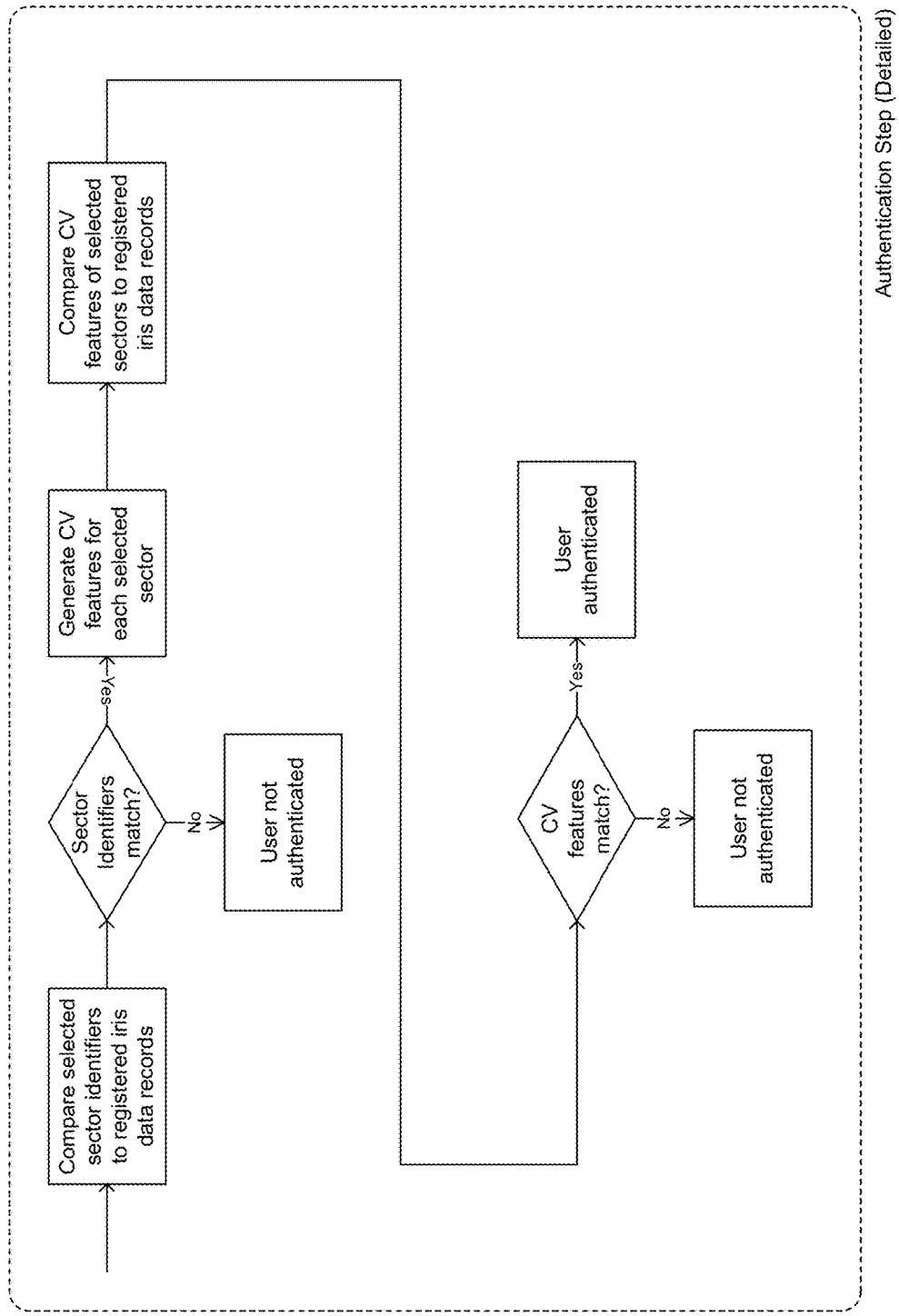
FIG. 32B is a block diagram showing a more detailed view of an authentication operation within the process shown in FIG. 32A, according to one embodiment.

FIG. 32B is a block diagram showing a more detailed view of an authentication operation within the process shown in FIG. 32A, according to one embodiment. Here, the authentication operation utilizes a two-step approach. In a first step, the sector identifiers of the selected sectors are compared to registered data records. In a second step, the CV features of the selected sectors are compared to registered data records.

According various embodiments of the disclosure, the same process of identifying a select subset of sectors based on distinctiveness applies to both (1) iris registration and (2) iris authentication. Thus, the collection of registered iris data records also includes identifiers associated with selected sectors based on distinctiveness. Specifically, each registered iris data record includes sector identifiers associated with the selected sectors (based on distinctiveness) of that iris data record, in addition to CV features generated from the selected sectors.

Referring back to FIG. 32B, the two-step authentication operation begins by comparing the sector identifiers of the selected sectors to those of the registered iris data records. If a match in the sector identifiers is not found, the user is not authenticated, and the authentication operation ends. Note that a minimum amount of processing may be involved in reaching this conclusion. Comparison of sector identifiers may be a relatively simple operation. If a "no" result can be reached (i.e., user not authenticated) based only on comparison of sector identifiers, more complex operations may be avoided. For example, no comparison of CV features against registered iris data records needs to be carried out. In fact, no CV features need to be generated from the sectors of the iris to be authenticated. The "no" result can be reached based solely on a comparison of sector identifiers against those of the registered iris data records.

On the other hand, if a match in the sector identifiers is found, then the second step of the authentication operation is performed. In particular, CV features are computed for the selected sectors of the iris to be authenticated. Then, the CV features of the selected sectors are compared to the CV features of the corresponding select sectors of registered iris data records. If the CV features of the select sectors of the user's iris match those of a registered iris data record, then the user is authenticated. Otherwise, the user is not authenticated. While the above describes iris authentication based on one iris, similar techniques may be extended to implement iris authentication based on both irises of the user, as mentioned previously.

FIG. 33A shows an example of a shortened iris data record, according to an embodiment of the disclosure. The shortened data record may comprise (1) the sector identifiers of the selected selectors upon which the shortened iris data record is based and (2) the CV feature record corresponding to each selected sector. Here, the CV feature record may comprise a record of computed CV features for the selected sector. The level of completeness of the shortened iris data record shown in FIG. 33A (i.e., filled with both the sector identifiers of the selected selectors and the CV feature record corresponding to each selected sector) may be typical of a registered iris record. The same level of completeness may be typical of a data record for an iris being authenticated, upon reaching the second step of the two-step authentication operation shown in FIG. 32B.

FIG. 33B shows an example of a shortened iris data record containing only the sector identifiers of the selected sectors. Here, the shortened data record may only comprise the sector identifiers of the selected selectors. The level of completeness of the shortened iris data record shown in FIG. 33A (i.e., filled with only the sector identifiers of the selected selectors) may be typical of a data record for an iris being authenticated, upon reaching the first step of the two-step authentication operation shown in FIG. 32B.

FIG. 33C shows an example of a full iris data record, according to an embodiment of the disclosure. The full data record may comprise (1) the sector identifiers of every sector defined over the iris region and (2) the CV feature record corresponding to every sector defined over the iris region. FIG. 33C is provided mainly for purposes of illustration, to highlight the relative compactness of the shortened iris data records shown in FIGS. 33A and 33B. In many embodiments, an iris authentication system may only store iris data records as shortened iris data records, for purposes of both iris registration and iris authentication.

Figure 34A:
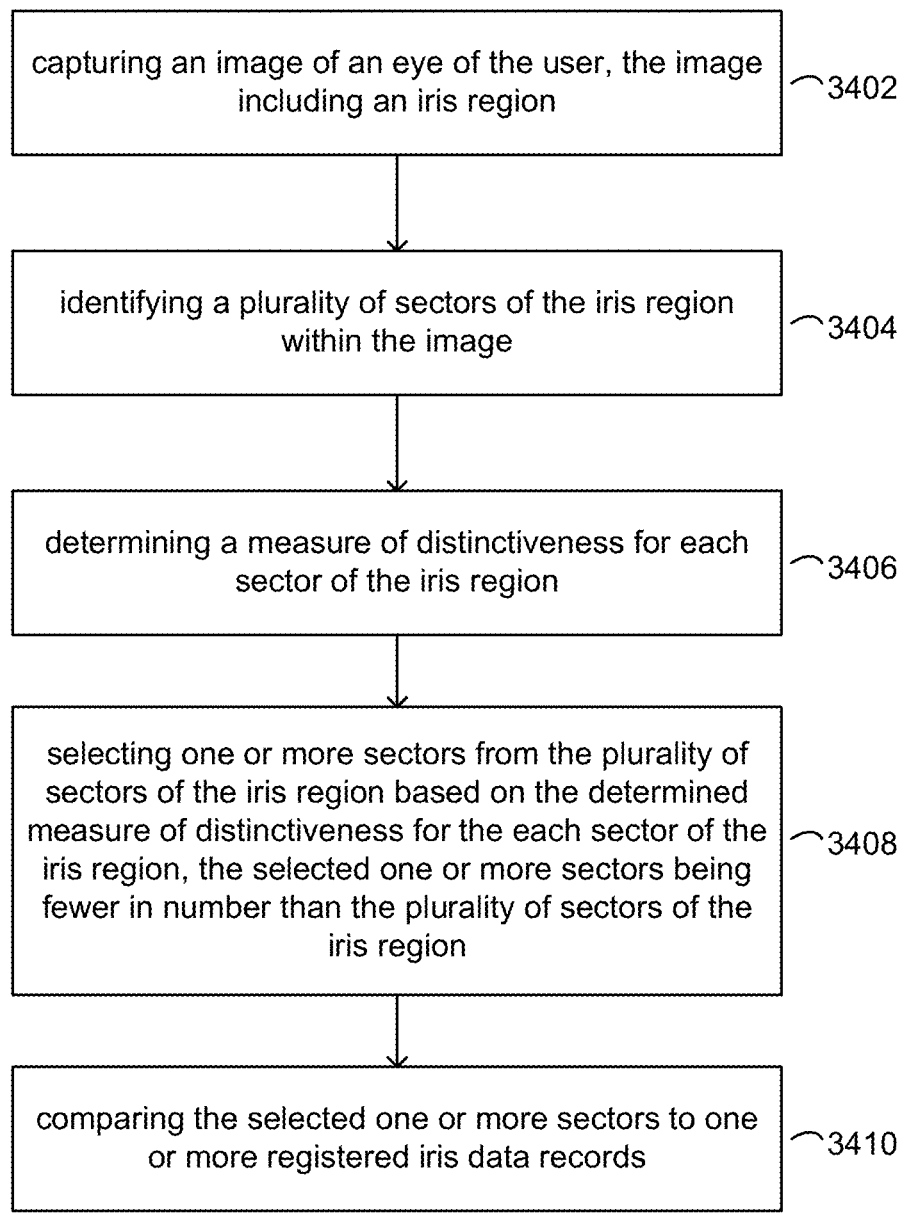
FIG. 34A is a flow chart illustrating a process for performing sector-based iris authentication using a plurality of sectors, according to an embodiment.

FIG. 34A is a flow chart illustrating a process 3400 for performing sector-based iris authentication using a plurality of sectors, according to an embodiment. In a step 3402, an image of an eye of the user is captured. The image may include an iris region. The image may be captured using one or more image sensors, such as the monochrome visual sensory array unit 1312 or the IR sensor array unit 1342 of FIG. 13. In a step 3404, a plurality of sectors of the iris region within the image are identified. Means for performing the functionality of step 3402 can include, but are not limited to and need not include, for example, sensor array unit 212 of FIGS. 2A and 2B; sensor array unit 212 of FIG. 3A; smart image array 213 of FIG. 3B; image array 215 of FIG. 3C; visual sensor array 1312, IR sensor array 1342, of FIG. 13; IR-capable visual sensor array 1412 of FIG. 14; and/or input device(s) 3570 of FIG. 35. In a step 3406, a measure of distinctiveness for each sector of the iris region is determined. In a step 3408, one or more sectors from the plurality of sectors of the iris region are selected based on the determined measure of distinctiveness for the each sector of the iris region. The selected one or more sectors being may be fewer in number than the plurality of sectors of the iris region. In a step 3410, the selected one or more sectors may be compared to one or more registered iris data records. Means for performing the functionality of any of steps 3406, 3408, 3410 can include, but are not limited to and need not include, for example, peripheral circuitry 214 and microprocessor 216 of FIG. 2A; CV computation hardware 242 and microprocessor 216 of FIG. 2B; peripheral circuitry 214 of FIG. 3A; smart image array 213 and first processing unit 217 of FIG. 3B; first processing unit 217 of FIG. 3C; peripheral circuitry 1314 and microprocessor 1316 of FIG. 13; peripheral circuitry 1414 and microprocessor 1416 of FIG. 14; and/or processing unit(s) 3510 and DSP 3520 of FIG. 35.

In one embodiment, comparing the selected one or more sectors to the one or more registered iris data records comprises comparing sector identifier(s) of the selected one or more sectors to sector identifier(s) of sectors of irises associated with the one or more registered iris data records. In a specific embodiment, the process 3400 further comprises a step for, responsive to detecting a match of sector identifier(s) between the selected one or more sectors and at least one registered iris data record, comparing computer vision (CV) features of the selected one or more sectors of the iris region to CV features of the at least one registered iris data record. In this context, CV features useful for comparing to determine a match between the selected one or more sectors of the iris region to the at least one registered iris data record can include SURF and/or SIFT-type CV features. In one embodiment, each of the one or more registered iris data records comprises a shortened data record generated based on one or more sectors from a plurality of sectors of an iris region of a registered user. In one embodiment, the determined measure of distinctiveness for the each sector is generated using CV features computed for the each sector. In a specific embodiment, the determined measure of distinctiveness for the each sector comprises a count of number of CV features computed for the each sector. In another specific embodiment, the determined measure of distinctiveness for the each sector comprises a measure of density of CV features computed for the each sector.

According to an embodiment, the each sector of the plurality of sectors has a shape of an annulus segment. In another embodiment, the each sector of the plurality of sectors has a shape of a rectangle. In one embodiment, the plurality of sectors cover less than the entirety of the iris region. In one embodiment, the plurality of sectors include overlapping sectors. In one embodiment, the plurality of sectors include sectors of different sizes. In one embodiment, the plurality of sectors of the iris region is identified using a facial feature of the user as a reference point.

Figure 34B:
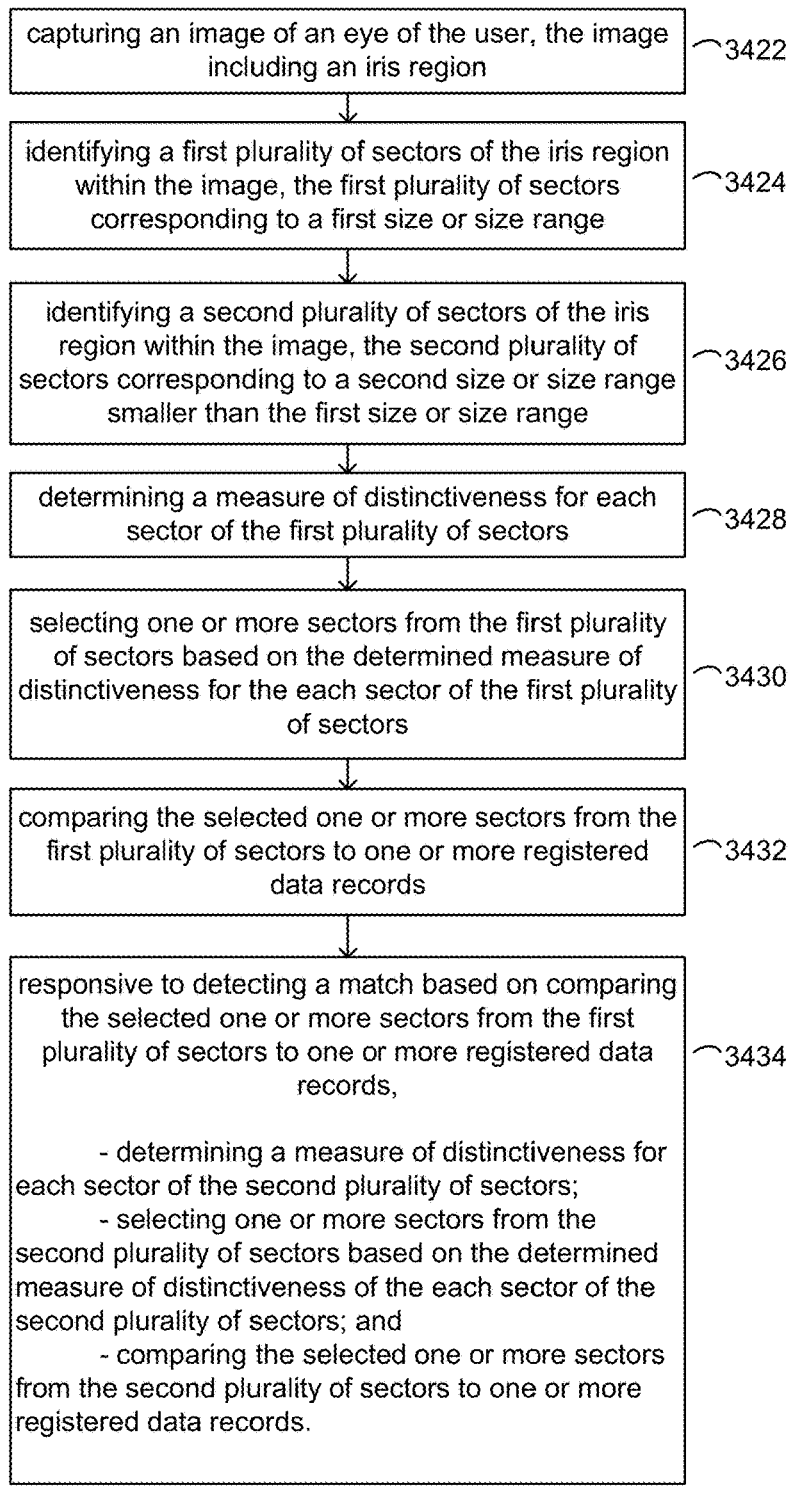
FIG. 34B is a flow chart illustrating a process 3420 for performing sector-based iris authentication using a first plurality and a second plurality of sectors of different sizes, according to an embodiment.

FIG. 34B is a flow chart illustrating a process 3420 for performing sector-based iris authentication using a first plurality and a second plurality of sectors of different sizes, according to an embodiment. In a step 3422, an image of an eye of the user is captured, the image including an iris region. In a step 3424, a first plurality of sectors of the iris region within the image are identified, the first plurality of sectors corresponding to a first size or size range. In a step 3426, a second plurality of sectors of the iris region within the image are identified, the second plurality of sectors corresponding to a second size or size range smaller than the first size or size range. In a step 3428, a measure of distinctiveness is determined for each sector of the first plurality of sectors. In a step 3430, one or more sectors are selected from the first plurality of sectors based on the determined measure of distinctiveness for the each sector of the first plurality of sectors. In a step 3432, the selected one or more sectors from the first plurality of sectors are compared to one or more registered data records. In a step 3434, responsive to detecting a match based on comparing the selected one or more sectors from the first plurality of sectors to one or more registered data records, a series of steps are performed. These steps include a step for determining a measure of distinctiveness for each sector of the second plurality of sectors, a step for selecting one or more sectors from the second plurality of sectors based on the determined measure of distinctiveness of the each sector of the second plurality of sectors; and a step for comparing the selected one or more sectors from the second plurality of sectors to one or more registered data records.

One or more processing units may be used to perform or control various steps described above, such as the identification of the plurality of sectors of the iris region within the image, the determination of the measure of distinctiveness for each sector of the iris region, the selection of one or more sectors from the plurality of sectors based on the determined measure of distinctiveness, and the comparison of the selected one or more sectors to one or more registered iris data records. Furthermore, the one or more processing units may be part of a vision sensor system, such as vision sensor system 1310 shown in FIG. 13, that includes dedicated CV computation hardware (such as in peripheral circuitry 1314) in addition to the one or more processing units (such as microprocessor 1316). Alternatively, the one or more processing units may not be implemented as part of a vision sensor system. For example, the one or more processing systems may comprise a processing unit such as main processing unit 1320 show in FIG. 13. In one specific embodiment, the one or more image sensors comprise an image sensor (such as vision sensor 1312) in a visual sensor system (such as visual sensor system 1310), and the one or more processing units comprise a dedicated processing unit (such as microprocessor 1316) in the visual sensor system.

Figure 35:
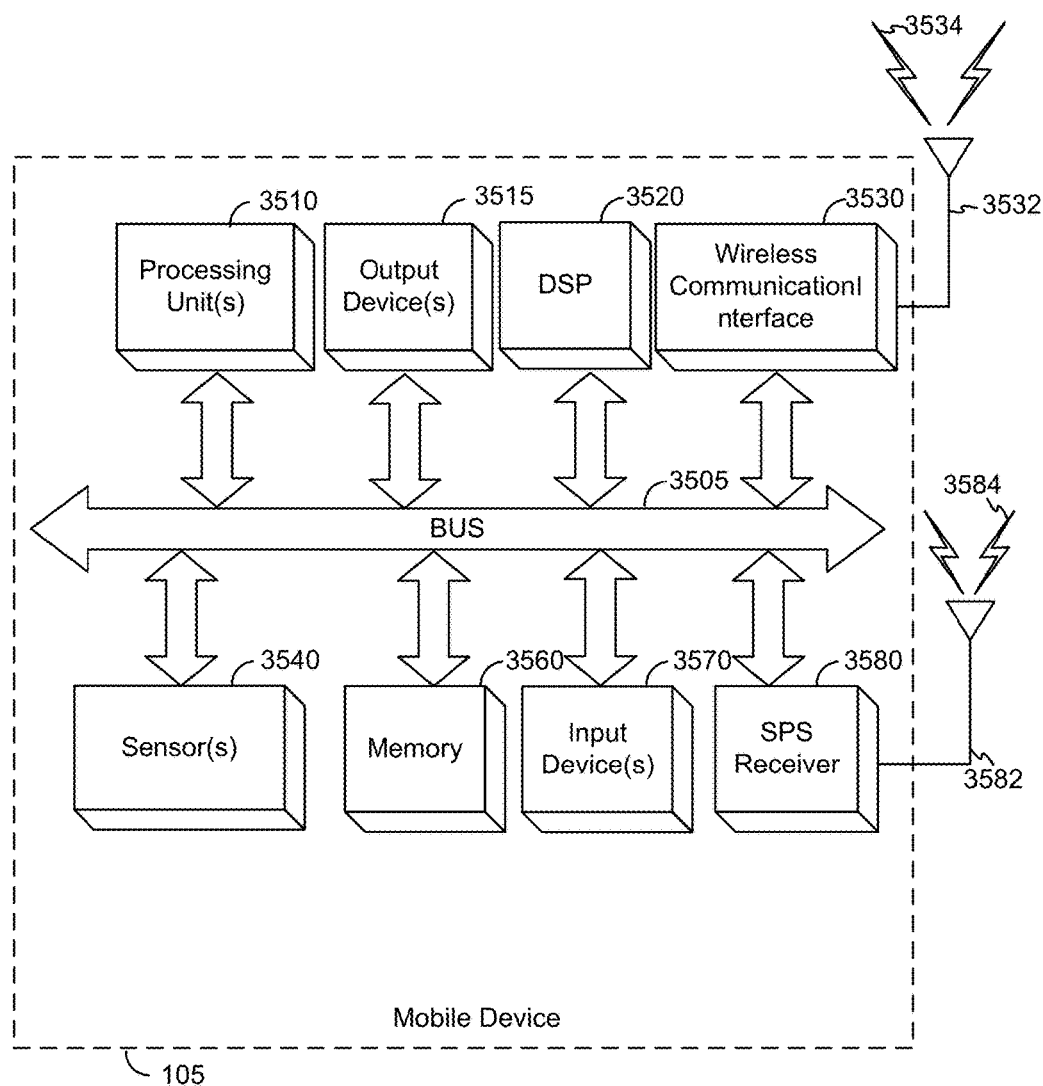
FIG. 35 illustrates an embodiment of a mobile device 105, which can utilize the various components and systems as described above.

FIG. 35 illustrates an embodiment of a mobile device 105, which can utilize the various components and systems as described above. The mobile device 105 is shown as comprising hardware elements that can be electrically coupled via a bus 3505 (or may otherwise be in communication, as appropriate). The hardware elements may include processing unit(s) 3510 which can include without limitation one or more general-purpose processors, one or more special-purpose processors (such as digital signal processing (DSP) chips, graphics acceleration processors, application specific integrated circuits (ASICs), and/or the like), and/or other processing structure or means. In the embodiments described above, processing unit(s) 3510 may correspond to main processors 220, 1320, and 1420, described in FIG. 2A, FIG. 13, and FIG. 14, respectively, and/or the microprocessors 216, 1316, and 1416, described in FIG. 2A, FIG. 13, and FIG. 14, respectively. As shown in FIG. 35, some embodiments may have a separate DSP 3520, depending on desired functionality. The mobile device 105 also can include one or more input devices 3570, which can include without limitation a touch screen, a touch pad, microphone, button(s), dial(s), switch(es), and/or the like; and one or more output devices 3515, which can include without limitation a display, light emitting diode (LED), speakers, and/or the like. In particular, output device may include visible and/or IR light sources such as the IR light sources 1330 and 1430 described in FIGS. 13 and 14.

The mobile device 105 might also include a wireless communication interface 3530, which can include without limitation a modem, a network card, an infrared communication device, a wireless communication device, and/or a chipset (such as a Bluetooth™ device, an IEEE 802.11 device, an IEEE 802.16.4 device, a WiFi device, a WiMax device, cellular communication facilities, etc.), and/or the like. The wireless communication interface 3530 may permit data to be exchanged with a network, wireless access points, other computer systems, and/or any other electronic devices described herein. The communication can be carried out via one or more wireless communication antenna(s) 3532 that send and/or receive wireless signals 3534.

Depending on desired functionality, the wireless communication interface 3530 can include separate transceivers to communicate with base transceiver stations (e.g., base stations of a cellular network) and/or access point(s). These different data networks can include various network types. Additionally, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A Wireless Local Area Network (WLAN) may also be an IEEE 802.11x network, and a Wireless Personal Area Network (WPAN) may be a Bluetooth network, an IEEE 802.16x, or some other type of network. The techniques described herein may also be used for any combination of WWAN, WLAN, and/or WPAN.

The mobile device 105 can further include sensor(s) 3540. Such sensors can include, without limitation, one or more accelerometer(s), gyroscope(s), camera(s), magnetometer(s), altimeter(s), microphone(s), proximity sensor(s), light sensor(s), and the like. Additionally or alternatively, the sensor(s) 3540 may include the sensor system 210 of FIGS. 2A, 2B, 13, 14, and/or similar electronic sensor systems. Such sensor systems, working alone or in conjunction with processors such as main processors 1320 and 1420, may perform various operations relating to face detection and iris detection as described above.

Embodiments of the mobile device may also include a Satellite Positioning System (SPS) receiver 3580 capable of receiving signals 3584 from one or more SPS satellites using an SPS antenna 3582. The SPS receiver 3580 can extract a position of the mobile device, using conventional techniques, from satellites of an SPS system, such as a global navigation satellite system (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 3580 can be used various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile device 105 may further include and/or be in communication with a memory 3560. The memory 3560 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. Memories 218, 1318, and 1418 of FIGS. 2A, 13, and 14, respectively, which can include any of the memory types previously listed, may be included in the memory 3560 or may be distinct from memory 3560, depending on desired functionality. In various implementations, memory 3560 can include non-transitory computer-readable medium storing instructions therein for execution by one or more processing units, comprising instructions to perform any of the functionality described herein with reference to any of FIGS. 17, 18A, 18B, 18C, 21-26, 34A, and/or 34B.

The memory 3560 of the mobile device 105 also can comprise software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method for performing iris authentication for a user comprising:
    capturing an initial image of an eye of the user, the eye including an inner circular boundary between a pupil region and an iris region, and an outer circular boundary between the iris region and a sclera region;
    determining, from the initial image, a first size measurement indicative of a size of the inner circular boundary;
    (a) modulating one or more visible light sources to output visible light toward the eye of the user, by increasing an intensity of the one or more visible light sources by an increment amount;
    (b) capturing a subsequent image of the eye of the user during a period of pupillary response resulting from modulating the one or more visible light sources;
    (c) determining, from the subsequent image, an updated value of the first size measurement indicative of the size of the inner circular boundary,
    wherein, for each increment in a serious of increments of the intensity of the one or more visible light sources, the steps of (a) modulating the one or more visible light sources, (b) capturing a subsequent image of the eye of the user, and (c) determining, from the subsequent image, the updated value of the first size measurement indicative of the size of the inner circular boundary, are repeated until a condition based on the first size measurement is satisfied;
    based on the subsequent image of the eye for the increment during which the condition based on the first size measurement is satisfied, obtaining an iris data record of the user; and
    comparing the iris data record of the user to one or more registered iris data records to authenticate the user, wherein the increment amount is determined based on an environmental reading from a light sensor.

2. The method of claim 1, wherein modulating the one or more visible light sources comprises increasing the visible light output toward the eye of the user upon determining that the first size measurement exceeds a reference size.

3. The method of claim 2, further comprising determining, from the initial image, a second size measurement indicative of a size of the outer circular boundary, wherein the reference size is determined based on the second size measurement.

4. The method of claim 1, further comprising determining, from the initial image, a second size measurement indicative of a size of the outer circular boundary, wherein modulating the one or more visible light sources comprises increasing the visible light output toward the eye of the user upon determining that a size ratio, based on the first size measurement and the second size measurement, exceeds a target ratio.

5. The method of claim 1, wherein the environmental reading is an ambient light sensor (ALS) reading.

6. The method of claim 1, further comprising:
    determining a target brightness setting for the one or more visible light sources; and
    modulating the one or more visible light sources according to the target brightness setting prior to capturing the subsequent image of the eye of the user.

7. The method of claim 6, further comprising determining, from the initial image, a second size measurement indicative of a size of the outer circular boundary, wherein the target brightness setting of the one or more visible light sources is determined based on (1) the first size measurement, (2) the second size measurement, and (3) the environmental reading.

8. The method of claim 7, wherein the environmental reading is an ambient light sensor (ALS) reading.

9. An apparatus for performing iris authentication for a user comprising:
    one or more image sensors configured to capture an initial image of an eye of the user, the eye including an inner circular boundary between a pupil region and an iris region, and an outer circular boundary between the iris region and a sclera region; and
    one or more processing units configured to:
        determine, from the initial image, a first size measurement indicative of a size of the inner circular boundary;
        (a) modulate one or more visible light sources to output visible light toward the eye of the user, by increasing an intensity of the one or more visible light sources by an increment amount;
        (b) receive a subsequent image of the eye of the user captured during a period of pupillary response resulting from modulating the one or more visible light sources;
        (c) determine, from the subsequent image, an updated value of the first size measurement indicative of the size of the inner circular boundary,
        wherein, for each increment in a serious of increments of the intensity of the one or more visible light sources, the one or more processing units are configured to repeat the steps of (a) modulating the one or more visible light sources, (b) capturing a subsequent image of the eye of the user, and (c) determining, from the subsequent image, the updated value of the first size measurement indicative of the size of the inner circular boundary, until a condition based on the first size measurement is satisfied;

obtain, based on the subsequent image of the eye for the increment during which the condition based on the first size measurement is satisfied, an iris data record of the user; and compare the iris data record of the user to one or more registered iris data records to authenticate the user, wherein the one or more processing units are configured to determine the increment amount based on an environmental reading from a light sensor.

10. The apparatus of claim 9, wherein the one or more processing units are configured to modulate the one or more visible light sources by increasing the visible light output toward the eye of the user upon determining that the first size measurement exceeds a reference size.

11. The apparatus of claim 10, wherein the one or more processing units are further configured to determine, from the initial image, a second size measurement indicative of a size of the outer circular boundary, wherein the reference size is determined based on the second size measurement.

12. The apparatus of claim 9, wherein the one or more processing units are further configured to determine, from the initial image, a second size measurement indicative of a size of the outer circular boundary, wherein the one or more processing units are configured to modulate the one or more visible light sources by increasing the visible light output toward the eye of the user upon determining that a size ratio, based on the first size measurement and the second size measurement, exceeds a target ratio.

13. The apparatus of claim 9, wherein the environmental reading is an ambient light sensor (ALS) reading.

14. The apparatus of claim 9, wherein the one or more processing units are further configured to:

determine a target brightness setting for the one or more visible light sources; and modulate the one or more visible light sources according to the target brightness setting prior to capturing the subsequent image of the eye of the user.

15. The apparatus of claim 14, wherein the one or more processing units are further configured to determine, from the initial image, a second size measurement indicative of a size of the outer circular boundary, and wherein the one or more processing units are further configured to determine the target brightness setting of the one or more visible light sources based on (1) the first size measurement, (2) the second size measurement, and (3) the environmental reading.

16. The apparatus of claim 9, wherein the apparatus comprises a vision sensor system, the vision sensor system comprising at least one of the one or more image sensors and at least one of the one or more processing units.

17. A system for performing iris authentication for a user comprising:

means for capturing an initial image of an eye of the user, the eye including an inner circular boundary between a pupil region and an iris region, and an outer circular boundary between the iris region and a sclera region;

means for determining, from the initial image, a first size measurement indicative of a size of the inner circular boundary;

(a) means for modulating one or more visible light sources to output visible light toward the eye of the user, by increasing an intensity of the one or more visible light sources by an increment amount;

(b) means for capturing a subsequent image of the eye of the user during a period of pupillary response resulting from modulating the one or more visible light sources;

(c) means for determining, from the subsequent image, an updated value of the first size measurement indicative of the size of the inner circular boundary;

means, for each increment in a serious of increments of the intensity of the one or more visible light sources, for repeatedly operating the means for (a) modulating the one or more visible light sources, (b) capturing a subsequent image of the eye of the user, and (c) determining, from the subsequent image, the updated value of the first size measurement indicative of the size of the inner circular boundary, until a condition based on the first size measurement is satisfied;

means for, based on the subsequent image of the eye for the increment during which the condition based on the first size measurement is satisfied, obtaining an iris data record of the user;

means for comparing the iris data record of the user to one or more registered iris data records, to authenticate the user; and means for determining the increment amount based on an environmental reading from a light sensor.

18. The system of claim 17, wherein the means for modulating the one or more visible light sources is configured to modulate the one or more visible light sources upon determining that the first size measurement exceeds a reference size.

19. The system of claim 18, further comprising means for determining, from the initial image, a second size measurement indicative of a size of the outer circular boundary, wherein the reference size is determined based on the second size measurement.

20. The system of claim 17, further comprising means for determining, from the initial image, a second size measurement indicative of a size of the outer circular boundary, wherein the means for modulating the one or more visible light sources is configured to modulate the one or more visible light sources upon determining that a size ratio, based on the first size measurement and the second size measurement, exceeds a target ratio.

21. The system of claim 17, further comprising:

means for determining a target brightness setting for the one or more visible light sources; and means for applying the target brightness setting to the one or more visible light sources prior to capturing the subsequent image of the eye of the user.

22. The system of claim 21, wherein the system further comprises means for determining, from the initial image, a second size measurement indicative of a size of the outer circular boundary, and wherein the target brightness setting of the one or more visible light sources is determined based on (1) the first size measurement, (2) the second size measurement, and (3) the environmental reading.

23. A non-transitory computer-readable medium storing instructions therein for execution by one or more processing units, comprising instructions to:

capture an initial image of an eye of the user, the eye including an inner circular boundary between a pupil region and an iris region, and an outer circular boundary between the iris region and a sclera region;

determine, from the initial image, a first size measurement indicative of a size of the inner circular boundary;

(a) modulate one or more visible light sources to output visible light toward the eye of the user, by increasing an intensity of the one or more visible light sources by an increment amount;

(b) capture a subsequent image of the eye of the user during a period of pupillary response resulting from modulation of the one or more visible light sources;

(c) determine, from the subsequent image, an updated value of the first size measurement indicative of the size of the inner circular boundary, wherein, for each increment in a serious of increments of the intensity of the one or more visible light sources, the steps of (a) modulating the one or more visible light sources, (b) capturing a subsequent image of the eye of the user, and (c) determining, from the subsequent image, the updated value of the first size measurement indicative of the size of the inner circular boundary, are repeated until a condition based on the first size measurement is satisfied;

based on the subsequent image of the eye for the increment during which the condition based on the first size measurement is satisfied, obtain an iris data record of the user; and compare the iris data record of the user to one or more registered iris data records, to authenticate the user, wherein the increment amount is determined based on an environmental reading from a light sensor.

24. The non-transitory computer-readable medium of claim 23, wherein the instructions further comprise instructions to:

determine a target brightness setting for the one or more visible light sources; and apply the target brightness setting to the one or more visible light sources prior to capturing the subsequent image of the eye of the user.

\* \* \* \* \*